(12) United States Patent
Meyers et al.

(10) Patent No.: US 9,064,315 B2
(45) Date of Patent: Jun. 23, 2015

(54) SYSTEM AND PROCESSOR IMPLEMENTED METHOD FOR IMPROVED IMAGE QUALITY AND ENHANCEMENT

(71) Applicant: U.S. Army Research Laboratory, Washington, DC (US)

(72) Inventors: Ronald E Meyers, Columbia, MD (US); Keith S Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/086,463

(22) Filed: Nov. 21, 2013

(65) Prior Publication Data

US 2014/0119651 A1    May 1, 2014

Related U.S. Application Data

(63) Continuation-in-part of application No. 14/022,148, filed on Sep. 9, 2013, and a continuation-in-part of application No. 13/838,249, filed on Mar. 15, 2013, now Pat. No. 8,594,455, said application No. 14/022,148 is a continuation-in-part of application No. 13/247,470, filed on Sep. 28, 2011, now Pat. No. 8,532,427.

(60) Provisional application No. 61/834,497, filed on Jun. 13, 2013.

(51) Int. Cl.
| | | |
|---|---|---|
| *G06K 9/40* | (2006.01) | |
| *G06T 5/00* | (2006.01) | |
| *G06T 5/50* | (2006.01) | |

(52) U.S. Cl.
CPC . *G06T 5/007* (2013.01); *G06T 5/50* (2013.01); *G06T 2207/10032* (2013.01)

(58) Field of Classification Search
USPC .................................................. 382/167, 274
See application file for complete search history.

(56) References Cited

U.S. PATENT DOCUMENTS

| | | | | |
|---|---|---|---|---|
| 6,226,350 | B1 * | 5/2001 | Hsieh | 378/98 |
| 6,493,039 | B1 * | 12/2002 | Harrington | 348/618 |
| 7,536,012 | B1 | 5/2009 | Meyers et al. | |

(Continued)

OTHER PUBLICATIONS

R. Meyers, K. Deacon, and Y. Shih, 'Ghost-imaging experiment by measuring reflected photons,' Phys. Rev. A 77, 041801(R) (2008).

(Continued)

*Primary Examiner* — Michelle Entezari
(74) *Attorney, Agent, or Firm* — Lawrence E. Anderson

(57) ABSTRACT

System and method for image improvement comprising providing a plurality of frames; determining the value of each pixel within each frame to form a first array of pixel values; selecting pixel locations within a frame; summing the intensity values of those pixels; multiplying the pixels in the first array by the summation of intensity values for selected pixel locations to produce a first product array for each frame; summing the first product arrays; determining the average of first product arrays; determining the average value of each pixel for the plurality of frames to form an a second array of averaged pixel values; determining the average of the summation of intensity values for the selected pixel locations; multiplying the array of average pixel values and the average of the summation of intensity values to form a second product array; subtracting the second product array from the average of first product arrays.

16 Claims, 38 Drawing Sheets

(56) References Cited

U.S. PATENT DOCUMENTS

| | | | |
|---|---|---|---|
| 7,812,303 B2 | 10/2010 | Meyers et al. | |
| 7,847,234 B2 | 12/2010 | Meyers et al. | |
| 8,053,715 B2 | 11/2011 | Meyers et al. | |
| 8,242,428 B2 | 8/2012 | Meyers et al. | |
| 8,373,107 B2 | 2/2013 | Meyers et al. | |
| 8,532,427 B2 * | 9/2013 | Meyers et al. | 382/274 |
| 8,593,564 B2 | 11/2013 | Border et al. | |
| 8,594,455 B2 * | 11/2013 | Meyers et al. | 382/274 |
| 2009/0194702 A1 | 8/2009 | Meyers et al. | |
| 2010/0140458 A1 | 6/2010 | Meyers et al. | |
| 2010/0258708 A1 | 10/2010 | Meyers et al. | |
| 2010/0294916 A1 | 11/2010 | Meyers et al. | |
| 2011/0284724 A1 | 11/2011 | Meyers et al. | |
| 2013/0243334 A1 | 9/2013 | Meyers et al. | |

OTHER PUBLICATIONS

D. L. Donoho, "Compressed sensing," IEEE Transactions on Information Theory, vol. 52, pp. 1289-1306, (2006).

E. Candes, J. Romberg, and T. Tao, "Robust uncertainty principles: Exact signal Reconstruction from Highly Incomplete Frequency Information," IEEE Trans. Inf. Theory, 52, 489 (2006).

Scarcelli, G., et al. "Can Two-Photon Correlation of Chaotic Light Be Considered as Correlation of Intensity Fluctuations'?" Physics Review Letters 96, 063602 (2006).

O. Katz, Y. Bromberg, Y. Silberberg, "Compressive Ghost Imaging," Appl Phys. Lett., 95, 131110 (2009).

J. Shapiro, "Computational ghost imaging," Phys. Rev. A vol. 78 061802(R) (Dec. 18, 2008).

R. Meyers and K. Deacon,"Quantum Ghost Imaging Experiments At ARL", Proc. SPIE vol. 7815, 781501, (2010).

M. Figueiredo, R. Nowak, and S. Wright, "Gradient projection for sparse reconstruction: Application to compressed sensing and other inverse problems (2007)," IEEE J. Sel. Topics on Signal Processing, 1, 586 (2007).

R. Meyers, K. Deacon, and Y.Shih,"A new Two-photon Ghost Imaging Experiment with Distortion Study," J. Mod. Opt., 54, 2381-2392 (2007).

R. Meyers, K. Deacon, and Y. Shih, "Quantum imaging of an obscured object by measurement of reflected photons," Proc. SPIE vol. 7092, 70920E (2008) doi:10.1117/12.797926.

R. Meyers, K. Deacon, and Y. Shite, "Turbulence-free ghost imaging," Appl. Phys. Lett. 98, 111115 (Mar. 18, 2011); doi:10.1063/1.3567931.

R. Glauber, "The Quantum Theory of Optical Coherence," Phys. Rev. 130, 2529 (1963) 131, 2766 (Jun. 1963).

T. B. Pittman, et al. "Optical imaging by means of two-photon quantum entanglement,"Phys. Rev. A 52, R3429-R3432 (1995).

D. Strekalov, et al. "Observation of Two-Photon 'Ghost' Interference and Diffraction,"Phys. Rev. Lett. 74, 3600-3603 (1995).

R. Meyers, K. Deacon, Y. Shih, "Positive-negative turbulence-free ghost imaging," Appl. Phys. Lett. 100, 131114 (Mar. 29, 2012).

Wang, Y. Cai, and O. Korotkova, "Ghost imaging with partially coherent light in turbulent atmosphere," Proc. SPIE 7588, 75880F (2010).

J. Cheng,"Ghost imaging through turbulent atmosphere," Opt. Express 17, Issue 10, pp. 7916-7921 (2009).

R. Meyers, et al. "Turbulence-Free Space-Time Quantum Imaging," Proc. SPIE 8875, 88750X-1 (2013).

Brown, R. Hanbury, "The Question of Correlation Between Photons in Coherent Light Rays", Nature, No. 4548, Dec. 29, 1956, pp. 1447-1450.

Klyshko, D.N., "Combined EPR and Two-Slit Experiments: Interference of Advanced Waves", Physics Letters A, vol. 132, No. 6.7, pp. 299-304 (1988).

Zhang, Da, et al., "Correlated two-photon imaging with true thermal light", Optics Letters, vol. 30, No. 18, Sep. 15, 2005, pp. 2354-2356.

Meyers, Ron, et al., "A new two-photon ghost imaging experiment with distortion study", Journal of Modern Optics, vol. 54, Nos. 16-17, Nov. 10-20, 2007, 2381-2392.

A.V. Sergienko, et al., "Two-photon geometric optical imaging and quantum 'cryptoFAX'" Proc. SPIE Int. Soc. Opt. Eng.(2799), p. 164-171, 199, 1996.

Spiller, "Quantum Information Processing: Cryptography, Computation, and Teleportation," Proceedings of the IEEE Dec. 1996 vol. 84 Issue:12, pp 1719-1746 ISSN: 0018-9219.

Jennewein, Thomas, et al. "Experimental Nonlocality Proof of Quantum Teleportation and Entanglement Swapping," Physical Review Letters vol. 88, No. 1, (Jan. 2002) 124-141.

Jennewein, Thomas, et al., "Quantum Communication and Teleportation Experiments Using Entangled Photon Pairs (Dissertation zur Erlangung des Grades)" Doktor der Naturwissenschafen Jun. 2002.

Roisse, et al. "Walk-off and Phase-compensated Resonantly Enhanced Frequency-doubling of Picosecond Pulses Using Type II Nonlinear Crystal," Applied Physics B: Lasers and Optics, vol. 69, No. 1, 25-27, DOI: 10.1007/s003400050764 (1999).

B.C. Jacobs, "Quantum Cryptography in Free Space," Nov. 15, 1996, Optics Letters, vol. 21, No. 22, p. 1854-1856.

R. Ng, et al.,"Light Field Photography with a Hand-held Plenoptic Camera," Stanford Tech Report CTSR Feb. 2005.

Meyers, R, et al., "Space-time quantum imaging,"Proc. SPIE 8875, Quantum Communications and Quantum Imaging XI, 887502 (Sep. 26, 2013); doi:10.1117/12.2028190.

Shapiro, J.H. "Computational Ghost Imaging,"Massachusetts Institute of Technology, Research Laboratory of Electronics, Cambridge, Massachusetts 02139, USA, arXiv:0807.2614v1 [quant-ph] Jul. 16, 2008.

* cited by examiner

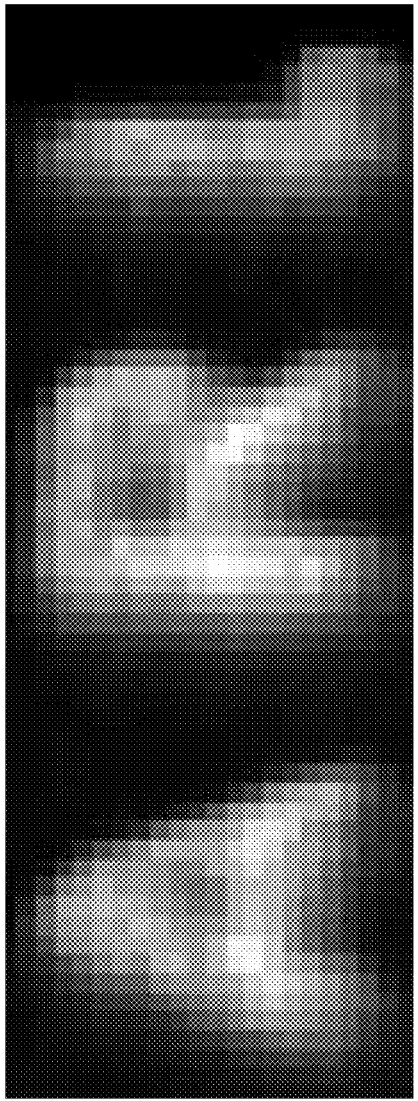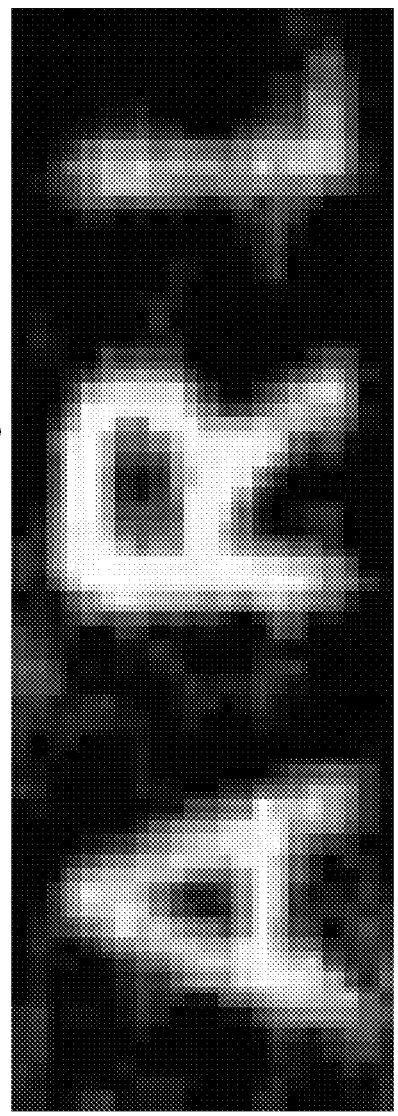
FIG. 7 Self Bucket $G^{(2)}$ Virtual Ghost Image with turbulence 10k Frames.
FIG. 8 $G^{(2)}$ Ghost image computed using the 2 path configuration.

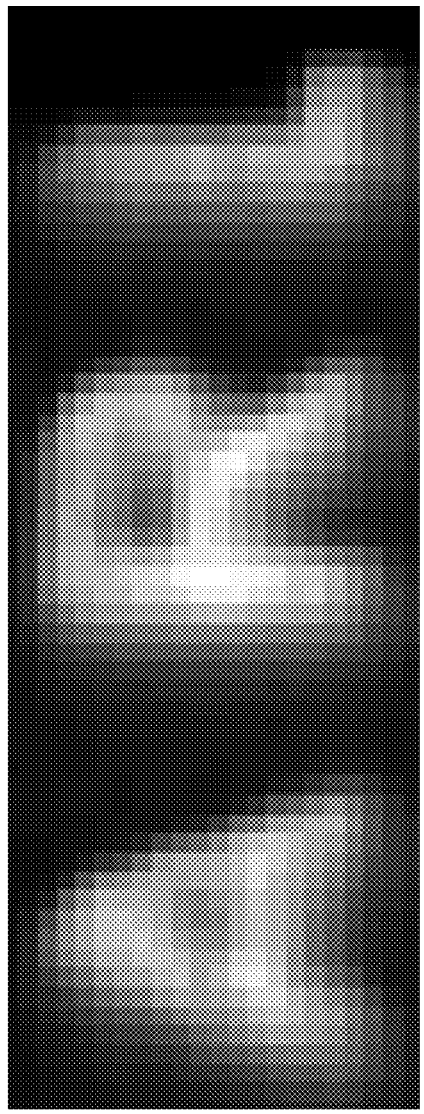
FIG.9 Mean Bucket/Target Image 10k Frames.
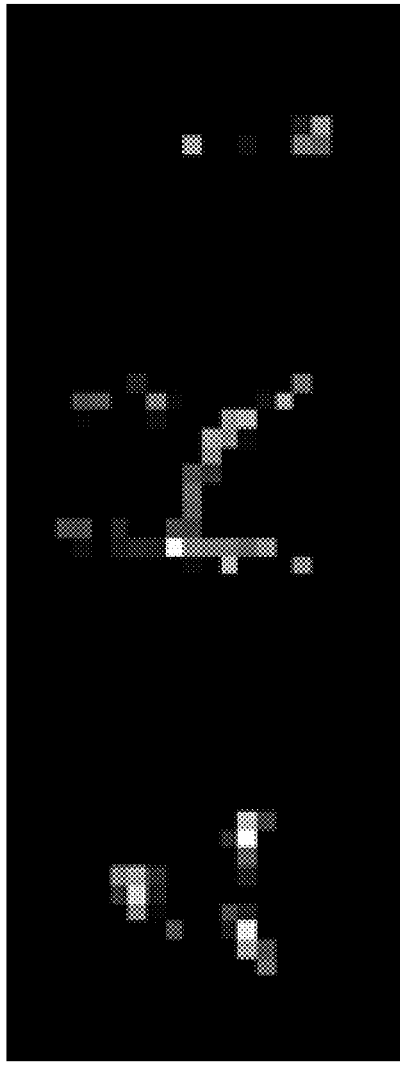
FIG.10 Self Bucket G(2) GPSR with turbulence 10k Frames; Data normalized globally 0-1; τ=1e8; Tol=1e-6; Non Zero=67

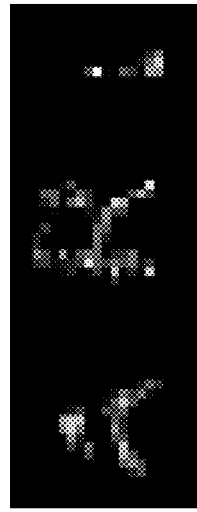 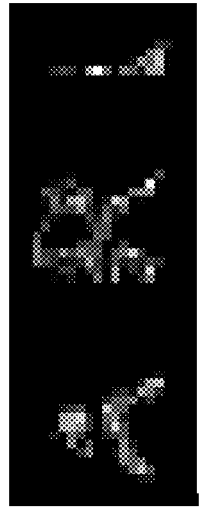 
FIG. 11 Self Bucket G(2) GPSR with turbulence 10k Frames; Data normalized globally
0-1; tau=5e7; Tol=1e-6; Non Zero=131
FIG. 12 Self Bucket G(2) GPSR with turbulence 10k Frames; Data normalized globally
0-1; tau=2.5e7; Tol=1e-6; NonZero=183
FIG. 13 Self Bucket G(2) GPSR with turbulence 10k Frames; Data normalized globally
0-1; tau=1e7; Tol=1e-6; Non Zero=304

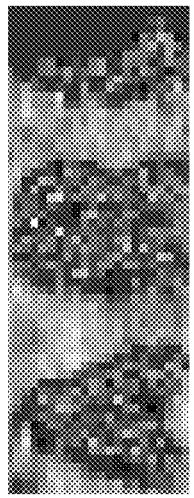
FIG. 14 Self Bucket $G^{(2)}$ GPSR with turbulence 10k Frames; Data normalized globally 0-1; tau =1e6; Tol=1e-6; Non Zero=1310
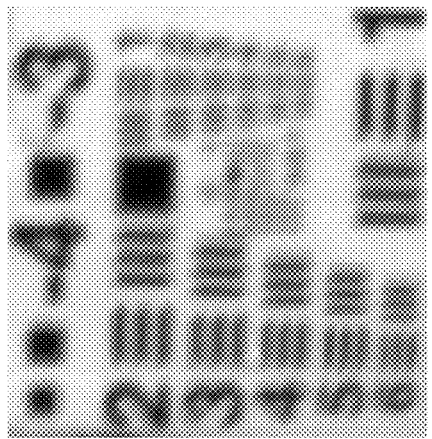
FIG. 15 Sample instantaneous data image. Frame = 137

Self Bucket G(2) frames

Using 335 Frames
Self Bucket

Average of 335 frames

FIG. 20C

308N — IF OVERALL INTENSITY DEVIATION IS NEGATIVE FOR A GIVEN FRAME, THE FRAME IS GROUPED INTO A SECOND GROUP N

309N — FOR EACH FRAME IN THE SECOND GROUP, SELECT ALL PIXELS IN EACH FRAME WITH A POSITIVE DEVIATION FROM THE ARRAY OF AVERAGE PIXEL VALUES AND PLACE IN A THIRD SUBGROUP NP

310N — FOR EACH FRAME IN THE SECOND GROUP, SELECT ALL PIXELS IN EACH FRAME WITH A NEGATIVE DEVIATION FROM THE ARRAY OF AVERAGE PIXEL VALUES AND PLACE IN A FOURTH SUBGROUP NN

311N — FOR EACH FRAME IN THE SECOND GROUP, SELECT ALL PIXELS IN EACH FRAME WITH A ZERO DEVIATION FROM THE ARRAY OF AVERAGE PIXEL VALUES AND PLACE IN A EITHER THE FIRST OR SECOND SUBGROUP (NP OR NN)

312 — FOR EACH PIXEL VALUE FOR EACH FRAME IN THE EACH SUBGROUP MULTIPLY, EACH PIXEL VALUE BY OVERALL INTENSITY DEVIATION FOR THAT FRAME TO OBTAIN A FIRST PRODUCT ARRAY (OR CONDITIONAL PRODUCT ARRAY) FOR EACH FRAME IN THE SUBGROUP

313 — FOR EACH SUBGROUP, ADD UP THE PRODUCT ARRAYS IN THE SUBGROUP AND DIVIDE BY THE NUMBER OF FRAMES IN THE SUBGROUP TO OBTAIN A SECOND OR AVERAGE CONDITIONAL PRODUCT ARRAY FOR EACH SUBGROUP

314 — SELECT ONE OF MORE SECOND PRODUCT ARRAYS TO GENERATE AN IMAGE

FIG. 22

Continued from FIG. 21 — (800)

SET 3 — 318

FOR EACH FRAME WITH A POSITIVE OVERALL INTENSITY DEVIATION MULTIPLY THE POSITIVE OVERALL INTENSITY DEVIATION BY THE POSITIVE DEVIATION FRAME DATA PIXELS WITHIN THAT SET OF FRAMES

RECORD AND ACCUMULATE PIXEL LOCATIONS(a), THE SQUARE OF THE POSITIVE OVERALL INTENSITY DEVIATION VALUES(b), THE PRODUCT OF THE POSITIVE OVERALL INTENSITY DEVIATION x POSITIVE DEVIAITON FRAME DATA PIXELS (c) AND THE SQUARE OF THE POSITIVE DEVIATION FRAME DATA PIXELS (d) VALUES THAT WERE USED AT A PIXEL LOCATION.

— 319

320 —

DETERMINE THE PRE-NORMALIZED POSITIVE-POSITIVE PRODUCT PIXEL VALUES BY DIVIDING THE PRODUCT OF THE POSITIVE OVERALL INTENSITY DEVIATION x POSITIVE DEVIATION FRAME DATA PIXELS BY THE ACCUMULATED PIXEL LOCATIONS (a)

DETERMINE THE AVERAGE THE SQUARES OF THE POSITIVE OVERALL INTENSITY DEVIATION VALUES BY DIVIDING THE ACCUMULATED SQUARES OF THE POSITIVE OVERALL INTENSITY DEVIATION VALUES BY THE ACCUMULATED PIXEL LOCATIONS (b)

DETERMINE THE AVERAGE THE SQUARES OF THE POSITIVE DEVIATION FRAME DATA PIXELS BY DIVIDING THE ACCUMULATED SQUARES OF THE POSITIVE DEVIATION FRAME DATA PIXEL VALUES BY THE ACCUMULATED PIXEL LOCATIONS (c)

Continued to FIG. 23 and may proceed concurrently to FIGS. 26 and 28 — (900)

FIG. 23

SET 3

Continued from FIG. 22 (900)

↓ 321

DETERMINE THE STANDARD DEVIATION OF THE POSITIVE OVERALL INTENSITY DEVIATION VALUES BY TAKING SQUARE ROOT OF THE AVERAGE THE SQUARES OF THE POSITIVE OVERALL INTENSITY DEVIATION VALUES

⇒ 322

DETERMINE THE STANDARD DEVIATION OF THE POSITIVE DEVIATION FRAME DATA PIXELS BY TAKING SQUARE ROOT OF THE AVERAGE THE SQUARES OF THE POSITIVE DEVIATION FRAME DATA PIXEL VALUES

⇒ 323

DETERMINE THE NORMALIZED POSITIVE-POSITIVE PRODUCT PIXEL VALUES BY DIVIDING THE PRE-NORMALIZED POSITIVE-POSITIVE PRODUCT BY THE PRODUCT OF THE STANDARD DEVIATION OF THE POSITIVE OVERALL INTENSITY DEVIATION VALUES × THE STANDARD DEVIATION OF THE POSITIVE DEVIATION FRAME DATA PIXELS

FIG. 24 Continued from FIG. 23 (800)

SET 4

400 — FOR EACH FRAME WITH A NEGATIVE OVERALL INTENSITY DEVIATION MULTIPLY THE NEGATIVE OVERALL INTENSITY DEVIATION BY THE NEGATIVE DEVIATION FRAME DATA PIXELS WITHIN THAT SET OF FRAMES

401 — RECORD AND ACCUMULATE PIXEL LOCATIONS(a), THE SQUARE OF THE NEGATIVE OVERALL INTENSITY DEVIATION VALUES(b), THE PRODUCT OF THE NEGATIVE OVERALL INTENSITY DEVIATION x NEGATIVE DEVIATION FRAME DATA PIXELS(c) AND THE SQUARE OF THE NEGATIVE DEVIATION FRAME DATA PIXELS (d) VALUES THAT WERE USED AT A PIXEL LOCATION.

402 — DETERMINE THE PRE-NORMALIZED NEGATIVE-NEGATIVE PRODUCT PIXEL VALUES BY DIVIDING THE PRODUCT OF THE NEGATIVE OVERALL INTENSITY DEVIATION x NEGATIVE DEVIATION FRAME DATA PIXELS BY THE ACCUMULATED PIXEL LOCATIONS (a)
DETERMINE THE AVERAGE THE SQUARES OF THE NEGATIVE OVERALL INTENSITY DEVIATION VALUES BY DIVIDING THE ACCUMULATED SQUARES OF THE NEGATIVE OVERALL INTENSITY DEVIATION VALUES BY THE ACCUMULATED PIXEL LOCATIONS (b)
DETERMINE THE AVERAGE THE SQUARES OF THE NEGATIVE FRAME DATA DEVIATION PIXELS BY DIVIDING THE ACCUMULATED SQUARES OF THE NEGATIVE DEVIATION FRAME DATA PIXELS VALUES BY THE ACCUMULATED PIXEL LOCATIONS (c)

Continued from FIG. 24 (901)

SET 4

403 — DETERMINE THE STANDARD DEVIATION OF THE NEGATIVE OVERALL INTENSITY DEVIATION VALUES BY TAKING SQUARE ROOT OF THE AVERAGE THE SQUARES OF THE NEGATIVE OVERALL INTENSITY DEVIATION VALUES

404 — DETERMINE THE STANDARD DEVIATION OF THE NEGATIVE DEVIATION FRAME DATA PIXELS BY TAKING SQUARE ROOT OF THE AVERAGE THE SQUARES OF THE NEGATIVE DEVIATION FRAME DATA PIXEL VALUES

405 — DETERMINE THE NORMALIZED NEGATIVE-NEGATIVE PRODUCT PIXEL VALUES BY DIVIDING THE PRE-NORMALIZED NEGATIVE-NEGATIVE CORRELATION BY THE PRODUCT OF THE STANDARD DEVIATION OF THE NEGATIVE OVERALL INTENSITY DEVIATION VALUES x THE STANDARD DEVIATION OF THE NEGATIVE DEVIATION FRAME DATA PIXELS

Continued to FIG. 30 or 31 (700 or 701)

FIG. 26 Continued from FIG. 22 (800)

*SET 5* 800

FOR EACH FRAME WITH A NEGATIVE OVERALL INTENSITY DEVIATION MULTIPLY THE NEGATIVE OVERALL INTENSITY DEVIATION BY THE POSITIVE DEVIATION FRAME DATA PIXELS WITHIN THAT SET OF FRAMES

801

RECORD AND ACCUMULATE PIXEL LOCATIONS(a), THE SQUARE OF THE NEGATIVE OVERALL INTENSITY DEVIATION VALUES(b), THE PRODUCT OF THE NEGATIVE OVERALL INTENSITY DEVIATION x POSITIVE DEVIATION FRAME DATA PIXELS(c) AND THE SQUARE OF THE POSITIVE DEVIATION FRAME DATA PIXELS (d) VALUES THAT WERE USED AT A PIXEL LOCATION.

802

DETERMINE THE PRE-NORMALIZED POSITIVE-NEGATIVE PRODUCT PIXEL VALUES BY DIVIDING THE PRODUCT OF THE NEGATIVE OVERALL INTENSITY DEVIATION x POSITIVE FRAME DATA DEVIATION PIXELS BY THE ACCUMULATED PIXEL LOCATIONS (a)
DETERMINE THE AVERAGE THE SQUARES OF THE NEGATIVE OVERALL INTENSITY DEVIATION VALUES BY DIVIDING THE ACCUMULATED SQUARES OF THE POSITIVE OVERALL INTENSITY DEVIATION VALUES BY THE ACCUMULATED PIXEL LOCATIONS (b)
DETERMINE THE AVERAGE THE SQUARES OF THE NEGATIVE DEVIATION FRAME DATA PIXELS BY DIVIDING THE ACCUMULATED SQUARES OF THE POSITIVE DEVIATION FRAME DATA PIXELS VALUES BY THE ACCUMULATED PIXEL LOCATIONS (c)

Continued from FIG. 26 (902)

SET 5

803 — DETERMINE THE STANDARD DEVIATION OF THE NEGATIVE OVERALL INTENSITY DEVIATION VALUES BY TAKING SQUARE ROOT OF THE AVERAGE THE SQUARES OF THE NEGATIVE OVERALL INTENSITY DEVIATION VALUES

804 — DETERMINE THE STANDARD DEVIATION OF THE POSITIVE DEVIATION FRAME DATA PIXELS BY TAKING SQUARE ROOT OF THE AVERAGE THE SQUARES OF THE POSITIVE DEVIATION FRAME DEVIATION PIXEL VALUE

805 — DETERMINE THE NORMALIZED POSITIVE-NEGATIVE PRODUCT PIXEL VALUES BY DIVIDING THE PRE-NORMALIZED POSITIVE-NEGATIVE CORRELATION BY THE PRODUCT OF THE STANDARD DEVIATION OF THE NEGATIVE OVERALL INTENSITY DEVIATION VALUES x THE STANDARD DEVIATION OF THE POSITIVE DEVIATION FRAME DATA PIXELS

Continued to FIG. 30 or 31 (700 or 701)

FIG. 28    SET 6

Continued from FIG. 22 → (800)

FOR EACH FRAME WITH A POSITIVE OVERALL INTENSITY DEVIATION MULTIPLY THE POSITIVE OVERALL INTENSITY DEVIATION BY THE NEGATIVE DEVIATION FRAME DATA PIXELS WITHIN THAT SET OF FRAMES ——600

↓

RECORD AND ACCUMULATE PIXEL LOCATIONS (a), THE SQUARE OF THE POSITIVE OVERALL INTENSITY DEVIATION VALUES(b), THE PRODUCT OF THE POSITIVE OVERALL INTENSITY DEVIATION x NEGATIVE DEVIATION FRAME DATA PIXELS(c) AND THE SQUARE OF THE NEGATIVE DEVIATION FRAME DATA PIXELS(d) VALUES THAT WERE USED AT A PIXEL LOCATION. ——601

↓ ——602

DETERMINE THE PRE-NORMALIZED NEGATIVE-POSITIVE PRODUCT PIXEL VALUES BY DIVIDING THE PRODUCT OF THE POSITIVE OVERALL INTENSITY DEVIATION x NEGATIVE DEVIATION FRAME DATA PIXELS BY THE ACCUMULATED PIXEL LOCATIONS (a)

DETERMINE THE AVERAGE THE SQUARES OF THE POSITIVE OVERALL INTENSITY DEVIATION VALUES BY DIVIDING THE ACCUMULATED SQUARES OF THE POSITIVE OVERALL INTENSITY DEVIATION VALUES BY THE ACCUMULATED PIXEL LOCATIONS(b)

DETERMINE THE AVERAGE THE SQUARES OF THE NEGATIVE FRAME DATA DEVIATION PIXELS BY DIVIDING THE ACCUMULATED SQUARES OF THE NEGATIVE DEVIATION FRAME DATA PIXELS VALUES BY THE ACCUMULATED PIXEL LOCATIONS(c)

*SET 6*

Continued from FIG. 28 (903)

↓

DETERMINE THE STANDARD DEVIATION OF THE POSITIVE OVERALL INTENSITY DEVIATION VALUES BY TAKING SQUARE ROOT OF THE AVERAGE THE SQUARES OF THE POSITIVE OVERALL INTENSITY DEVIATION VALUES — 603

DETERMINE THE STANDARD DEVIATION OF THE NEGATIVE DEVIATION FRAME DATA PIXELS BY TAKING SQUARE ROOT OF THE AVERAGE THE SQUARES OF THE NEGATIVE DEVIATION FRAME DATA PIXEL VALUES — 604

DETERMINE THE NORMALIZED NEGATIVE-POSITIVE PRODUCT PIXEL VALUES BY DIVIDING THE PRE-NORMALIZED NEGATIVE-POSITIVE PRODUCT PIXEL VALUES BY THE PRODUCT OF THE STANDARD DEVIATION OF THE POSITIVE OVERALL INTENSITY DEVIATION VALUES x THE STANDARD DEVIATION OF THE NEGATIVE DEVIATION FRAME DATA PIXELS — 605

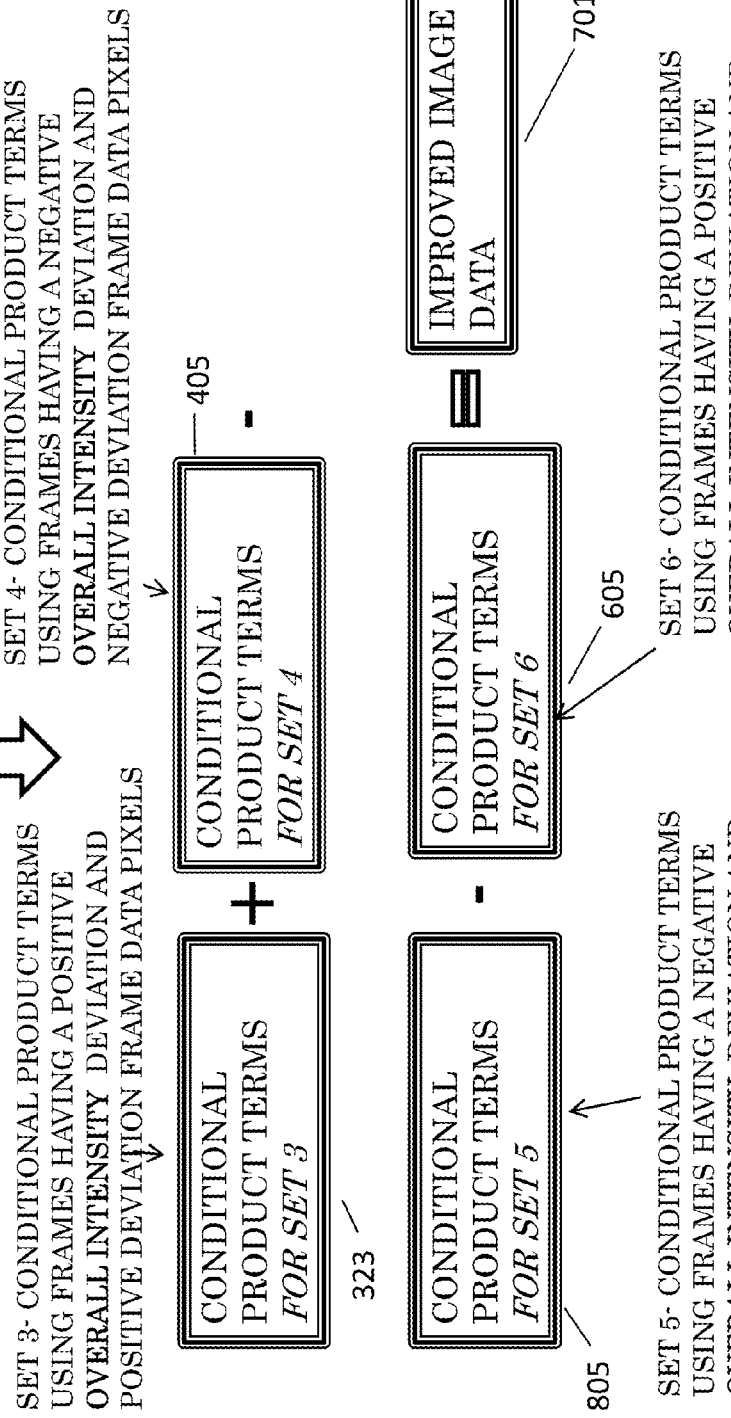

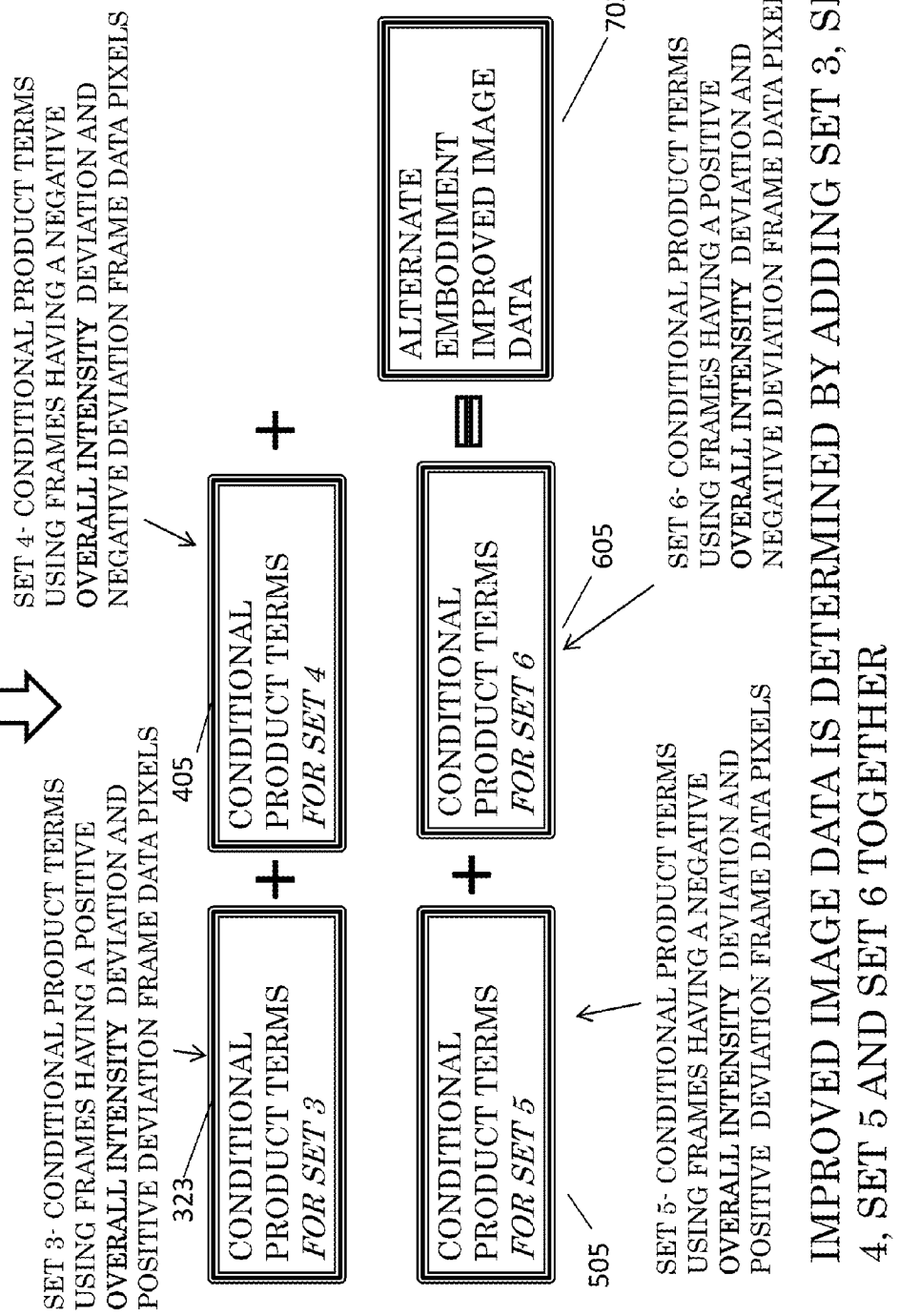

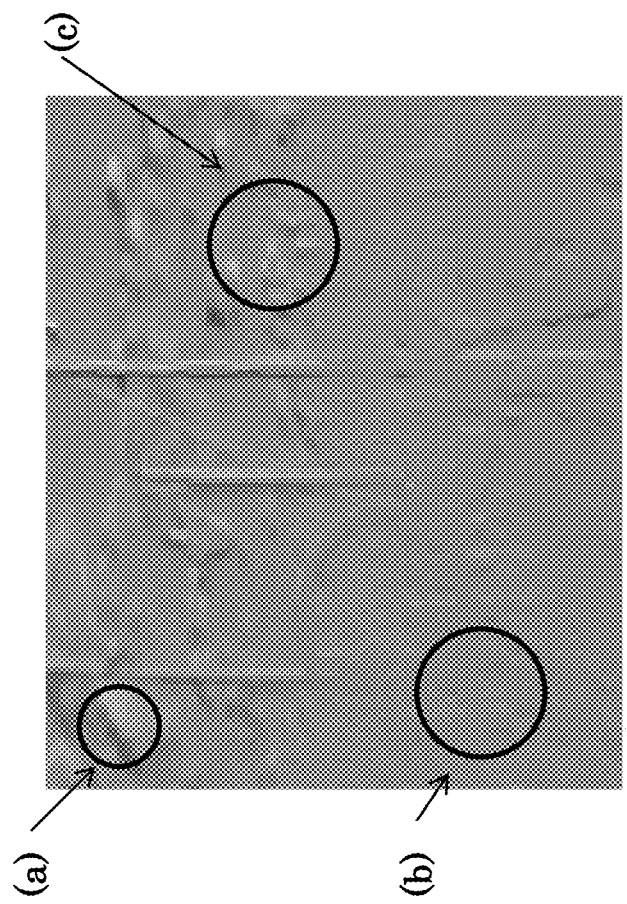
FIG 32: TYPICAL $G^{(2)}$ IMAGE RESULTS

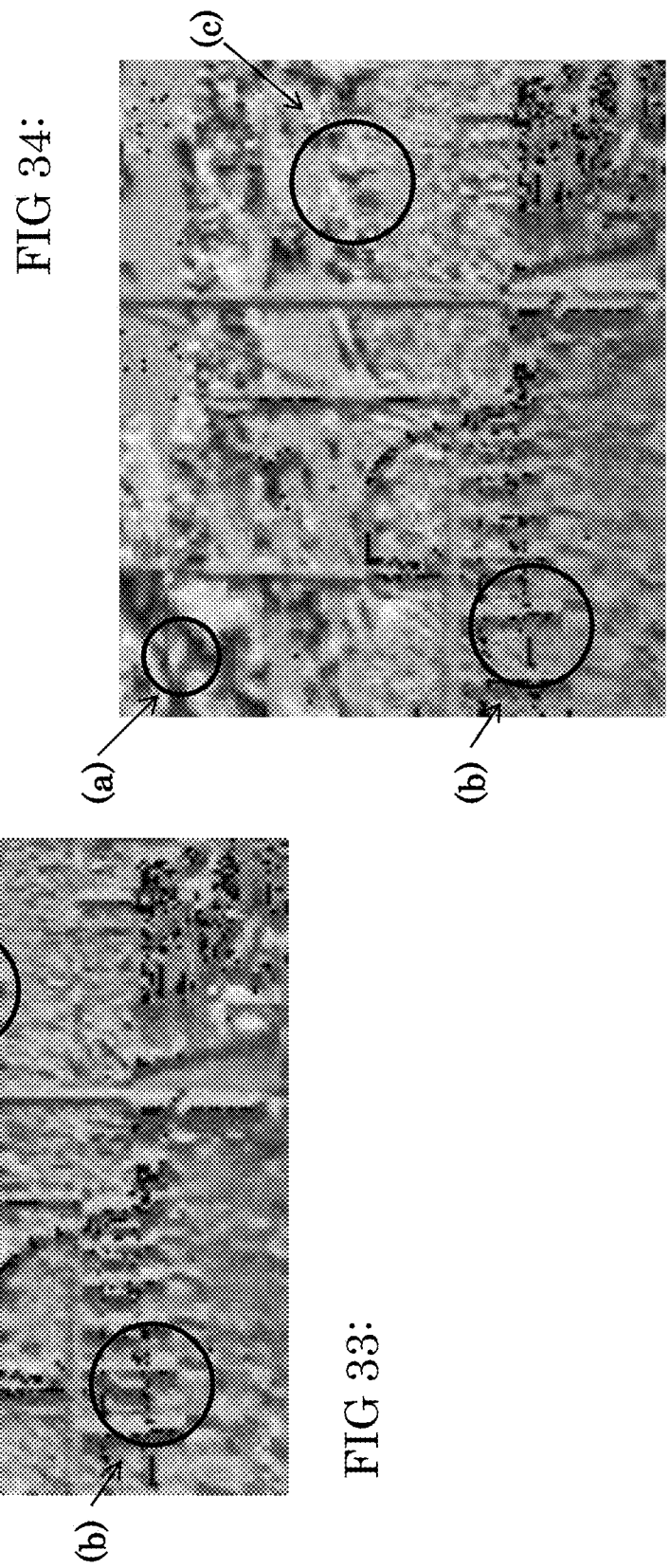

FIG 36: RESULTS OF A IMPROVED LOG IMAGE GENERATED USING INFRA RED

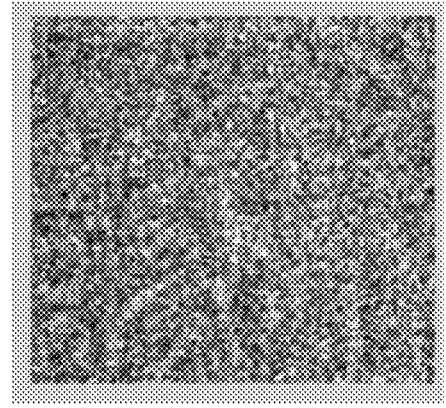
FIG 38
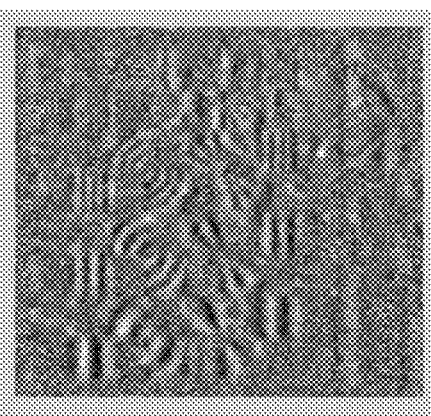
FIG 37
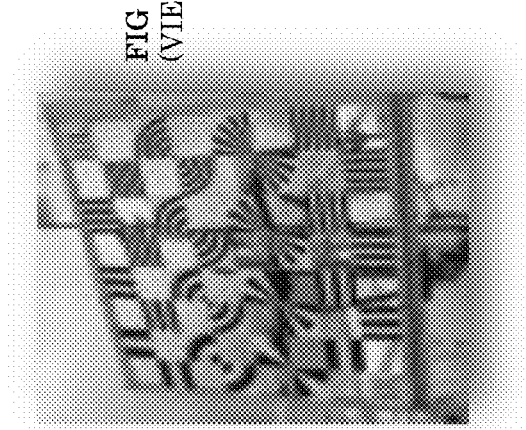
FIG 39 IMAGE OF THE TARGET AREA
(VIEWED FROM A SHORT DISTANCE)

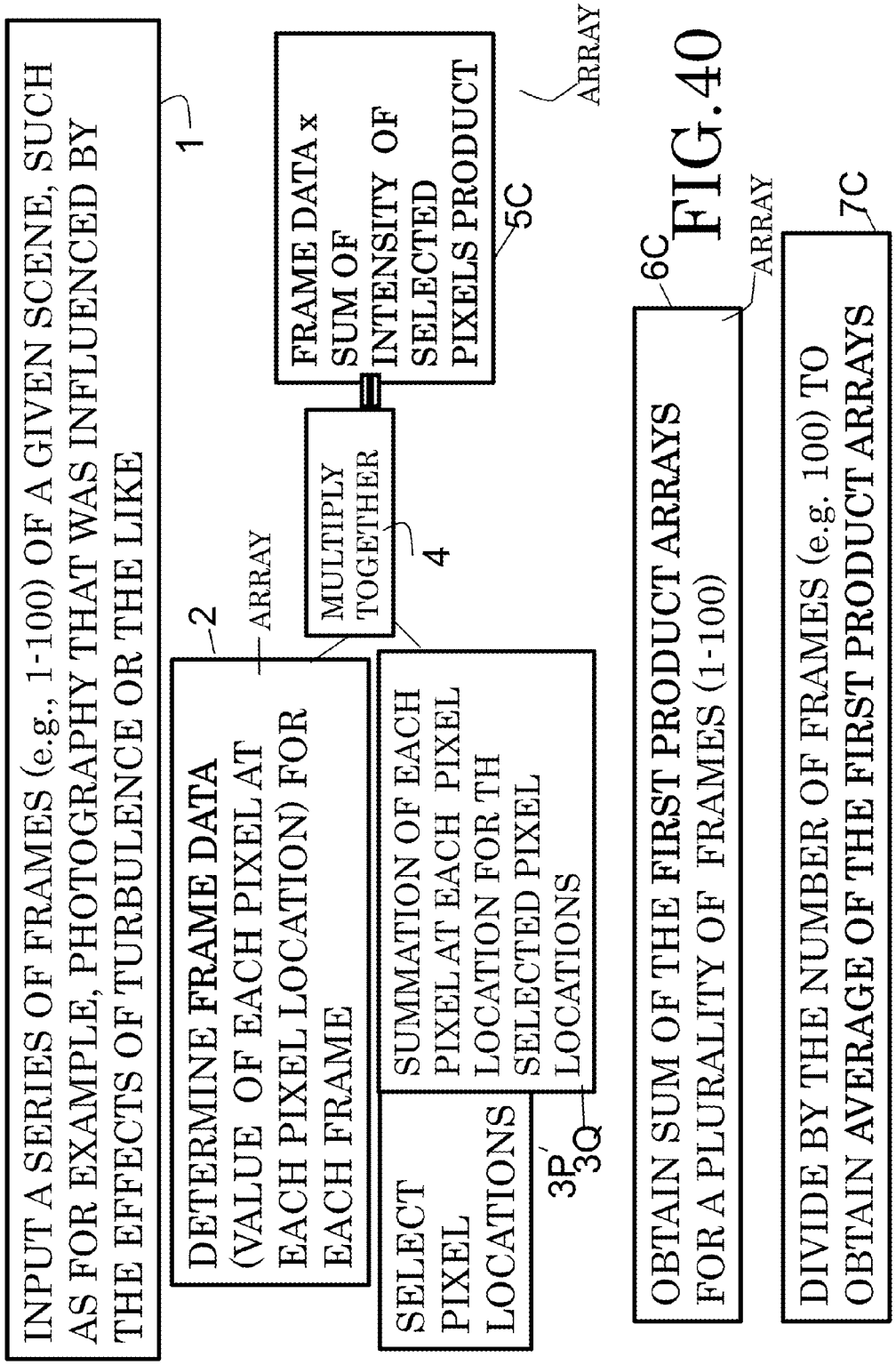

SYSTEM AND PROCESSOR IMPLEMENTED METHOD FOR IMPROVED IMAGE QUALITY AND ENHANCEMENT

CROSS REFERENCE TO RELATED APPLICATIONS

This application is a continuation-in-part (CIP) application of and claims priority to U.S. patent application Ser. No. 14/022,148, filed Sep. 9, 2013, herein incorporated by reference in its entirety. This application is a continuation-in-part (CIP) application of and claims priority to U.S. patent application Ser. No. 13/838,249, filed Mar. 15, 2013, to be issued as U.S. Pat. No. 8,594,455 on Nov. 26, 2013, herein incorporated by reference in its entirety. This application is a also a continuation-in-part (CIP) application of and claims priority to U.S. patent application Ser. No. 13/247,470 filed Sep. 28, 2011, now U.S. Pat. No. 8,532,427, issued Sep. 10, 2013, herein incorporated by reference in its entirety. This application also claims priority to U.S. Provisional Application No. 61/834,497, entitled "System and Method for Image Enhancement and Improvement," filed on Jun. 13, 2013, herein incorporated by reference.

GOVERNMENT INTEREST

The invention described herein may be manufactured, used, and/or licensed by or for the United States Government without the payment of royalties.

REFERENCE TO COMPUTER PROGRAM LISTING APPENDIX

A computer program listing appendix has been submitted via EFS-Web labeled as "codeappendixA1A8" containing Appendices A1-A8 and having a size of 15.9 kilobytes. The material contained in the Appendices A1 through A8 is incorporated by reference herein as though rewritten fully herein.

BACKGROUND OF THE INVENTION

Image processing is a form of signal processing for which the input is an image, such as a photograph or video frame, and the output is either image or a set of characteristics or parameters related to the image. Forms of image processing include, for example, but are not limited to, face detection, feature detection, medical image processing, computer vision (extraction of information from an image by a computer), microscope image processing, etc.

Image resolution relates at least in part to the detail that an image possesses. For satellite images, generally speaking, an image is considered to be more detailed as the area represented by each pixel is decreased. As used herein, the term images include digital images, electronic images, film images, and/or other types of images. Cameras taking pictures from great distances, such as aerial photos, may not obtain detailed information about the subject matter. Consequently, subtle or detail information may not present in the images.

An image may be captured by, for example, a monochrome camera, a single charge-coupled device (CCD) or complementary metal-oxide semiconductor (CMOS) sensor and the image is formed via the light intensity projected onto the sensor therein.

In U.S. Pat. No. 7,536,012, to Meyers et al., hereby incorporated by reference, entitled "Entangled Quantum Communications and Quantum Imaging," there is disclosed, inter alia, a quantum imaging system (see Col. 8, line 50, et seq.) in which the sender sends an image of an image mask using entangled photons and coincidence measurements to a receiver. The system differs from the conventional quantum imaging set-up in that polarization beam splitters are placed in the path of the photons to provide two channels for each of the sender and the receiver, as shown in FIG. 4 of the '012 patent. On the sender's side, a photon beam is split by a beam splitter into first and second sub-beams. The first sub-beam is passed through a mask 164 which creates the image which is directed through a beam splitter 166 to bucket detectors 168, 170, which are operatively connected to a coincidence circuit. The second sub-beam is transmitted to the receiver without ever passing through the mask 164. In the embodiment of FIG. 4 of the '012 patent, the receiver receives the second sub-beam and an image of the mask is constructed based upon photon coincident measurements composited from two photon detectors 168 and 170, also referred to a bucket detectors. The image of a mask is transmitted via coincidences and the photons transmitting the image have never encountered the image mask. Because of the somewhat puzzling nature or circumstances of the transmission, the process has been dubbed by some as "Ghost Imaging," while others have explained the effects as resulting from the quantum properties of light.

SUMMARY OF THE INVENTION

A preferred method for image improvement comprises: the following steps not necessarily in sequential order:
providing a plurality of frames of a region of interest;
determining the value of each pixel at each location within each frame to form a first array of pixel values for each frame;
selecting pixel locations within each frame within the plurality of frames;
summing the intensity values for the selected pixel locations within each frame;
multiplying the pixels in the pixel value array by the summation of intensity values for the selected pixel locations to produce a first product array for each frame;
summing the first product arrays;
determining the average of first product arrays by dividing the sum of first product arrays by the number of frames in the plurality of frames;
determining the average value of each pixel at each pixel location for the plurality of frames to form an a second array of averaged pixel values for the plurality of frames;
determining the average of the summation of intensity values for the selected pixel locations for the plurality of frames;
multiplying the array of average pixel values and the average of the summation of intensity values for the selected pixel locations for the plurality of frames to form a second product array;
subtracting the second product array from the average of first product arrays to provide an improved image of the region of interest.

Optionally, the selecting of pixel locations comprises selecting different pixel locations in different frames and wherein the pixel locations are selected based upon predetermined criteria. Optionally, a color may be used for the "bucket value" (selected pixels at predetermined locations) which is different from the color selected for the pixels in the pixel value array. Optionally, the frames of a region of interest may have been influenced by the effects of turbulence or taken in bad or changing weather or influenced by the effects of low-light. Optionally, the inputted frames may be scanned images or radiation emitting images.

A preferred embodiment comprises a system for image improvement comprising
at least one processor,
at least one input for inputting frames of data;
at least one display for displaying the image;
at least one memory operatively associated with the at least one processor adapted to store frames of data taken of a region of interest, each frame of data comprising an array of pixels, each pixel having a pixel value, the at least one processor operating to process a plurality of frames of a given region of interest by;
    determining the value of each pixel at each location within each frame to form a first array of pixel values for each frame;
    selecting pixel locations within each frame within the plurality of frames;
    summing the intensity values for the selected pixel locations within each frame;
    multiplying the pixels in the pixel value array by the summation of intensity values for the selected pixel locations to produce a first product array for each frame;
    summing the first product arrays;
    determining the average of first product arrays by dividing the sum of first product arrays by the number of frames in the plurality of frames;
    determining the average value of each pixel at each pixel location for the plurality of frames to form an a second array of averaged pixel values for the plurality of frames;
    determining the average of the summation of intensity values for the selected pixel locations for the plurality of frames;
    multiplying the array of average pixel values and the average of the summation of intensity values for the selected pixel locations for the plurality of frames to form a second product array;
    subtracting the second product array from the average of first product arrays to provide an improved image of the region of interest.

An alternate preferred method comprises the following steps not necessarily in sequential order:
    providing a plurality of first frames;
    determining the value of each pixel at each location within each frame to form a pixel value array for each frame; the pixel locations being arranged horizontally and vertically;
    for each of the plurality of first frames, creating a shifted frame in which the pixel values are shifted horizontally and/or vertically from the first frame pixel values;
    computing the average frame intensity for the plurality of first frames; computing the average shifted frame intensity for the plurality of shifted frames;
    determining the frame intensity deviation for each first frame by subtracting the average frame intensity for the plurality of first frames from the frame intensity for each first frame;
    determining the shifted frame intensity deviation for each shifted frame by subtracting the average shifted frame intensity for the plurality of shifted frames from the frame intensity for each shifted frame;
    creating a first subgroup of all locations of pixel values where both the first frame intensity deviations and the shifted frame intensity deviations are positive;
    creating a second subgroup of all locations of pixel values where the first frame intensity deviations are positive and the shifted frame intensity deviations are negative;
    creating a third subgroup of all locations of pixel values where the first frame intensity deviations are negative and the shifted frame intensity deviations are positive;
    creating a fourth subgroup of all locations of pixel values where the first frame intensity deviations are negative and the shifted frame intensity deviations are negative;
    for each subgroup, multiplying the first frame intensity deviations by the shifted intensity deviations to create first product arrays for each subgroup;
    summing the first product arrays together and dividing by the total number of frames to obtain a second product array for each subgroup;
    selecting one or more of the second product arrays to generate an enhanced image.

Optionally, when the first frame intensity deviations or the shifted frame intensity deviations have zero intensity deviations, they are grouped in either the first group of all locations of pixel values where both the first frame intensity deviations and the shifted frame intensity deviations are positive or the second subgroup of all locations of pixel values where the first frame intensity deviations are positive and the shifted frame intensity deviations are negative, or to both subgroups, or omitted. Optionally, all second product arrays are combined after reversing the sign of the negative valued second product arrays to generate an enhanced image. Optionally, all second product arrays are combined to generate an enhanced image. The frames may comprise frames influenced by the effects of low-light or the frames may be in different colors or comprise images of an emitting target.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 7 is an illustration of a $G^{(2)}$ Virtual Ghost Image with turbulence using 10 k frames.

FIG. 8 is an illustration of a $G^{(2)}$ Ghost image computed using the 2 path configuration.

FIG. 9 is an illustration of the "Mean Bucket/Target Image" using 10 k frames.

FIG. 10 is an illustration of a "Self Bucket G(2) GPSR with turbulence" using 10 k Frames; data normalized globally 0-1; $\tau=1\times10^8$; Tol=$1\times10^{-6}$; Non Zero=67 (number of pixels not zero).

FIG. 11 is an illustration of a "Self Bucket G(2) GPSR" with turbulence 10 k Frames; Data normalized globally 0-1; $\tau=5\times10^7$; Tol=$1\times10^{-6}$; Non Zero=131.

FIG. 12 is an illustration of a "Self Bucket G(2) GPSR" with turbulence 10 k Frames; Data normalized globally 0-1; $\tau=2.5\times10^7$; Tol=$1\times10^{-6}$; NonZero=183.

FIG. 13 is an illustration of a "Self Bucket G(2) GPSR" with turbulence 10 k Frames; Data normalized globally 0-1; $\tau=1\times10^7$; Tol=$1\times10^{-6}$; Non Zero=304.

FIG. 14 is an illustration of a "Self Bucket $G^{(2)}$ GPSR" with turbulence 10 k Frames; Data normalized globally 0-1; $\tau=1\times10^6$; Tol=$1\times10^{-6}$; Non Zero=1310.

FIG. 15 is an illustration of a sample instantaneous data image.

FIG. 20C is a continuation of the schematic block diagram illustration of FIG. 20A.

FIGS. 21-31 are schematic block diagram illustrations of the steps for an alternate preferred embodiment to compute the fluctuation, or deviation from the mean value of the series of "bucket" measurements according to the alternate preferred embodiment.

FIG. 21 is schematic block diagram illustration of the steps to compute the fluctuation, or deviation from the mean value of the series of the per frame pixel measurements.

FIG. 22 is a partial schematic block diagram illustration which shows how to generate a third set of data which is referred to here at SET 3. The illustrated steps are performed on the above mean, above mean sets of frames.

FIG. 23 is a partial schematic block diagram illustration that is a continuation of FIG. 22.

FIG. 24 is a partial schematic block diagram illustration showing how to generate a fourth set of data which is referred to here at SET 4. The illustrated steps are performed on the below mean, below mean sets of frames.

FIG. 25 is a partial schematic block diagram illustration that is a continuation of FIG. 24.

FIG. 26 is a partial schematic block diagram illustration of the steps how to generate a fifth set of data which is referred to here at SET 5. The illustrated steps are performed on the above mean, below mean sets of frames.

FIG. 27 is continuation of the schematic block diagram illustration of FIG. 26.

FIG. 28 is a partial schematic block diagram illustration showing how to generate a sixth set of data which is referred to here at SET 6. The steps are performed on the below mean, above mean sets of frames.

FIG. 30 is a partial schematic block diagram illustration of the steps for performing an alternate preferred method of the present invention in which the improved final image is determined by adding the above-mean, above mean image to the below-mean, below-mean images, subtracting the above-mean, below-mean image, and subtracting the below-mean, above mean image.

FIG. 31 is a partial schematic block diagram illustration of the steps for performing an alternate preferred method of the present invention in which the improved final image is determined by adding the above-mean, above mean image, the below-mean, below-mean image, the above-mean, below-mean image, and the below-mean, above mean image.

FIG. 32 is an illustration showing results using a standard $G^{(2)}$ calculation to provide a baseline to demonstrate the advantages of the methods presented in this disclosure. FIG. 32 illustrates typical $G^{(2)}$ image results not implementing the improvement methods highlighting areas (A), (B) and (C).

FIG. 33 is an illustration showing the improved imaging results when applying the methods and processes outlined in FIG. 30, highlighting areas (a), (b) and (c). The trees in the distance and clouds are much more distinguishable in this figure when compared to the results shown in FIG. 32.

FIG. 34 is an illustration showing the improved imaging results using the alternate inventive methods and processes outlined in FIG. 31, highlighting areas (a), (b) and (c). As in FIG. 33, the trees and clouds are much more distinguishable than what is seen in FIG. 32.

FIG. 36 is an illustration showing improved image results generated, wherein features such as the lamp post show much more contrast and edge clarity.

FIG. 37 is an illustration showing results of an enhanced image generated using preferred embodiment of FIGS. 20A-20C with data acquired in low-light and turbulence conditions viewed from 2.33 kilometers.

FIG. 38 is an illustration showing an average image of target area with data acquired in low-light and turbulence conditions viewed from 2.33 kilometers.

FIG. 39 is a view of the target shown in FIGS. 37 and 38 from a short distance.

FIG. 40 is a partial schematic block diagram illustration of the steps for performing an alternate preferred method of the present invention.

DETAILED DESCRIPTION OF THE PREFERRED EMBODIMENTS

Figure 1:
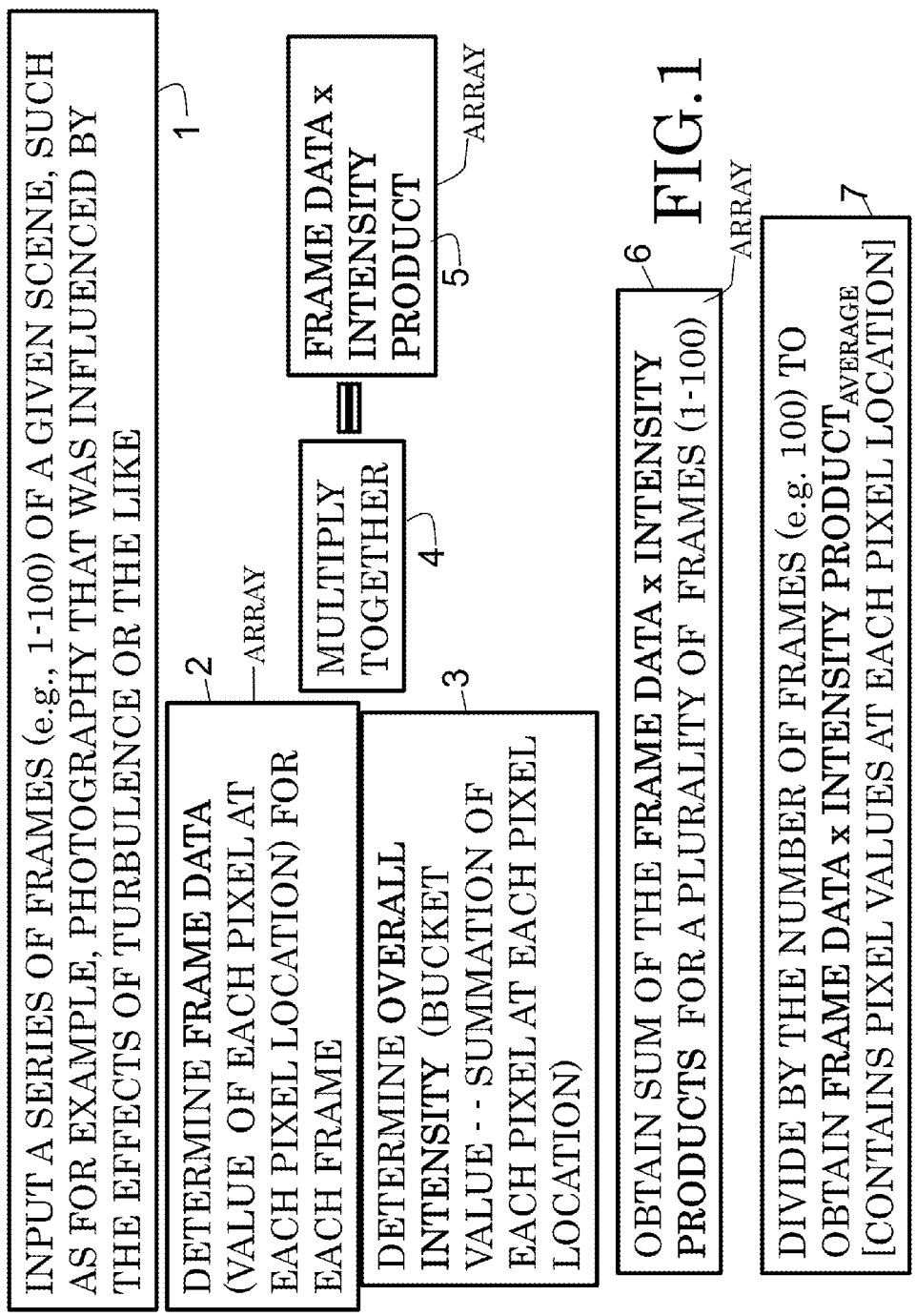
FIG. 1 is a partial schematic block diagram illustration of the steps for performing a preferred method of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

It will be understood that, although the terms first, second, etc. may be used herein to describe various groups, subgroups, elements, components, regions, layers and/or sections, these groups, subgroups, elements, components, regions, layers and/or sections should not be limited by these terms. For example, when referring first and second groups or subgroups, these terms are only used to distinguish one group, subgroup, element, component, region, layer or section from another group, subgroup, region, layer or section. Thus, a first group, subgroup, element, component, region, layer or section discussed below could be termed a second element, component, The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention provides a method and system for the enhancement of images using the quantum properties of light. An embodiment of the present invention increases the image quality of an object or scene as seen by a detector. When a low quality detector is aimed at an object, a high quality image is generated using the quantum properties of light. A low quality detector picks up quantum information on the object shape and its temporal relations to reference fields. The reference fields may be recorded by the same imager (CCD, camera, etc.) that acts as a bucket detector (that is, it does not necessarily contain spatial information). Current imaging methods are limited to the quality of the detector looking at the object being imaged. A preferred embodiment generates an improved quality image of the object without the object being imaged in high resolution directly. The preferred method may be used in connection with photographs taken during turbulent conditions.

An alternate embodiment comprises computing the average overall intensity of a plurality of frames and arranging the frames into two sets. A first set contains the frames having frame intensities greater than the average overall intensity for all frames; the average overall intensity being the summation of the intensities for frames divided by the number of frames. The second set containing frames having an overall intensity less than the average overall intensity. Each of the first and second sets is processed by repeating steps (a) through (i). The result obtained using the second set of frames is then subtracted from the result obtained using the first set of frames to create the image.

Yet another embodiment includes a method for image improvement that comprises: providing a series of frames of a given region of interest; determining the value of each pixel within each frame to form a first array of pixel values; determining the integral of pixel values of each frame to form a second array of overall frame integrals; partitioning the first array into two sets based on a predetermined criteria; partitioning the second array into two sets based on a predetermined criteria; using the first and second sets of the first and second arrays to compute a conditional product term for each of the four combinations of the first and second sets of the first and second arrays; and combining the conditional product terms to provide an improved image of the region of interest.

And yet a further embodiment includes a method for image improvement comprising providing a series of frames of a given region of interest; determining the value of each pixel at each location within each frame to form a first array of pixel values for each frame; determining the overall intensity of each frame; determining the product of the overall intensity and the array of pixel values for each frame; determining the sum of the products by adding together the products of the overall frame intensity and first array of pixel values for each frame; determining the average of the sum of products by dividing the sum of products by the number of frames in the series of frames; determining the average value of each pixel at each pixel location for the series of frames to form a second array of average pixel values; determining the average overall frame intensity for the series of frames; determining a second product of the second array of average pixel values and the average overall frame intensity; subtracting the second product from the first product to provide an improved image of the region of interest; partitioning the improved image into at least two partitions based on a predetermined criteria; mathematically operating upon the partitioned improved image to increase image contrast or image clarity.

The current invention utilizes the ability to increase the image quality of an object as seen by a detector using methods relating to the Quantum nature of light. For example, when a low quality detector is aimed at an object, then a high quality image may be generated based on the quantum properties of light. The high quality image is generated even in the presence of turbulence which might otherwise be disruptive to image clarity. Scattering of quantum particles such as photons off the object carries information of the object shape even when the quantum particles such as photons do not go directly into the camera or detector. An additional low quality bucket detector (such as, for example, a detector lacking spatial information) records quantum information on the object shape and its temporal relations to collocated reference fields. The reference fields may be recorded by the same type of imager (CCD, Camera, etc.) that looks at the object and which act like bucket detectors in U.S. Pat. No. 7,536,012, referenced in the foregoing.

Current imaging methods are limited to the quality of the detector looking at the object being imaged. This invention enables an image quality improvement by using techniques developed in the course of Ghost Imaging experiments, and includes, but is not limited to, methods to generate a high quality image of the object without the object being imaged in high resolution directly; i.e., low resolution images may be enhanced, thereby enabling high quality imaging when only low quality images of the object are imaged directly.

Second Order Imaging

Imaging of a scene or subject is typically accomplished by mapping an illuminated scene or subject onto an image sensor where there is a light measurement component such as film, CCD, or other sensing device. Light consists of a plurality of photons that may be measured. The illuminating light may be from one or more light sources either natural or artificial, or both. Common sources of light include for example the sun, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. Although it is not absolutely necessary a lens is often used to perform this mapping. Imaging is often susceptible to adverse affects such as obscuration, turbulence, low signal to noise ratio such as when operating in low-light conditions, jitter, and noise. Often, this type of imaging is referred to as "First Order" imaging due to the time, ensemble, or mixed time-ensemble averaging of the sensors involved. For instance, a first-order light intensity image $I(x, y, t)$ can be produced by light interacting with a sensor for some time $\Delta t$, i.e. shutter or integration time. A single instance of this may be referred to as a "frame". Multiple frames of images, $I(x, y, t_i)$, may be averaged over some or all of the frames in a sequence of frames to generate an averaged first-order image of the subject $<I(x, y, t_i)>$ where $<>$ indicates an ensemble average. A second order image involves averages of products of two first-order intensity or normalized intensity measurements. An enhanced image results from the subtraction of products of averages of first order intensities from the average of the product of the intensities. An intensity or normalized intensity can be decomposed into a mean ($<I_1>$) plus a deviation from the mean or average ($\Delta I_1$).

Where $I_1$ and $I_2$ are intensities or normalized intensities measured by sensors 1 and 2, $I_1 = <I_1> + \Delta I_1$ and $I_2 = <I_2> + \Delta I_2$ with $I_1$ and $I_2$ being functions of space and time, i.e., x, y, t. $<I_1>$ is the ensemble average of intensity or normalized measurements of sensor 1 and $\Delta I_1$ is the deviation from the mean for the intensity or normalized intensity measurements of sensor 1. $<I_2>$ is the ensemble average of intensity or normalized measurements of sensor 2 and $\Delta I_2$ is the deviation from the mean for the intensity or normalized intensity measurements of sensor 2. The deviation is often called a fluctuation.

Mathematically the second-order enhanced image can be described by $<I_1 I_2> = <<I_1><I_2> + \Delta I_1 <I_2> + \Delta I_2 <I_1> + \Delta I_1 \Delta I_2>$. Simplifying this expression yields $<I_1 I_2> = <I_1><I_2> + <\Delta I_1 \Delta I_2>$.
Similarly $$\langle \Delta I_1 \Delta I_2 \rangle = \langle (I_1 - \langle I_1 \rangle)(I_2 - \langle I_2 \rangle) \rangle$$
$$= \langle I_1 I_2 - I_1 \langle I_2 \rangle - I_2 \langle I_1 \rangle + \langle I_1 \rangle \langle I_2 \rangle \rangle$$
$$= \langle I_1 I_2 \rangle - 2 \langle I_1 \rangle \langle I_2 \rangle + \langle I_1 \rangle \langle I_2 \rangle.$$

$$\langle \Delta I_1 \Delta I_2 \rangle = \langle I_1 I_2 \rangle - \langle I_1 \rangle \langle I_2 \rangle.$$

As an example, $I_1$ and $I_2$ may refer to intensities measured by at least two sensors where one of the sensors measures spatial information of the light ($I_1$) coming from the scene or subject (the "Reference" sensor) and the other sensor measures a quantity representative of the intensity ($I_2$) coming from the scene or subject, i.e. a "the bucket" sensor. One of the sensors may be a "virtual" sensor wherein, for instance, the representative intensity coming from the scene or subject is comprised of spatially integrating all or a selected subset of pixels on a CCD or CMOS camera or even consist of a single pixel from a CCD or CMOS camera. The enhanced image is contained in $<\Delta I_1 \Delta I_2>$ which has a $\delta$-function like correspondence between points on the object and points on the image sensor and is largely unaffected by the degrading effects of turbulence, obscuration, low signal to noise ratio such as when operating in low-light conditions, jitter, and noise. See for example, Meyers et al., "Turbulence-free ghost imaging," Appl. Phys. Lett. 98, 111115, 2011, herein incorporate by reference.

A preferred method for practicing the present invention may be correlated to the mathematical representations as follows. Expressed using the terms $I_1$ and $I_2$, a preferred method for image improvement comprises inputting a series of frames of an image; determining the value of each pixel at each location within each frame to form a pixel value array for each frame; summing the pixel values in each frame to obtain the frame intensity for each frame (correlates to determining $I_2$); multiplying the pixels in pixel value array by the frame intensity to produce a frame intensity multiplied pixel value array (correlates to determining the product $I_1 I_2$); summing the frame intensity multiplied pixel value arrays together and dividing by the number of frames to obtain an average of the frame intensity multiplied pixel value arrays (correlates to determining $<I_1 I_2>$); using the pixel value arrays, creating an array of average pixel values (correlates to determining $<I_1>$); determining the average frame intensity for the series of frames (correlates to determining $<I_2>$); multiplying the array of average pixel values by the average frame intensity for all of the inputted frames (correlates to the product $<I_1><I_2>$); and subtracting the array of average pixel values multiplied by average frame intensity ($<I_1><I_2>$); from the average of the frame intensity multiplied pixel value arrays (correlates to $<I_1 I_2>$) to provide an array of modified pixel values to form an improved image $<\Delta I_1 \Delta I_2>$ second order image (which, from the previously expresses mathematical equations correlates to the equation $<\Delta I_1 \Delta I_2>=<I_1 I_2>-<I_1><I_2>$).

Other preferred methods may include the normalizing of the intensity to produce an enhanced image. There are several ways to normalize intensity. One way is to divide the Reference pixel intensity values by a non-zero value "bucket" intensity, $J_1=I_1/I_2$. This normalization would give $J_1=<J_1>+\Delta J_1$ and $I_2=<I_2>+\Delta I_2$ with $J_1$ and $J_2$ being functions of space and time, i.e. x, y, t. Where $J_1$ and $I_2$ are normalized intensities and intensities measured by sensors 1 and 2. $<J_1>$ is the ensemble average of intensity or normalized measurements of sensor 1 and $\Delta J_1$ is the deviation from the mean for the normalized intensity measurements of sensors 1 and 2. $<I_2>$ is the ensemble average of intensity or normalized measurements of sensor 2 and $\Delta I_2$ is the deviation from the mean for the intensity or normalized intensity measurements of sensor 2. The deviation is often called a fluctuation.

Mathematically the second-order enhanced image can be described by $<J_1 I_2>=<<J_1><I_2>+\Delta J_1<I_2>+\Delta I_2<J_1>+\Delta J_1 \Delta I_2>$. Simplifying this expression yields $$<J_1 I_2>=<J_1><I_2>+<\Delta J_1 \Delta I_2>,$$

rearranging terms yields $$<\Delta J_1 \Delta I_2>=<J_1 I_2>-<J_1><I_2>$$

wherein the enhanced image is contained in $<\Delta J_1 \Delta I_2>$.

The enhanced image may be normalized by the product of the standard deviations of $I_1$ and $I_2$ to generate an enhanced image that displays the correlation of $I_1$ and $I_2$. Other alternative ways to normalize the enhanced image include dividing $<\Delta I_1 \Delta I_2>$ or $<\Delta I_1 \Delta I_2>$ by the product $<J_1><I_2>$ or $<I_1><I_2>$ respectively. A preferred embodiment of the current invention would comprise the subject area illumination being generated by one or more light sources which can be internal, external or a mixture of external and internal light sources. An example of an external light source would be the sun, coherent, incoherent, or partially coherent light illuminating the subject area generated by natural or artificial means indoors or out of doors propagating through any transmissive or partially transmissive media such as the air, water, or biological tissue. An example of an internal light source would be the subject emanating light in the infrared given off by atoms and molecules. Light received may be reflected, scattered, or emanated from the subject into at least one first receiver at predetermined time intervals. Light may be received at the at least one second receiver at corresponding time intervals from the light source which may be reflected or partially reflected from the subject and contains spatial information. The first and second receivers may be selected from, for example, one or more arrays of pixels from one or more cameras, imagers, CCDs, etc. In a preferred embodiment, the measured values are transmitted from the first and second receivers to the at least one processor. The measured values of the at least one first receiver are then correlated with the spatially resolved measurements of the at least one second receiver at the corresponding intervals of time. A first image of the subject is then created based upon the correlated measured values and spatial information by combining the spatial information from at least one second receiver at predetermined intervals of time with the measured values from at least one first receiver at the corresponding intervals of time. An enhanced second image of the subject is generated by removing the blurred, distorted or noisy averaged first-order image part from the first image. The first order image part may be removed by subtraction or other equivalent mathematical operation.

It is to be appreciated that the methods and techniques described in this invention can be applied to microscopy. Microscopy of biological samples in particular can be degraded by the transmission and scattering of light propagating through scattering and absorbing media that can significantly degrade the quality of the image. It is to be appreciated that substituting a microscope objective for a telescope as described in certain embodiment only alters the focal length of the optical system and does not affect the image enhancement properties of this invention.

Another embodiment would entail generating enhanced images using intensity products where more than two intensity measurements are available. This is especially useful for when the intensity deviations do not follow Gaussian statistics. This would involve simultaneous measurements of three or more sensors at a time. Our method would be applied to generate enhanced images of the form $<\Delta I_1 \Delta I_2 \Delta I_3>$, $<\Delta I_1 \Delta I_2 \Delta I_3 \Delta I_4>$, ..., $<\Delta I_1 \Delta I_2 \ldots \Delta I_N>$, This has application to the investigation of turbulence, finding of non-classical photon behavior and as a research tool exploring higher order correlation statistics, the investigation of the fundamental nature of quantum physics such as non-local correlations, Bell inequalities, and EPR effects.

Referring now to FIG. 1, in accordance with one preferred embodiment, in Box 1 a series of frames are inputted into the memory or input of a processor or image processor. The frame may be composed on a plurality of pixels, typically in a two-dimensional (2D) array, that together form an image. Exemplary frames may be electronic image data such a TIFF or JPEG file. As used herein the terminology "processor" or "image processor" as used in the following claims includes a computer, multiprocessor, CPU, minicomputer, microprocessor or any machine similar to a computer or processor which is capable of processing algorithms. The frames may comprise photographs of the same region of interest. The region of interest may be a scene, landscape, an object, a subject, person, or thing. In Box 2, the frame data or value of each pixel at each pixel location is determined for a frame. In Box 3, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. At Box 4, the values in Box 2 are multiplied by the value determined in Box 3. Box 5 represents the Frame Data×Intensity Product for the frame. Inasmuch as the Frame Data is an array of pixel values, the Frame Data×Intensity Product is also an array of values. At Box 6, the products of Box 5 (Frame Data×Intensity Product) are repeated for each frame in a selected plurality of frames. As an example, one hundred frames may be selected. At Box 7, the summation of the Frame Data×Intensity Products for the plurality of frames determined in Box 6 is divided by the number of frames (such as for example one hundred) to determine the Frame Data×Intensity Product Average for the plurality of frames. As noted in Box 7, this Product Average is an array containing pixel values at each pixel location within the frame.

Figure 2:
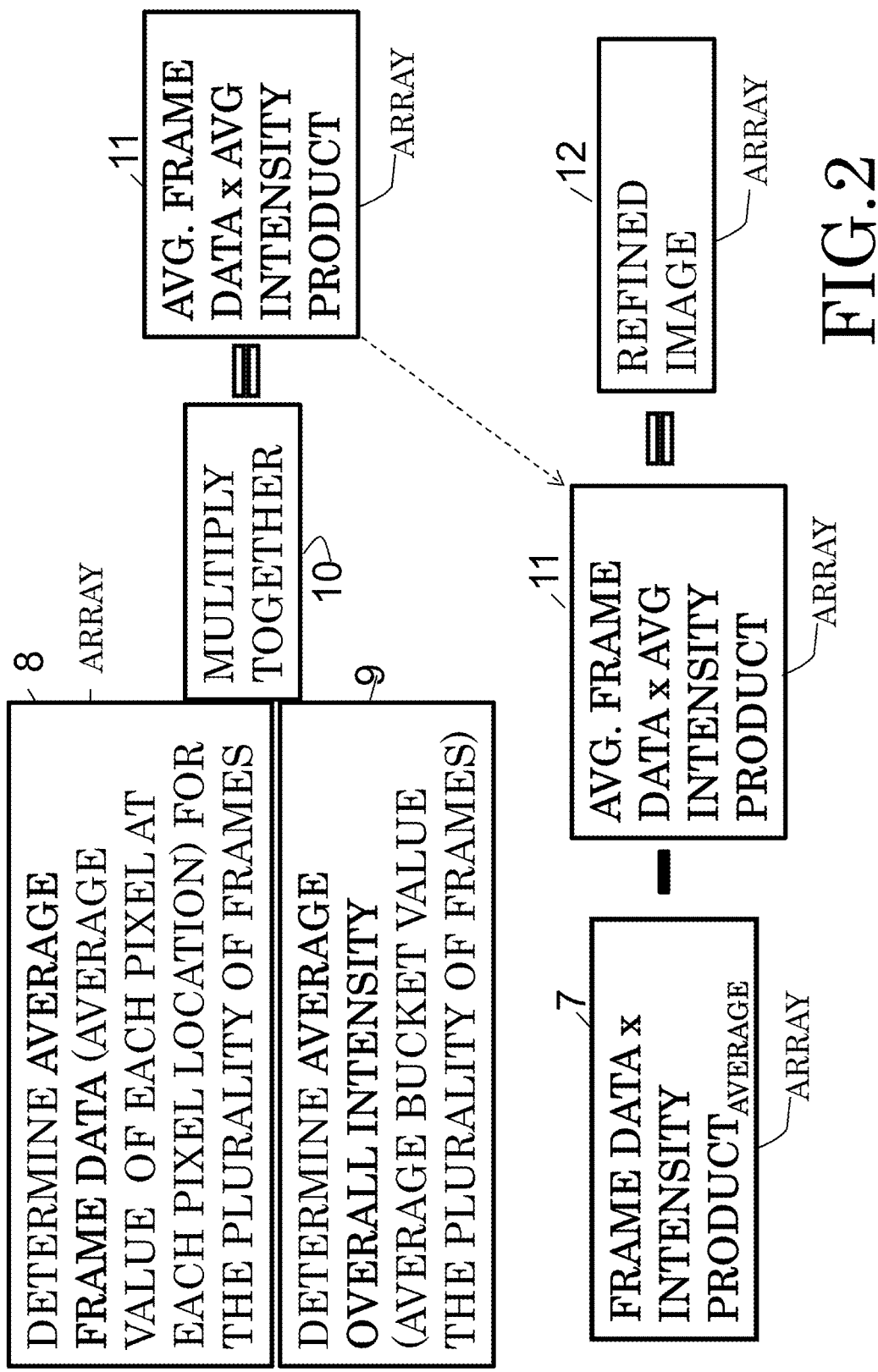
FIG. 2 is a schematic block diagram illustration of the steps for performing a preferred method of the present invention. Taken together, FIGS. 1 and 2 outline the steps of a preferred methodology for the present invention.

FIG. 2 is a further description of a methodology of the present invention. Note that Box 7 is carried over from FIG. 1 into FIG. 2. In Box 8, the average frame data (or average value of each pixel at each pixel location) is determined for the plurality of frames (e.g. 100) by averaging the pixel values at each pixel location for the plurality of frames to determine an array of average pixel values. In Box 9, the average overall intensity for the plurality of frames is determined. The is similar to the determination of Box 3 except that Box 3 is a determination for a frame and Box 9 is an average for a plurality of frames. As stated with respect to Box 3, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8 and 9 to form the Average Frame Data×Average Intensity Product, which is an array. As shown in the bottom portion of FIG. 2, the Average Frame Data×Average Intensity Product is subtracted from the Frame Data×Intensity Product Average to form the refined image of Box 12.

It is postulated that the preferred methodology in effect subtracts out or negates the effects or errors due to the effects of turbulence or the like. Most fluctuations caused by turbulence occur at the "edges" of objects. The algorithm focuses on the edges of letters, objects, etc. to refine the image edges.

Figure 3:
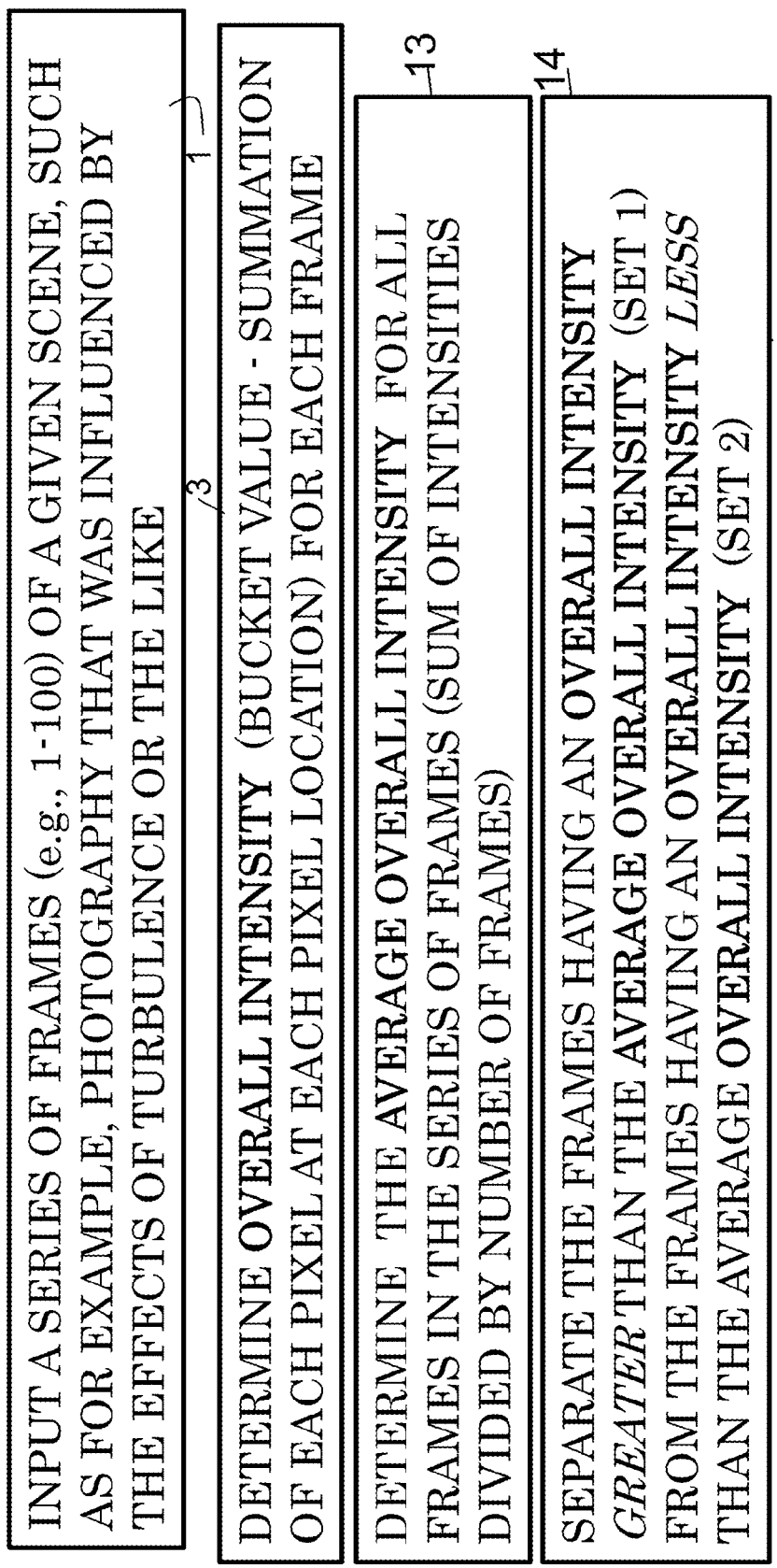
FIG. 3 is a partial schematic block diagram illustration of the steps for performing an alternate preferred method of the present invention in which steps for dividing the frames into two sets are illustrated.

FIG. 3 is a partial schematic block diagram illustration of the steps for performing an alternate preferred method of the present invention in which steps for dividing the frames into two sets are illustrated. In Box 1 a series of frames are inputted into the memory or input of a processor or image processor. The frames may comprise photographs of the same region of interest. The region of interest may be a scene, landscape, an object, a subject, person, or thing. In Box 3, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In Box 13, the average overall intensity for all frames in the inputted (see Box 1) is computed. To determine the average overall intensity, the summation of the intensities for frames is divided by the number of frames. In Box 14, the frames are separated into two sets; set one contains frames having an overall intensity greater than the average overall intensity (derived in Box 13) and set two contains frames having an overall intensity less than the average overall intensity (derived in Box 13)

Figure 4:
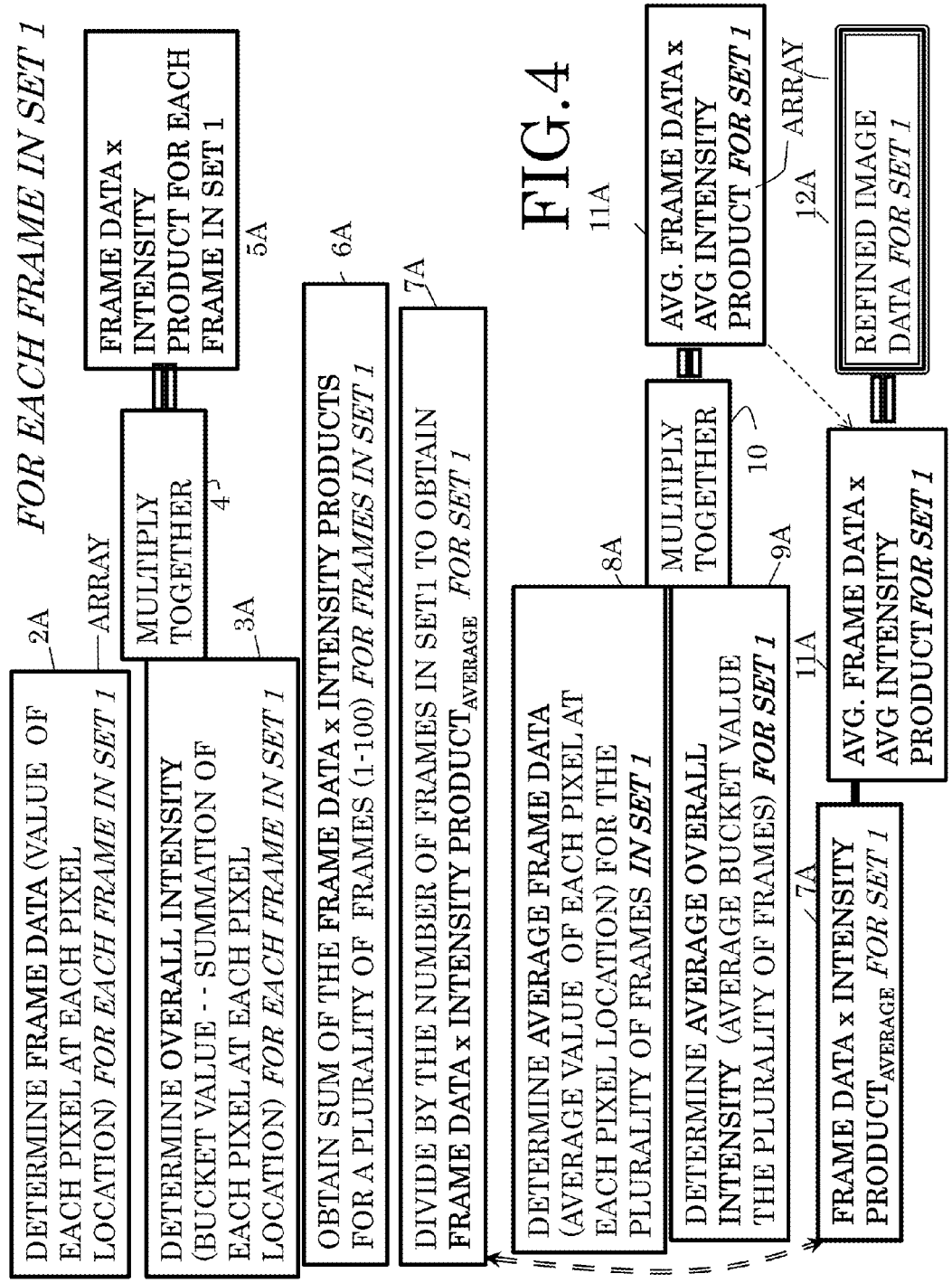
FIG. 4 is a partial schematic block diagram illustration of the steps for performing an alternate preferred method of the present invention in which steps performed on the first set of frames are illustrated.

FIG. 4 is a partial schematic block diagram illustration in which steps performed on the first set of frames are illustrated. The figure shows how to generate a first set of data which is referred to here at SET 1. SET 1 frame set includes frames having an overall intensity greater than the average overall intensity. The steps are comparable in effect to the similarly numbered frames in FIGS. 1 and 2, as denoted by the addition of a letter "A" suffix to the correlating element number. In Box 2A, the frame data or value of each pixel at each pixel location is determined for a frame. In Box 3A, the overall intensity ("bucket value") of the frame is determined. In the case of a picture, the overall intensity correlates to the sum of the reflected illumination. In the case of an electronic display formed by pixels, the overall intensity is the summation each pixel value at each pixel location within a given frame. At Box 4, the values in Box 2A are multiplied by the value determined in Box 3A. Box 5A represents the Frame Data×Intensity Product for the frame. Inasmuch as the Frame Data is an array of pixel values, the Frame Data×Intensity Product is also an array of values. At Box 6A, the products of Box 5A (Frame Data×Intensity Product) are repeated for each frame in the first set of frames. At Box 7A, the summation of the Frame Data×Intensity Products for the plurality of frames determined in Box 6A is divided by the number of frames (such as for example one hundred) to determine the Frame Data×Intensity Product Average for the first set of frames. As noted in Box 7A, this Product Average is an array containing pixel values at each pixel location within the frame.

In the lower portion of FIG. 4, note that Box 7A is repeated as shown by the arrow. In Box 8A, the average frame data (or average value of each pixel at each pixel location) is determined for the first set of frames by averaging the pixel values at each pixel location for the first set of frames to determine an array of average pixel values for the first set. In Box 9A, the average overall intensity for the first set of frames is determined. This is similar to the determination of Box 3A except that Box 3A is a determination for a frame and Box 9A is an average for a plurality of frames. As stated with respect to Box 3A, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8A and 9A to form the Average Frame Data×Average Intensity Product, which is an array. As shown in the bottom portion of FIG. 4, the Average Frame Data×Average Intensity Product is subtracted from the Frame Data×Intensity Product Average to form the refined image of Box 12A.

Figure 5:
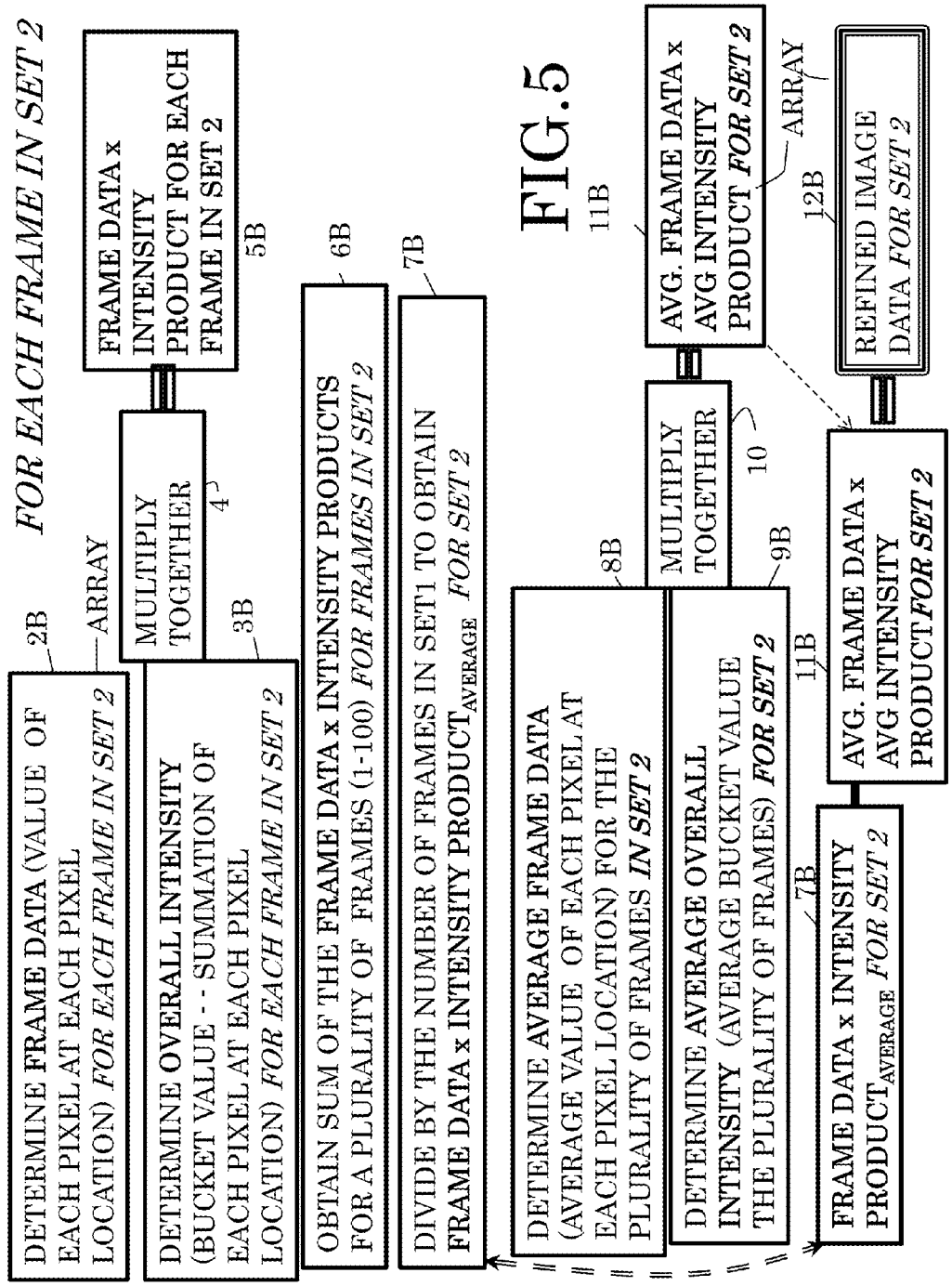
FIG. 5 is a partial schematic block diagram illustration of the steps for performing an alternate preferred method of the present invention in which steps performed on the second set of frames are illustrated.

FIG. 5 is a partial schematic block diagram illustration of the steps for performing an alternate preferred method of the present invention in which steps performed on the second set of frames are illustrated. The figure shows how to generate a second set of data which is referred to here at SET 2. The SET 2 frame set includes frames having an overall intensity less than the average overall intensity.

The steps are comparable in effect to the similarly numbered frames in FIGS. 1, 2, and 4 as denoted by the addition of a letter "B" suffix to the correlating element number. In Box 2B, the frame data or value of each pixel at each pixel location is determined for a frame. In Box 3B, the overall intensity ("bucket value") of the frame is determined. In the case of a picture, the overall intensity correlates to the sum of the reflected illumination. In the case of an electronic display formed by pixels, the overall intensity is the summation each pixel value at each pixel location within a given frame. At Box 4, the values in Box 2B are multiplied by the value determined in Box 3B. Box 5B represents the Frame Data×Intensity Product for the frame. Inasmuch as the Frame Data is an array of pixel values, the Frame Data×Intensity Product is also an array of values. At Box 6B, the products of Box 5B (Frame Data×Intensity Product) are repeated for each frame in a second set of frames. At Box 7B, the summation of the Frame Data×Intensity Products for the plurality of frames determined in Box 6B is divided by the number of frames (such as for example one hundred) to determine the Frame Data× Intensity Product Average for the second set of frames. As noted in Box 7B, this Product Average is an array containing pixel values at each pixel location within the frame.

In the lower portion of FIG. 5, note that Box 7B is repeated as shown by the arrow. In Box 8B, the average frame data (or average value of each pixel at each pixel location) is determined for the first set of frames by averaging the pixel values at each pixel location for the first set of frames to determine an array of average pixel values for the first set. In Box 9B, the average overall intensity for the second set of frames is determined. This is similar to the determination of Box 3B except that Box 3B is a determination for a frame and Box 9B is an average for a plurality of frames. As stated with respect to Box 3B, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8B and 9B to form the Average Frame Data×Average Intensity Product, which is an array. As shown in the bottom portion of FIG. 5, the Average Frame Data×Average Intensity Product is subtracted from the Frame Data×Intensity Product Average to form the refined image of Box 12B.

Figure 6:
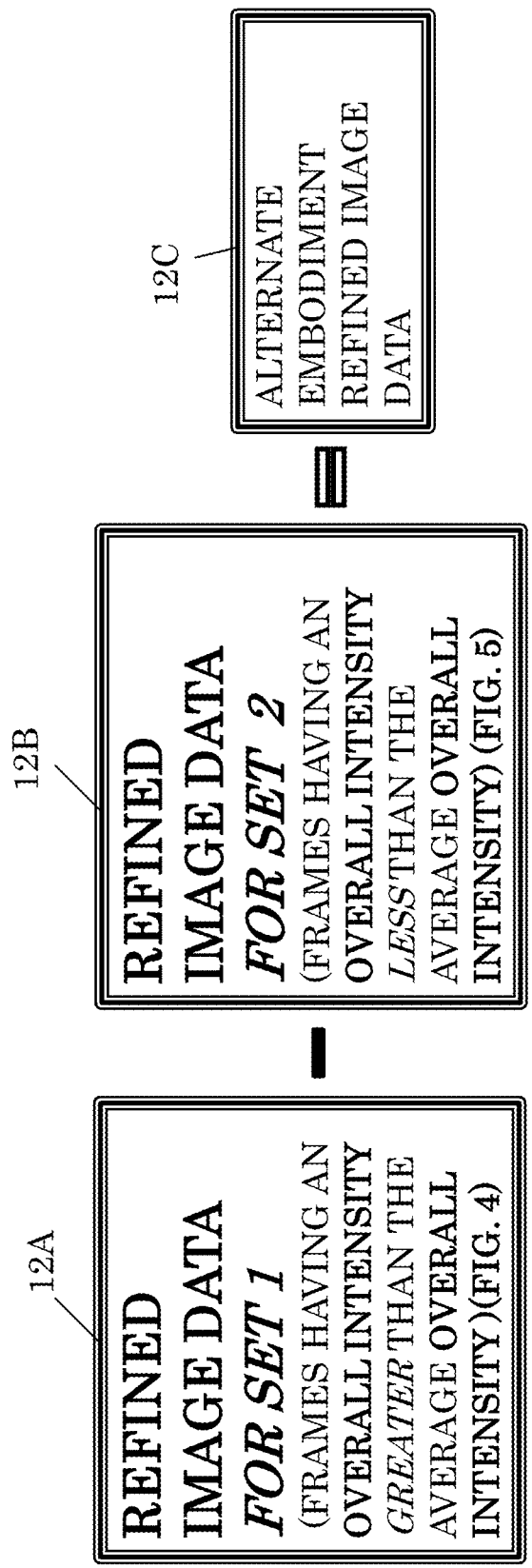
FIG. 6 is a partial schematic block diagram illustration of the steps for performing an alternate preferred method of the present invention in which the refined image data for the second set is subtracted from the refined image data for the first set.

FIG. 6 is a partial schematic block diagram illustration of the steps for performing an alternate preferred method of the present invention in which the refined image data for the second set is subtracted from the refined image data for the first set to form enhanced image data (Box 12C).

Another alternate preferred method of the present invention applies the use of techniques from the field of Compressive Imaging or Compressive Sensing. In this embodiment the "bucket" values for each frame of the series is computed by integrating the values of the pixels within each frame. This bucket data is stored for use per Eq. 5 below. The pixel values for each frame of the series are stored as a row in a matrix J. The improved image is computed by application of a Compressive Imaging inversion algorithm such as GPSR to solve Eq. 6. The improved image is returned in the matrix R.

Virtual Ghost Imaging

Virtual Ghost Imaging refers to an imaging process which creates an enhanced image from a series of frames of an imaging subject based on a process related to Ghost Imaging.

Virtual Ghost Imaging in the current instance applies the following process to a series of frames of an imaging subject. Inasmuch as the overall frame intensity value determined in Box 3 correlates to the "bucket" value, a brief discussion of ghost imaging and reflective ghost imaging follows. Typically ghost imaging uses two detectors, one to observe the light source and the other, single pixel or bucket detector, to observe the light scattering and reflecting from the target object.

$$G^{(2)} = \langle I(x,y,t)_{source} I(t)_{bucket} \rangle - \langle I(x,y,t)_{source} \rangle \langle I(t)_{bucket} \rangle \tag{1}$$

where $\langle \ \rangle$ denotes an ensemble average. If $I_{source}$ and $I_{bucket}$ are recorded from the same target object, $I_{bucket}$ may be computed as $$I(t) = \int dx dy I(x,y,t) source \tag{2}$$

Basic Virtual Ghost Imaging

Results of an experiment conducted through turbulence using chaotic laser or pseudo-thermal light are presented in FIG. 7. FIG. 8 shows the same target computed with data taken using a typical two path configuration.

FIG. 8 shows the average of the target images that were captured through turbulence. Note the blurriness and lack of definition of the letters. As one can see the "ARL" in FIG. 7 is a visually better image than that displayed FIG. 9. However, the "true" ghost image displayed in FIG. 8 has better contrast and definition of the letters than FIG. 7 or FIG. 9. This is likely due to the use of a reference field that has not been altered by interaction with a target object.

Accelerated (Compressive Imaging) go Virtual Ghost Imaging

A relatively new mathematical field named Compressive Sensing (CS) or Compressive Imaging (CI) can be used to good effect within the context of ghost imaging. The first use of compressive techniques in the context of Ghost Imaging was performed by the Katz group (see O. Katz, et al., "Compressive Ghost Imaging," Appl. Phys. Lett., 95, 131110 (2009))(hereby incorporated by reference) who demonstrated a ghost like imaging proposal of Shapiro (see J. Shapiro, "Computational Ghost Imaging," Phys. Rev. A 78 061802(R) (2008)). Their demonstration was limited to a transmission object.

More recently the present inventors have performed experiments of this nature using reflection objects.

The inventors' use of CS and CI is based on finding approximate solutions to the integral equations using the GPSR mathematical methodology where $$JR = B \tag{3}$$

and $$R = R(x,y) \tag{4}$$

is the object reflectance. The term J is a matrix, where the rows are the illumination patterns at time k and the B vector:

$$B = [B_k] \tag{5}$$

represents the bucket values. In cases where the system is underdetermined (too few $[B_k]$), then $L_1$ constraints are applied to complete the system and sparseness is $$\arg\min_R = \frac{1}{2}\|B - JR\|_2^2 + \tau\|R\|_1 \tag{6}$$

The CS computational strategy takes advantage of the fact that it is normally true in images that not all pixels in an image contain new information and the system is said to be sparse on some basis since fewer degrees of freedom are needed to describe the system than the total number of pixels in the image. Data used to reconstruct an image can be referred to as sparse image data or sparse data. The parameter $\tau$ is often a constant.

Compressive imaging (CI) results for the ARL target are presented using Eq. 2 and varying the $\tau$ parameter. FIG. 10 is an example of a result where $\tau$ is too large and most of the pixel values are driven to 0. One can sense that the letters "ARL" are in the figure. Decreasing $\tau$ to a value of 5e7, shown in FIG. 11 more portions of the "ARL" letters appear. When $\tau$ is set to 2.5e7 the R is quite clear in FIG. 12 but the appearance of the A and the L are still degraded. Continuing with the examination of the effect of the parameter $\tau$, the value of $\tau$ is set to 1e7. These results are shown in FIG. 13.

Finally, as a lower image quality bound, $\tau$ is set to equal 1e6. The "ARL" presented in FIG. 14 is quite degraded. These GPSR calculated Virtual Ghost imaging results highlight the sensitivity of the calculations to an external parameter (τ) which has no connection to the underlying physics.

Air Force Resolution Target

Results were computed using Eq. 1 subject to the self-bucketing concept of Eq. 2. These results are generated from a few hundred shots of the Air Force resolution target imaged at a 100 m distance through turbulence.

Figure 16:
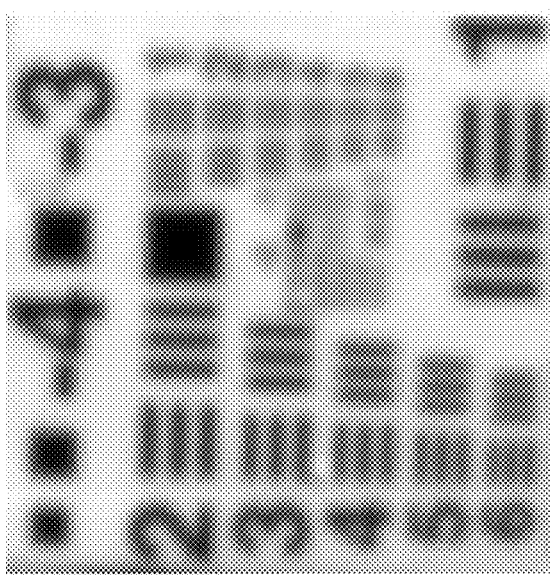
FIG. 16 is an illustration of an average of 335 frames.

A single image from this data set is presented in FIG. 15. This image illustrates the distorting effect of turbulence on imaging. A simple averaging of 335 frames of the dataset that was performed is shown in FIG. 16. This average image has some better qualities that the single frame image of FIG. 15 but one can still only resolve the coarser scale features of the Air Force target.

Figure 17A:
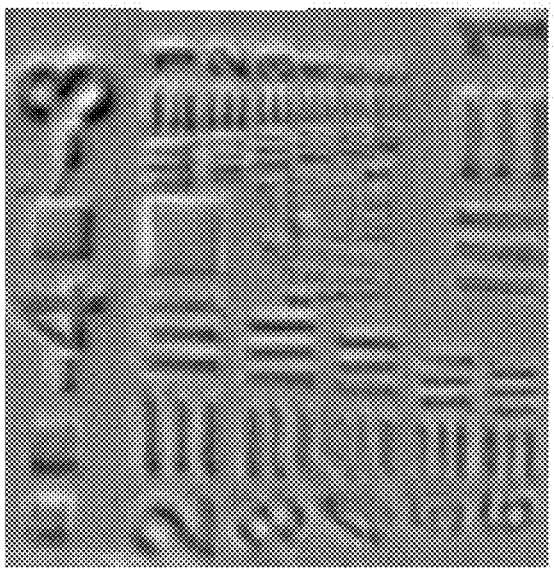
FIG. 17A is an illustration of an image formed utilizing the Ghost imaging concept using 2 frames taken at a distance of 100 m through turbulence.
Figure 17B:
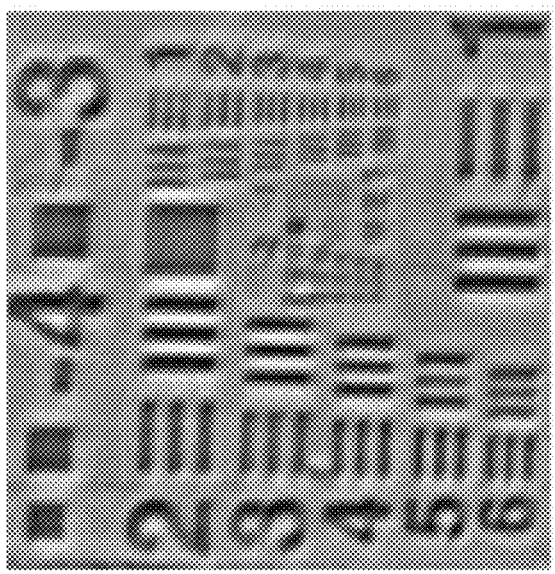
FIG. 17B is an illustration of an image formed using 335 frames; "Self Bucket G(2), 100 m distance through turbulence.

Using the self-bucket ghost imaging concept on this dataset, an initial result using only 2 frames of the dataset is displayed in FIG. 17A. Some of the edges in this image are very distinct and superior to areas in either the instantaneous or the average images. When the entire dataset is used, as presented in FIG. 17B, the results are striking. In particular the 4 and 5 on the right side of the target are legible and the small horizontal and vertical bars to the left of the numbers are distinct; whereas those regions in the instantaneous and average images are simply blurs.

Figure 18:
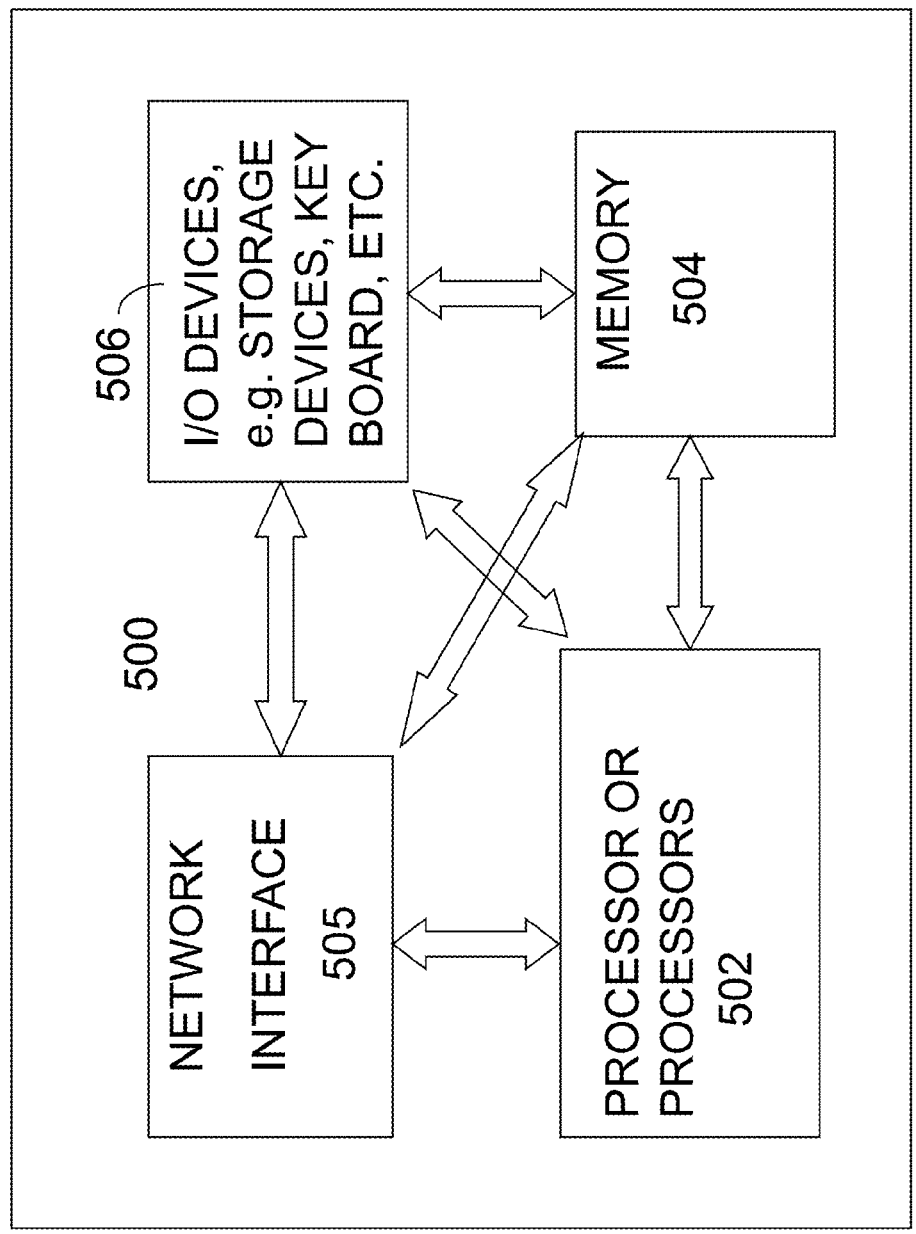
FIG. 18 depicts a high level block diagram of a general purpose computer configured to implement embodiments of the present invention.

FIG. 18 depicts a high level block diagram of a general purpose computer suitable for use in performing the functions described herein, including the steps shown in the block diagrams, schematic representations, and/or flowcharts in the various embodiments disclosed throughout this application. As depicted in FIG. 18, the system 50 includes a processor element 52 (e.g., a CPU) for controlling the overall function of the system 50. Processor 52 operates in accordance with stored computer program code, which is stored in memory 54. Memory 54 represents any type of computer readable medium and may include, for example, RAM, ROM, optical disk, magnetic disk, or a combination of these media. The processor 52 executes the computer program code in memory 54 in order to control the functioning of the system 50. Processor 52 is also connected to network interface 55, which transmits and receives network data packets. Also included are various input/output devices 56 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like).

Further Improvement Embodiments

In a preferred embodiment there is provided a method to partition the values in the measured data sets, i.e. frames, into two or more groups for the frame data (reference fields) and overall frame intensities (bucket values). These groups are then used to compute products, or cross-correlations, between the different groupings. These individual product terms can be mathematically combined, via addition and/or subtraction processes, to generate improve images of the target or scene. This method further adapts the techniques presented in the parent application. One key advantage to this method is that it is possible with the following embodiments to generate all positive valued images and largely eliminate background and noise effects. Other advantages include the ability to operate on a computed partitioned image using functions such as logarithms and exponentials to further increase contrast or better identify objects and information on their properties.

The following embodiments are predicated on the appreciation that other operations involving the partitioned sets of above average and below average measurements are beneficial to improve image quality in adverse conditions such as turbulence. These operations would include but are not limited to cross-correlations between above average bucket (overall frame intensities) and below average reference fields. Typically four correlation types are available when data is partitioned into two distinct sets such as above the average and below the average values. In a non-normalized form this can be written as $$R_m = \frac{1}{N_M}\sum_1^{N_M} I_a I_b \quad (7)$$

where $R_m$ is proportional to the correlation between the two data sets $I_a$ and $I_b$. $N_M$ is the number of elements in the data sets being considered. The subscript "m" indicates that the correlation R is about the mean or average. Normalization is usually accomplished by dividing the $R_m$ by $\sigma_{I_a}$ the standard deviation of $I_a$ and $\sigma_{I_b}$ the standard deviation of $I_b$, $$RN_m = \frac{R_m}{\sigma_{I_a}\sigma_{I_b}}. \quad (8)$$

The data sets $I_a$ is the set of pixel measurements and $I_b$ is the set of bucket measurements are used in the current invention as the deviations from the average or mean.

$$I_a = (M_a - \langle M_a \rangle) \quad (9a)$$

$$I_b = (M_b - \langle M_b \rangle) \quad (9b)$$

where the M's indicate the measurement, either an individual pixel value or the bucket value and the $\langle\,\rangle$ indicates and average over the ensemble of the measurements. Please amend paragraph [0013] as follows.

The product terms that comprise a particular $R_m$ are computed conditionally. The $R_m$ can be called conditional product terms. For instance, $R_m$ may be computed for the set of pixel values $I_a$ that are above the mean for those frames of data with bucket values $I_b$ that are above the mean. For example:

$$R_m^{++} = \frac{1}{N_m^+}\sum_1^{N_m^+} I_a^+ I_b^+ \quad (10)$$

The other combinations of above/below mean pixel values and above/below mean bucket values are computed similarly. These conditional $R_m$ may then be added or subtracted from each other to yield improved images of a scene or target. Furthermore, it should be noted that the particular combination of the $R_m$ below $$R_m^{++} + R_m^{--} - R_m^{+-} - R_m^{-+} \quad (11)$$

is always positive.

Another alternative embodiment may include computing a $G^{(2)}$ improved image. This improved image is then partitioned into pixels that are, for example, above the spatial mean $G^{(2)}$ and pixels that are below the spatial mean $G^{(2)}$. These alternative positive/negative $G^{(2)}$ partitioned improved images can display higher contrast and can be further operated upon by using mathematical operations such as logarithms to increase the dynamic range. It is to be recognized that other partitions are possible to tailor results needed for specific applications.

Another alternative embodiment may include computing a $R_m$ correlation image by calculating the correlation coefficient between the $I_a$ and $I_b$ partitions where the $I_a$ and $I_b$ are not aligned in time or frame. For instance, at a particular pixel i,j there may be 10 frames in which that pixel is above the mean value of that pixel for all frames, and there may only be say 5 frames for which the $I_b$ values is above the mean of $I_b$. A correlation coefficient may be computed between these two sets of data using:

$$R(i, j) = \frac{C(i, j)}{\sqrt{C(i, i)C, (j, j)}} \quad (12)$$

where R(i,j) is the correlation coefficient between variables i and j. C indicates a covariance calculation between the variables i and j. The data sets are forced to be the same length, as required by the above R(i,j) process, by simply setting N to be the length of the data set with fewer elements and then taking the first N values of the data set that has a greater number of elements. This can lead to cross-time correlations that may prove useful for certain applications. The method of calculating the values of R(i,j) may also use the processes outlined above.

Combinations of Conditional Product Terms

As an example, for imaging measurements of pixel values and bucket values that have been grouped into two sets each of above and below their respective averages, there is a total of 80 possible ways to present for output the results of the computed conditional product terms. For instance, each conditional product term may be presented for display individually with either a positive or negative sign. Thus, individually for the four conditional product terms there is a total of 8 ways to present them for display. Combinations of two conditional product terms with signs allows for 24 options to present for display, combinations of three conditional product terms allows for 32, and combinations of all four conditional product terms allows for 16 ways to present for output and display.

Further Improvement Embodiments

Figure 19A:
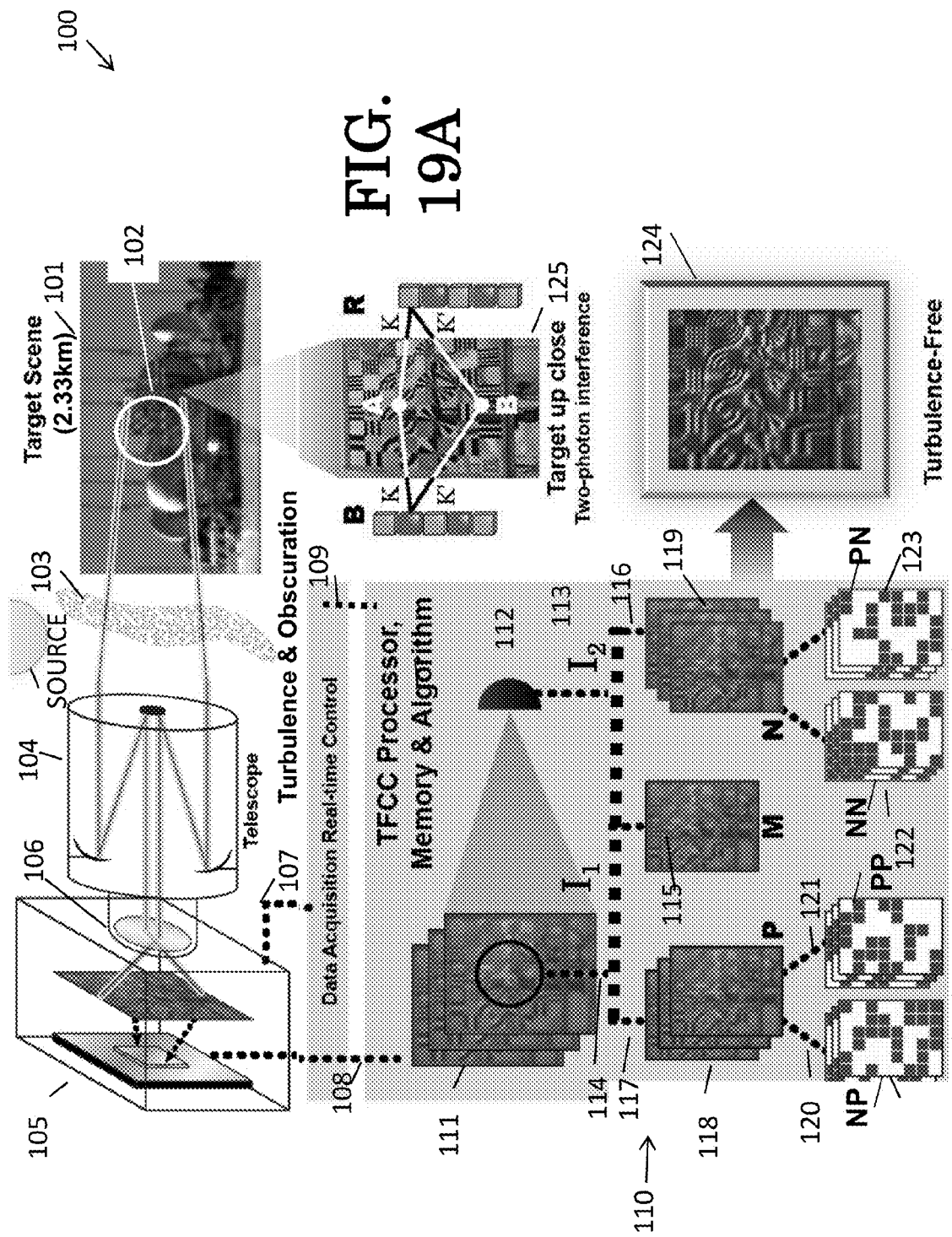
FIG. 19A is a schematic block diagram of an alternate preferred embodiment, which may include, for example, a turbulence-free color camera 105.
Figure 19B:
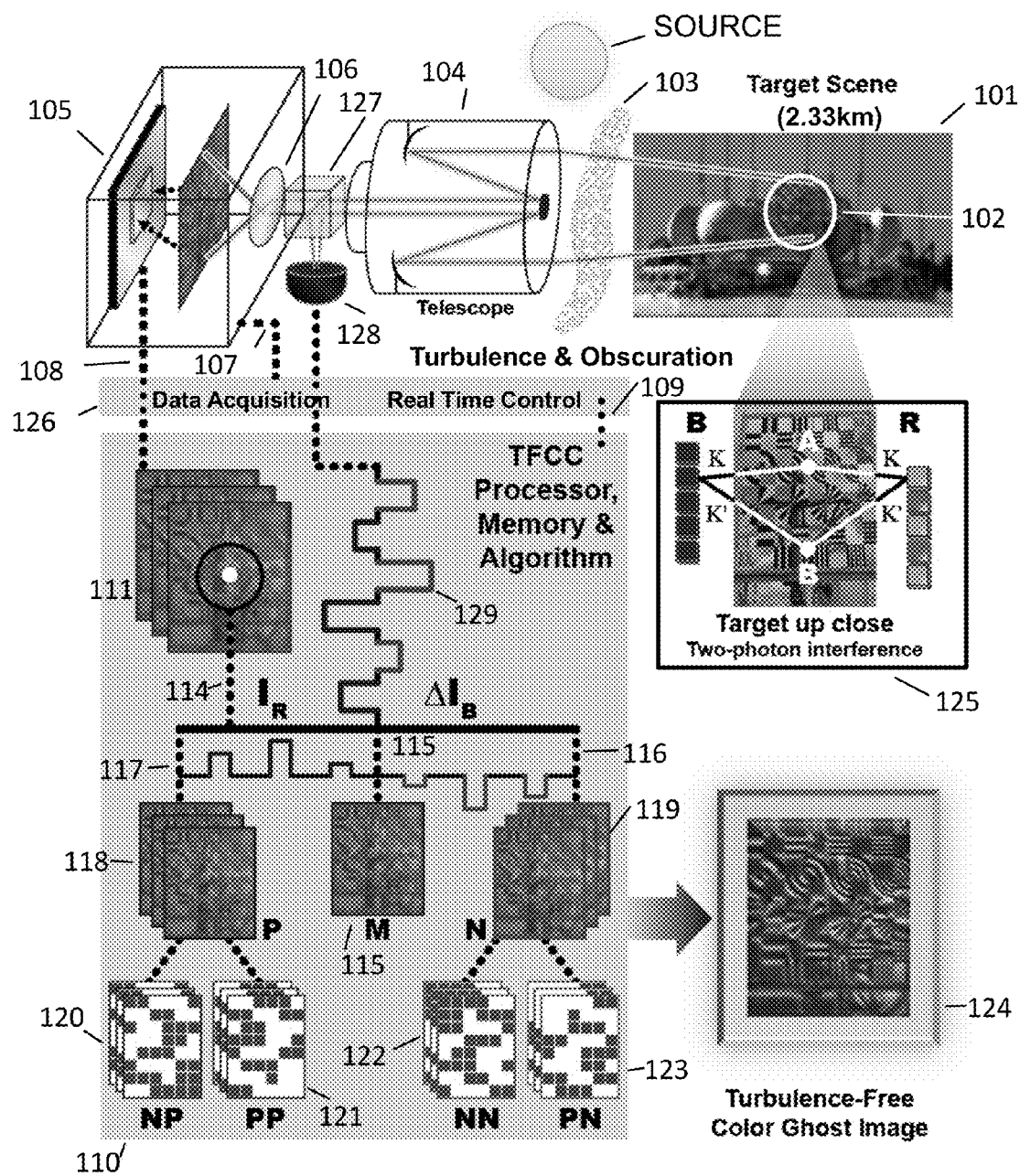
FIG. 19B is a schematic block diagram of an alternate preferred embodiment similar to FIG. 19A comprising, inter alia, a channel 129 for transferring the measured bucket values to the processor, turbulence-free color camera 105, a spatial information resolving sensor, a single pixel sensor and a beam splitter.

FIGS. 19A and 19B are schematic block diagrams of alternate embodiments that provide a method to partition the values in the measured data sets, i.e. frames, into two or more groups for the frame data (reference fields) and overall frame intensities (bucket values). These groups are then used to compute products, or cross-correlations, between the different groupings. These individual product terms can be mathematically combined, via addition and/or subtraction processes, to generate improve images of the target or scene. This method further adapts the techniques presented in the parent application. One key advantage to this method is that it is possible with the following embodiments to generate all positive valued images and largely eliminate background and noise effects. Other advantages include the ability to operate on a computed partitioned image using functions such as logarithms and exponentials to further increase contrast or better identify objects and information on their properties.

FIG. 19A illustrates a diagram of alternate preferred embodiment 100, that generates enhanced averaged second-order images or movies of a region of interest. Note, the region of interest may emit photons that are not reflected or scattered photons from some other photon source. A photon source (labeled source) may include, for example, the sun, moon, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. The distant target scene 101 comprises a target 102 which is an area used of the distant target scene for the particular region of interest developed for image testing. The element 103 represents optionally present turbulence or other obscuring or image degrading effects along photon path between light source and target, and light source and imaging system or photon measurement devices or components. Light from the telescope 104 (although other apparatus or direct viewing may be used without departing from the scope of the invention) is focused by a lens 106 and an image is formed within the camera 105. Telescope 104 may zoom in on or expand view of the selected region of interest. An image or photon measurement device 105 may be for example, a camera. Lens 106 couples the telescope 104 to image or photon measurement device 105. The assembly 100 may optionally include a Barlow type lens for increased magnification of the region of interest. Control line 107 enables e real-time control of data acquisition. Data transfer channel 108 extends from image or photon measurement device 105 to the processor 110. The communications channel 109 extends between processor 110 and data acquisition and real-time control 126. The processor, memory, and algorithms to generate enhanced average second-order images of the region of interest are represented by the shaded area labeled 110. Representative frames 111 of image data are measured by measurement device 105. Virtual bucket detector 112 represents where the "bucket" values are computed from the measured frame data by spatially summing specified pixel values. Software or hardware communications channel 113 transfers bucket information between processor 110 or on the same processor; Software or hardware communications channel 114 transfers bucket information between processors or on the same processor. Memory portion 115 represents the computation and storage of the pixel average image and the average bucket value and computes pixel deviations of the pixel value from the average pixel value and computes bucket deviations from the average bucket value. Image sets 118 and 119 represent partitions of spatially addressable pixel images into positive and negative bucket deviation groups. Image memory portion or image set 119 represents the grouping of negative value bucket deviation reference image frames. Image memory portion or image set 117 represents the grouping of positive value bucket deviation reference image frames. Image memory portion or image set 118 represents the grouping of positive and negative valued pixel deviations for reference frames that have positive valued bucket deviations. Image memory portion or image set 119 represents the grouping of positive and negative valued pixel deviations for reference frames that have negative valued bucket deviations. Image memory portion or image set 120 represents the collecting and averaging the product of negative value pixel deviations and positive value bucket deviations for corresponding frames. Image memory portion or image set 121 represents the; collecting and averaging the product of positive value pixel deviations and positive value bucket deviations for corresponding frames. Image memory portion or image set 122 represents the collecting and averaging the product of negative value pixel deviations and negative value bucket deviations for corresponding frames. Image memory portion or image set 123 represents the collecting and averaging the product of positive value pixel deviations and negative value bucket deviations for corresponding frames. Representation of an enhanced image 124 comprises addition, subtraction, normalization or other mathematical operations of the computed values of image sets 120, 121, 122, and 123. Block 125 indicates some of the physics for the display of the enhanced average second-order image of the region of interest. The block 125 is a depiction of the physics of a two-photon interference process where sub-sources are at A and B respectively and detection is at B and R elements wherein the lines represent two alternate but indistinguishable paths where a photon of sub-source A goes to detector R and a photon of sub-source B goes to detector B or a photon from sub-source A goes to detector B and a photon of sub-source B goes to detector R to achieve a joint detection. Block 126 comprises: data acquisition and real-time control electronics.

FIG. 19B illustrates a diagram of alternate preferred embodiment 100, that generates enhanced averaged second-order images or movies of a region of interest. Note, the region of interest may emit photons that are not reflected or scattered photons from some other photon source. A photon source (labeled source) may include for example the sun, moon, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. The distant target scene 101 comprises a target 102 which is an area used of the distant target scene for the particular region of interest developed for image testing. The element 103 represents optionally present turbulence or other obscuring or image degrading effects along photon path between light source and target, and light source and imaging system or photon measurement devices or components. Light from the telescope 104 (although other apparatus or direct viewing may be used without departing from the scope of the invention) is focused by a lens 106 and an image is formed within the camera 105. Telescope 104 may zoom in on or expand view of the selected region of interest. An image or photon measurement device 105 may be for example, a camera. Lens 106 couples the telescope 104 to image or photon measurement device 105. The assembly 100 may optionally include a Barlow type lens for increased magnification of the region of interest. Beam splitter 127 operates to split the beam off to bucket detector 128 which is connected to channel 129 which interconnects with image memory portion or set 115, which represents the computation and storage of pixel image values. Thus, channel 129 operates to pass the measured bucket values to the processor for computation of the average bucket value. Control line 107 enables e real-time control of data acquisition. Data transfer channel 108 extends from image or photon measurement device 105 to the processor 110. The communications channel 109 extends between processor 110 and data acquisition and real-time control 126. The processor, memory, and algorithms to generate enhanced average second-order images of the region of interest are represented by the shaded area labeled 110. Representative frames 111 of image data are measured by measurement device 105. Virtual bucket detector 112 represents where the "bucket" values are computed from the measured frame data by spatially summing specified pixel values. Software or hardware communications channel 113 transfers bucket information between processor 110 or on the same processor; Software or hardware communications channel 114 transfers bucket information between processors or on the same processor. Memory portion 115 represents the computation and storage of the pixel average image and the average bucket value and computes pixel deviations of the pixel value from the average pixel value and computes bucket deviations from the average bucket value. Image sets 118 and 119 represent partitions of spatially addressable pixel images into positive and negative bucket deviation groups. Image memory portion or image set 119 represents the grouping of negative value bucket deviation reference image frames. Image memory portion or image set 117 represents the grouping of positive value bucket deviation reference image frames. Image memory portion or image set 118 represents the grouping of positive and negative valued pixel deviations for reference frames that have positive valued bucket deviations. Image memory portion or image set 119 represents the grouping of positive and negative valued pixel deviations for reference frames that have negative valued bucket deviations. Image memory portion or image set 120 represents the collecting and averaging the product of negative value pixel deviations and positive value bucket deviations for corresponding frames. Image memory portion or image set 121 represents the; collecting and averaging the product of positive value pixel deviations and positive value bucket deviations for corresponding frames. Image memory portion or image set 122 represents the collecting and averaging the product of negative value pixel deviations and negative value bucket deviations for corresponding frames. Image memory portion or image set 123 represents the collecting and averaging the product of positive value pixel deviations and negative value bucket deviations for corresponding frames. Representation of an enhanced image 124 comprises addition, subtraction, normalization or other mathematical operations of the computed values of image sets 120, 121, 122, and 123. Block 125 indicates some of the physics for the display of the enhanced average second-order image of the region of interest. The block 125 is a depiction of the physics of a two-photon interference process where sub-sources are at A and B respectively and detection is at B and R elements wherein the lines represent two alternate but indistinguishable paths where a photon of sub-source A goes to detector R and a photon of sub-source B goes to detector B or a photon from sub-source A goes to detector B and a photon of sub-source B goes to detector R to achieve a joint detection. Block 126 comprises: data acquisition and real-time control electronics.

Figure 20A:
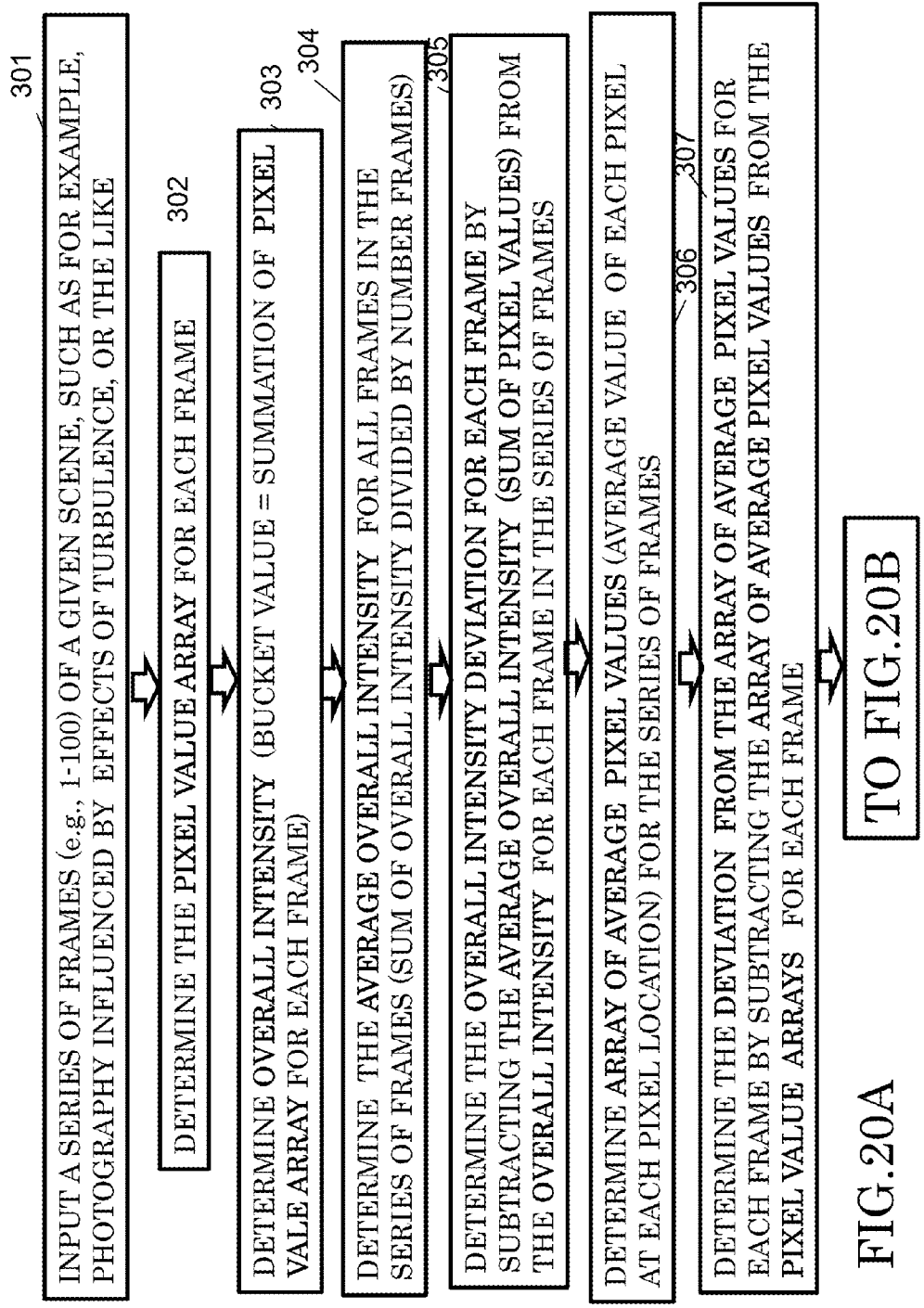
FIG. 20A is a schematic block diagram illustration of an alternate preferred embodiment of the present invention wherein groups and subgroups are used to determine product arrays to form an improved image.
Figure 20B:
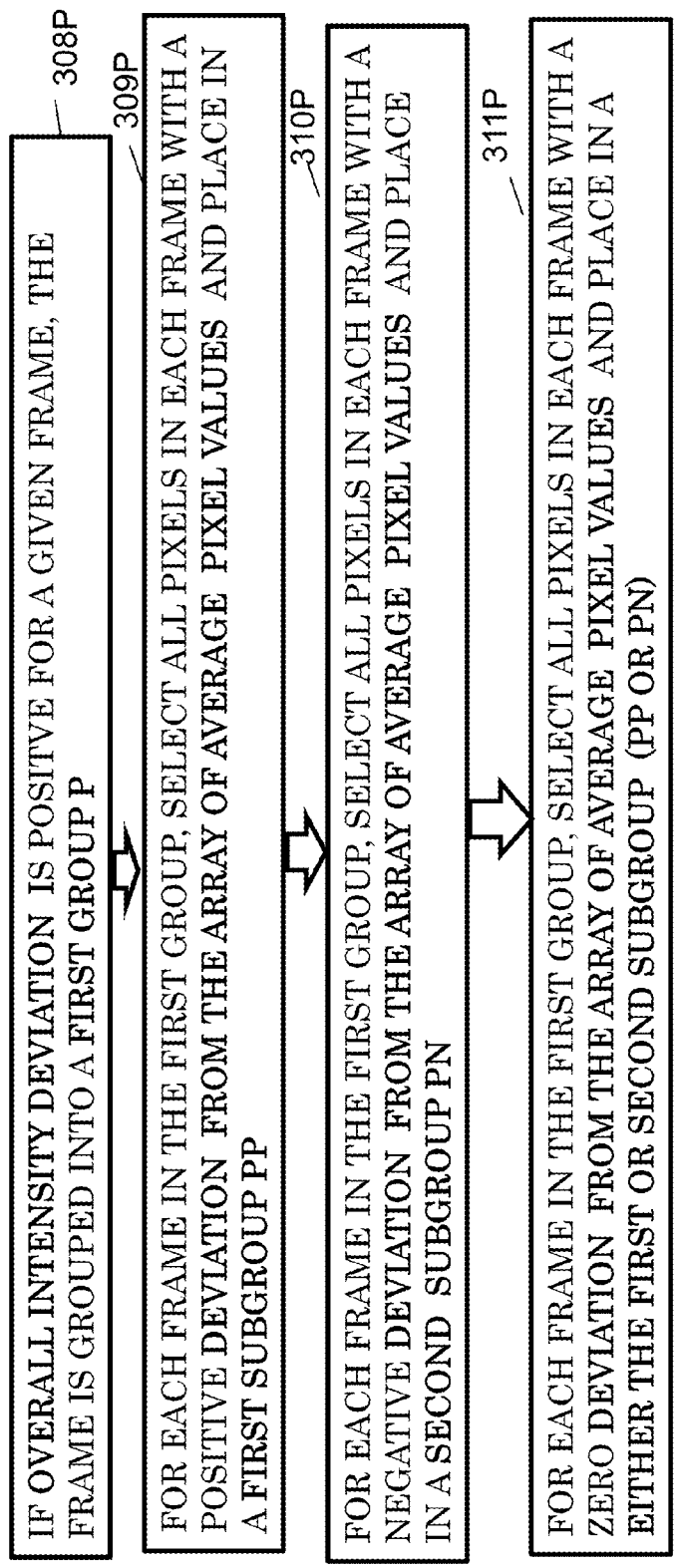
FIG. 20B is a continuation of the schematic block diagram illustration of FIG. 20A.

FIGS. 20A-20C illustrate a schematic block diagram of an alternate preferred embodiment of the present invention wherein groups and subgroups are used to determine product arrays to form an improved image. In: Box 301, a series of frames are entered into the memory or input of a processor or image processor. The frames may comprise photographs of the same region of interest. The region of interest may be a scene, landscape, an object, a subject, person, or thing. In Box 302 the pixel value for each pixel in each frame in the series of frames is determined. In Box 303, the overall intensity of the frame (or summation of pixel values for each frame) is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In Box 303, the average overall intensity for all inputted frames (see Box 301) is computed. To determine the average overall intensity, the summation of the intensities for all frames is divided by the number of frames. In Box 304 the overall intensity is determined, In Box 305 the overall intensity deviation is determined for each frame by subtracting the average overall intensity from the overall intensity for each frame. The overall intensity deviation is a measure of the degree to which a frame is brighter or darker than the Average Overall Intensity. In Box 306, an array of average pixel values is formed (average value at each pixel location for the series of frames.

Continuing in FIG. 20B, in Box 308P, if overall intensity deviation is positive for a given frame, the frame is grouped into a first group P. In Box 309P, for each frame in the first group, select all pixels in each frame with a positive deviation from the array of average pixel values and place in a first subgroup PP.

In Box 310P, for each frame in the first group, select all pixels in each frame with a negative deviation from the array of average pixel values and place in a second subgroup PN. In Box 311P, for each frame in the first group, select all pixels in each frame with a zero deviation from the array of average pixel values and place in a either the first or second subgroup (PP or PN).

Continuing in FIG. 20C, in Box 308N, if the overall intensity deviation is negative for a given frame, the frame is grouped into a second group N. In Box 309N, for each frame in the second group, select all pixels in each frame with a positive deviation from the array of average pixel values and place in a third subgroup NP. In Box 310N, for each frame in the second group, select all pixels in each frame with a negative deviation from the array of average pixel values and place in a fourth subgroup NN. In Box 311N, for each frame in the second group, select all pixels in each frame with a zero deviation from the array of average pixel values and place in a either the first or second subgroup (NP or NN). In Box 312, for each pixel value for each frame in the each subgroup multiply each pixel value by overall intensity deviation for that frame to obtain a first product array (or conditional product array) for each frame in the subgroup (PN, PP, NP, NN). In Box 313, for each subgroup, add up the product arrays in the subgroup and divide by the number of frames in the subgroup to obtain a second or average conditional product array for each subgroup. In Box 314, one of more second product arrays is selected to generate an image.

Figure 21:
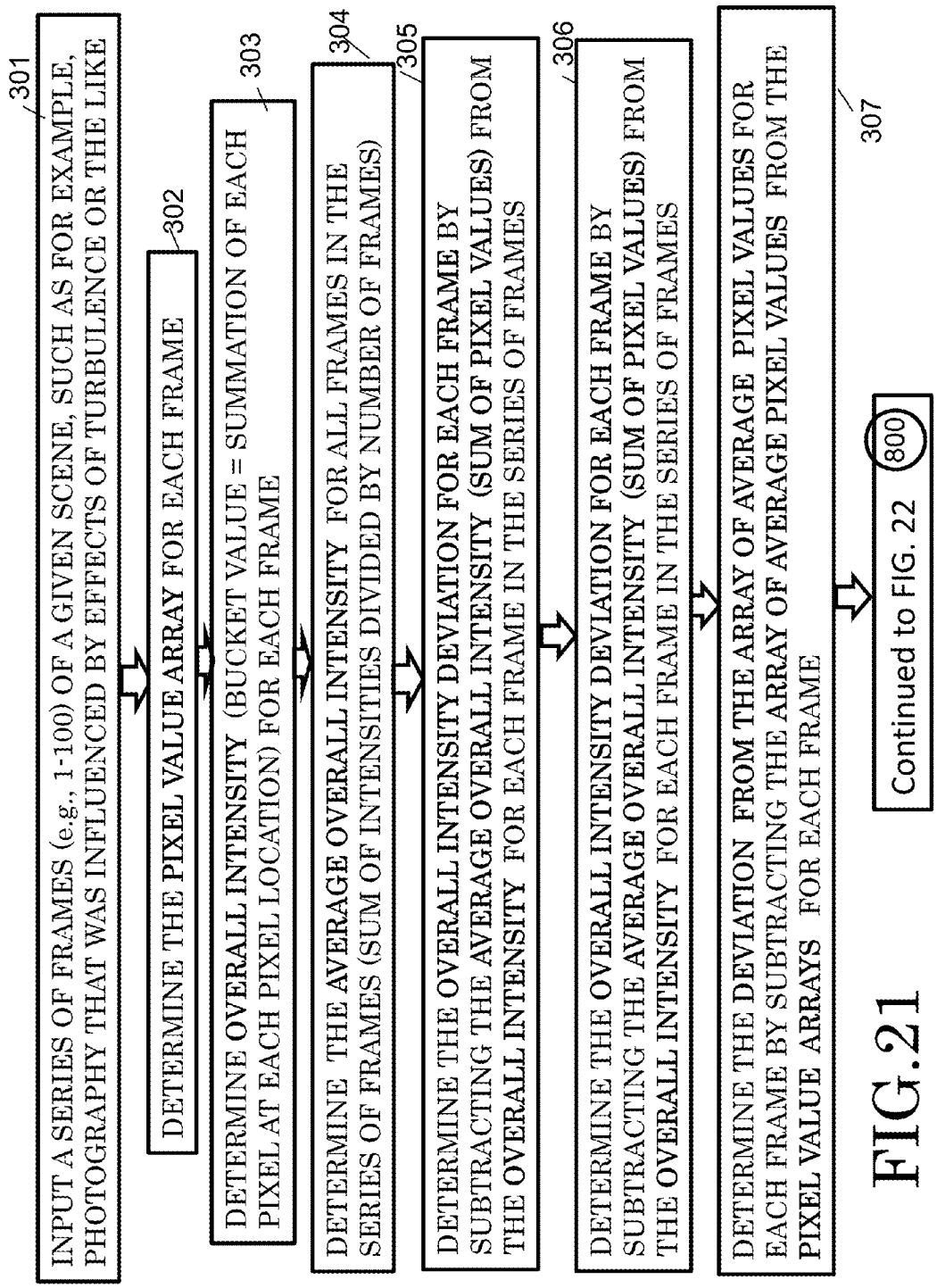

FIGS. 21-31 represent a partial schematic block diagram illustration of the steps for performing one embodiment of the present invention. In FIG. 21: Box 301, a series of frames are entered into the memory or input of a processor or image processor. The frames may comprise photographs of the same region of interest. The region of interest may be a scene, landscape, an object, a subject, person, or thing. In Box 303, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In Box 313, the average overall intensity for all frames in the inputted (see Box 301) is computed. To determine the average overall intensity, the summation of the intensities for all frames is divided by the number of frames. In Box 314 the overall intensity deviation for each frame is determined by subtracting the Average Overall Intensity from the Overall Intensity for each frame. The overall intensity deviation is a measure of the degree to which a frame is brighter or darker than the Average Overall Intensity.

The method proceeds to FIG. 21. In Box 315, a series of frames are entered into the memory or input of a processor or image processor. The frames may comprise photographs of the same region of interest. The region of interest may be a scene, landscape, an object, a subject, person, or thing. These frames are the same frames used in Box 301 and may be reused if they are still available in the memory or input of the processor or image processor. In Box 316 the Average Frame Data is determined by computing the average value of each pixel at each pixel location for the plurality of frames. In Box 317 the Deviation Frame Data is determined by subtracting the Average Frame Data from the Frame Data for all pixels in each frame for the plurality of frames.

The method proceeds via path 800 to FIG. 22 which shows how to generate a third set of data which is referred to here at SET 3. SET 3 data includes conditional product terms using frames having a positive overall intensity deviation and positive deviation frame data pixels. SET 3 may be determined as follows: In Box 318 frames with a Positive Overall Intensity Deviation multiply the value of the Overall Intensity Deviation by the Positive Frame Data Deviation pixels within that set of frames. In Box 319 pixel locations (a), the square of the Positive Overall Intensity Deviation (b), the product of the Positive Overall Intensity Deviation×the Positive Deviation Frame Data pixels and the square of the Positive Deviation Frame Data pixels are recorded and accumulated. In Box 320 the pre-normalized Positive-Positive Product pixel values, 320(a), are determined by dividing the product of the Positive Overall Intensity Deviation×the Positive Deviation Frame Data Frame Data pixels by 319(a). The average of the squares of the Positive Overall Intensity is determined by dividing 319(b) by 319(a). The average of the squares of the Positive Deviation Frame Data pixels is determined by dividing 319(d) by 319(a).

Continuing via path 900 to FIG. 28, the method proceeds to FIG. 23 In Box 321 the standard deviation of the Positive Overall Intensity Deviation is determined by taking the square root of the average of the squares of the Positive Overall Intensity Deviation, 320(a). In Box 322 the standard deviations of the Positive Deviation Frame Data pixels is computed by taking the square root of the average of the squares of the Positive Deviation Frame Data pixels, 320(b). Box 323 determines the Normalized Positive-Positive Product pixel values by dividing the pre-Normalized Positive-Positive Product, 320(a), by the product of the standard deviation of the Positive Overall Intensity Deviation, 321, and the standard deviation of the Positive Deviation Frame Data pixels, 322.

The method proceeds via path 800 to FIG. 24 which shows how to generate a fourth set of data which is referred to here at SET 4. SET 4 frame data includes conditional product terms using frames having a negative overall intensity deviation and negative deviation frame data pixels. SET 4 may be determined as follows: In Box 400 frames with a Negative Overall Intensity Deviation multiply the value of the Overall Intensity Deviation by the Negative Frame Data Deviation pixels within that set of frames. In Box 401 pixel locations (a), the square of the Negative Overall Intensity Deviation (b), the product of the Negative Overall Intensity Deviation×the Negative Deviation Frame Data pixels and the square of the Negative Deviation Frame Data pixels are recorded and accumulated. In Box 402 the pre-normalized Negative-Negative Product pixel values, 402(a), are determined by dividing the product of the Negative Overall Intensity Deviation×the Negative Deviation Frame Data Frame Data pixels by 401(a).

The average of the squares of the Negative Overall Intensity is determined by dividing 401(b) by 401(a). The average of the squares of the Negative Deviation Frame Data pixels is determined by dividing 401(d) by 401(a).

From Box 402 in FIG. 24, the method can proceed via path 901 to FIG. 25. In Box 403 the standard deviation of the Negative Overall Intensity Deviation is determined by taking the square root of the average of the squares of the Negative Overall Intensity Deviation, 402(a). In Box 404 the standard deviations of the Negative Deviation Frame Data pixels is computed by taking the square root of the average of the squares of the Negative Deviation Frame Data pixels, 402(b). Box 405 determines the Normalized Negative-Negative Product pixel values by dividing the pre-Normalized Negative-Negative Product, 402(a), by the product of the standard deviation of the Negative Overall Intensity Deviation, 403, and the standard deviation of the Negative Deviation Frame Data pixels, 404. At the conclusion of Box 405, the method proceeds via path 700 to FIG. 30 for determining an improved image data 701, or to FIG. 31 for determining alternative improved image data 702 by an alternative embodiment.

Returning to FIG. 22, the method also can concurrently proceeds via path 800 to FIG. 26 which shows how to generate a fifth set of data which is referred to here at SET 5. SET 5 frame data includes conditional product terms using frames having a negative overall intensity deviation and positive deviation frame data pixels. SET 5 may be determined as follows: In Box 800 frames with a Negative Overall Intensity Deviation multiply the value of the Overall Intensity Deviation by the Positive Frame Data Deviation pixels within that set of frames. In Box 801 pixel locations (a), the square of the Negative Overall Intensity Deviation (b), the product of the Negative Overall Intensity Deviation×the Positive Deviation Frame Data pixels and the square of the Positive Deviation Frame Data pixels are recorded and accumulated. In Box 802 the pre-normalized Positive-Negative Product pixel values, 802(a), are determined by dividing the product of the Negative Overall Intensity Deviation×the Positive Deviation Frame Data Frame Data pixels by 801(a). The average of the squares of the Negative Overall Intensity is determined by dividing 801(b) by 801(a). The average of the squares of the Positive Deviation Frame Data pixels is determined by dividing 801(d) by 801(a).

From Box 802 in FIG. 26, the method can proceed via path 902 to FIG. 27. In Box 803 the standard deviation of the Negative Overall Intensity Deviation is determined by taking the square root of the average of the squares of the Negative Overall Intensity Deviation, 802(a). In Box 804 the standard deviations of the Positive Deviation Frame Data pixels is computed by taking the square root of the average of the squares of the Positive Deviation Frame Data pixels, 802(b). Box 805 determines the Normalized Positive-Negative Product pixel values by dividing the pre-Normalized Positive-Negative Product, 802(a), by the product of the standard deviation of the Negative Overall Intensity Deviation, 803, and the standard deviation of the Positive Deviation Frame Data pixels, 804.

At the conclusion of Box 805 in FIG. 27, the method proceeds via path 700 to FIG. 30 for determining an improved image data 701, or to FIG. 31 for determining alternative improved image data 702 by an alternative embodiment.

Similar as discussed above with respect to the fifth set of data (SET 5), returning to FIG. 22, the method also can concurrently proceed via path 800 to FIG. 28 which shows how to generate a sixth set of data which is referred to here at SET 6. SET 6 frame data includes conditional product terms using frames having a positive overall intensity deviation and a negative deviation frame data pixels. SET 6 may be determined as follows: In Box 600 frames with a Positive Overall Intensity Deviation multiply the value of the Overall Intensity Deviation by the Negative Frame Data Deviation pixels within that set of frames. In Box 601 pixel locations (a), the square of the Positive Overall Intensity Deviation (b), the product of the Negative Overall Intensity Deviation×the Negative Deviation Frame Data pixels and the square of the Negative Deviation Frame Data pixels are recorded and accumulated. In Box 602 the pre-normalized Negative-Positive Product pixel values, 602(a), are determined by dividing the product of the Positive Overall Intensity Deviation×the Negative Deviation Frame Data Frame Data pixels by 601(a). The average of the squares of the Positive Overall Intensity is determined by dividing 601(b) by 601(a). The average of the squares of the Negative Deviation Frame Data pixels is determined by dividing 601(d) by 601(a).

From Box 602 in FIG. 28, the method can proceed via path 903 to FIG. 28. In Box 603 the standard deviation of the Positive Overall Intensity Deviation is determined by taking the square root of the average of the squares of the Positive Overall Intensity Deviation, 602(a). In Box 604 the standard deviations of the Negative Deviation Frame Data pixels is computed by taking the square root of the average of the squares of the Negative Deviation Frame Data pixels, 602(b). Box 605 determines the Normalized Negative-Positive Product pixel values by dividing the pre-Normalized Negative-Negative Product, 602(a), by the product of the standard deviation of the Positive Overall Intensity Deviation, 603, and the standard deviation of the Negative Deviation Frame Data pixels, 604.

At the conclusion of Box 605 in FIG. 29, the method proceeds via path 700 to FIG. 30 for determining an improved image data 701, or to FIG. 31 for determining alternative improved image data 702 by an alternative embodiment.

FIG. 30 is a partial schematic block diagram illustration of the steps for performing an alternate preferred method of the present invention in which the improved final image is determined by adding the above-mean, above mean image to the below-mean, below-mean images, subtracting the above-mean, below-mean image, and subtracting the below-mean, above mean image. Here, improved image data 701 is determined by adding "SET 3" 323 to "SET 4" 405 and subtracting "SET 5" 505 and subtracting "SET 6" 605.

FIG. 31 is a partial schematic block diagram illustration of the steps for performing an alternate preferred method of the present invention in which the improved final image is determined by adding the above-mean, above mean image, the below-mean, below-mean image, the above-mean, below-mean image, and the below-mean, above mean image. Here, an alternate embodiment of improved image data 702 is determined by adding "SET 3" 323, "SET 4" 405, "SET 5" 805 and "SET 6" 605 together.

FIG. 32 is a result computed using Eq. 1 subject to the self-bucketing concept of Eq. 2. This result was from a few hundred shots taken of a typical scene using an infra-red camera. Some portions of the scene are partially visible such as the lamp post in the middle and the clouds (32.a) in the sky background. Other features such as the safety bars (32.b) and the tree line in the background (32.c) are not distinguishable.

FIG. 33 is a result computed using the same data from FIG. 32 but applying the inventive procedure described in which the $R_m$ conditional product terms were combined with $R_m^{++} + R_m^{--} - R_m^{+-} + R_m^{-+}$ to produce the improved image. The superscripts indicate a positive or negative deviation for the conditional product terms. In comparison with FIG. 32, the safety bars on the right of the image are now very distinct (33.b) and the edges of the clouds (33.a) are more sharply defined. Furthermore, in the distance a tree line (33.c) has been resolved by the applications of the method described herein.

FIG. 34 is a result computed using the same data from FIG. 32 but applying the inventive procedure described in which the $R_m$ conditional product terms were combined with $R_m^{++}+R_m^{--}+R_m^{+-}+R_m^{-+}$ to produce the improved image. The superscripts indicate a positive or negative deviation for the conditional product terms. In comparison with FIG. 32, the safety bars (34.b) on the right of the image are distinct, the edges of the clouds (34.a) are more sharply defined, and the distant tree line is resolved (34.c). A comparison between the (a), (b), and (c) features of FIG. 33 shows some apparent relative smoothing and a bit less contrast in FIG. 34.

Figure 35:
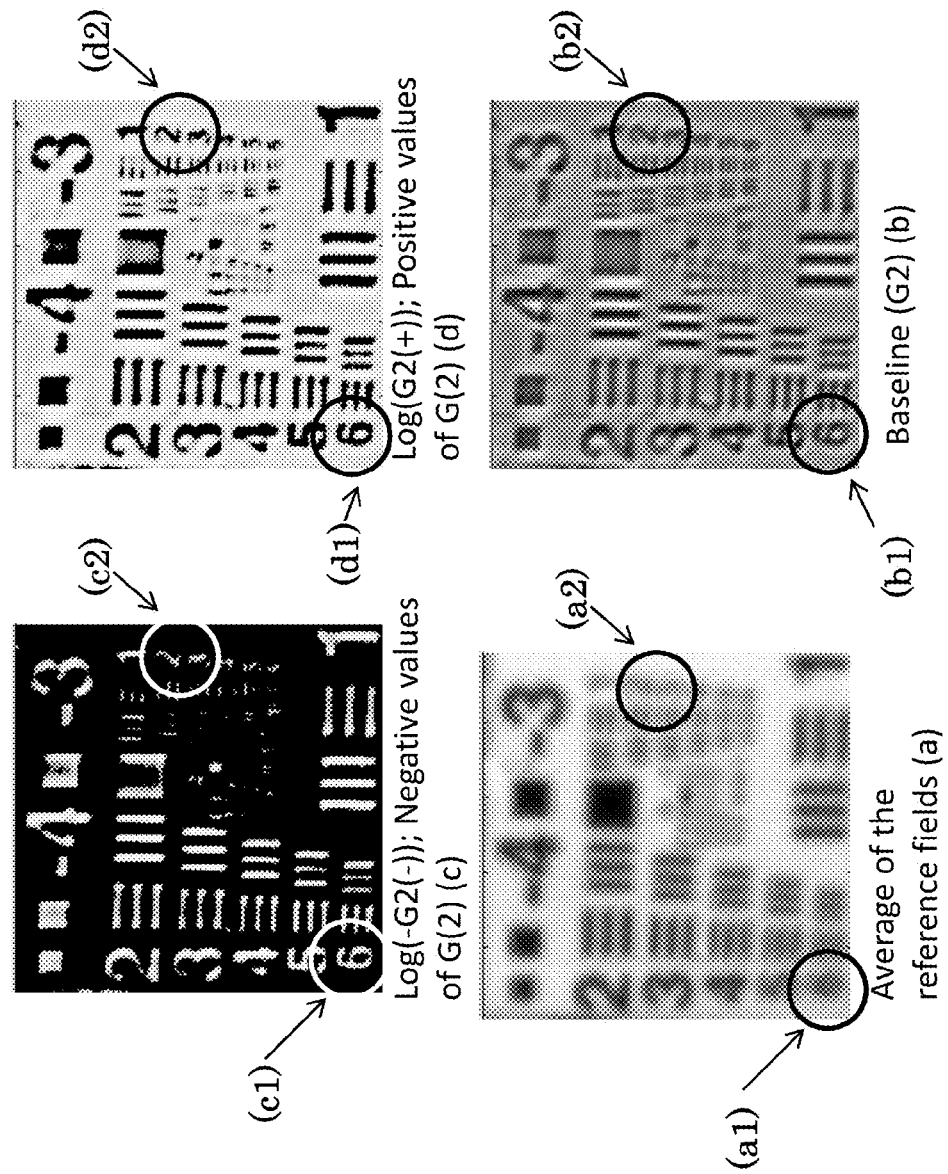
FIG. 35 is an illustration showing the image contract improvement, wherein both the Log positive and negative components of the base $G^{(2)}$ image show increased contrast and sharpening of edges especially when compared to the average image in the lower left.

FIG. 35 is a set of experimental results computed using a simple average of the collected frame data (a); A baseline result computed using Eq. 1 subject to the self bucketing concept of Eq. 2 (b); and two improved images when applying the partitioning procedure shown in FIG. 21 et seq. Both the Log positive (d) and negative (c) components of the base $G^{(2)}$ image show increased contrast and sharpening of edges. In particular, a comparison between (a1) on the average image and (c1) and (d1) of the improved log negative and log positive images highlights that the number "6" is quite legible in the improved images. A comparison of the (b2), (c2) and (d2) regions highlights the increased contrast of the (c2) and (d2) area with respect to the baseline (b) image.

FIG. 36 presents improved image results using a few hundred shots taken of a typical scene using an infra-red camera. Some portions of the scene are partially visible such as the lamp post in the middle and the clouds in the sky background. The improved image was computed combining the methods shown in FIG. 30. Features such as the lamp post show much more contrast and edge clarity. It should be noted that the process described in FIG. 36 yields all positive results with background noise largely eliminated.

Radiation Emitting Image Area

Objects within the field of view of a light sensing device typically reflect and scatter light from an external source of illumination as well as emitting light. Depending on the source of illumination and the material composition of the objects within the scene the contributions from reflected/scattered light and emitted light are often quite different. Light that is reflected from an object typically polarizes the reflected light while emitted light is often unpolarized. Emitted light may be from physical processes that include, but are not limited to, luminescence, fluorescence, "black body," and thermal radiation.

Low Light Imaging

The present invention relates to a method that can be applied to improve images of many types of low-light target objects and areas. Objects and target areas of interest are often very faint, either due, but not limited to, to low photon emission rate, being very distant (radiation intensity with distance from a source follows an inverse square law, i.e. $1/(r^2)$ where r is the distance from the center of the emitter to the receiving device), the reflectance of the object or target area of interest being very small, the effective integration or shutter time of the measurement device being very short, the efficiency of the detector may be small, or through attenuation and/or scattering due to the media through which the radiation propagates. Low light conditions could generally said to exist when the quality of the image degrades with the reduction of illuminating light or light received from the imaged area of interest by the eye or a sensor such as a camera. A low signal to noise ratio sensed by a sensor such as a CCD, CMOS, or single photon detector may also indicate low-light imaging conditions when the noise of the sensor exceeds the measured light by the sensor. Outdoors between dusk and dawn would typically be considered low-light conditions and indoors without bright overhead illumination may also produce low-light conditions. In an environment when obstacles occlude the light source such as in a cave or thick forest also produce low-light conditions. Conditions that cause the use of intensity amplification are considered low-light conditions. FIG. 38 is an average image of a distant (2.33 km) target taken under low-light conditions. FIG. 37 demonstrates an improved enhanced image of the same target as shown in FIG. 38. A close up picture of the target is shown in FIG. 39. It was determined that the conditions were low-light because the average image deteriorated to be virtually free from recognizable patterns as the intensity of the sun decreased by more than a factor or two late in the afternoon.

Referring now to FIG. 40, in accordance with one preferred embodiment, in Box 1a series of frames are inputted into the memory or input of a processor or image processor. The frame may be composed on a plurality of pixels, typically in a two-dimensional (2D) array, that together form an image. Exemplary frames may be electronic image data such a TIFF or JPEG file. As used herein the terminology "processor" or "image processor" as used in the following claims includes a computer, multiprocessor, CPU, minicomputer, microprocessor or any machine similar to a computer or processor which is capable of processing algorithms. The frames may comprise photographs of the same region of interest. The region of interest may be a scene, landscape, an object, a subject, person, or thing. In Box 2, the frame data or value of each pixel at each pixel location is determined for a frame. In Box 3Q, a predetermined number of pixels are selected, rather than the entire "overall intensity) as was the case in regard to the preferred embodiment of FIG. 1. The intensity value of the predetermined pixels correlates to a "bucket value" determination. It correlates to the summation of the light intensity at the predetermined pixel locations. In the case of a picture, the overall intensity correlates to the sum of the reflected illumination at the predetermined pixel locations. In the case of an electronic display formed by pixels, the intensity is the summation each pixel value at each pixel location. At Box 4, the values in Box 2 are multiplied by the value determined in Box 3Q. Box 5C represents the frame data×sum of intensity of selected pixels product for the frame, which will henceforth be referred to as the First Product Array, which is also an array of values. At Box 6C, the sum of the First Product Arrays for a plurality of frames (1-100) products is obtained. As an example, one hundred frames may be selected. At Box 7C, the summation of the First Product Arrays determined in Box 6C is divided by the number of frames (such as for example one hundred) to determine the Average Of The First Product Arrays.

Figure 41:
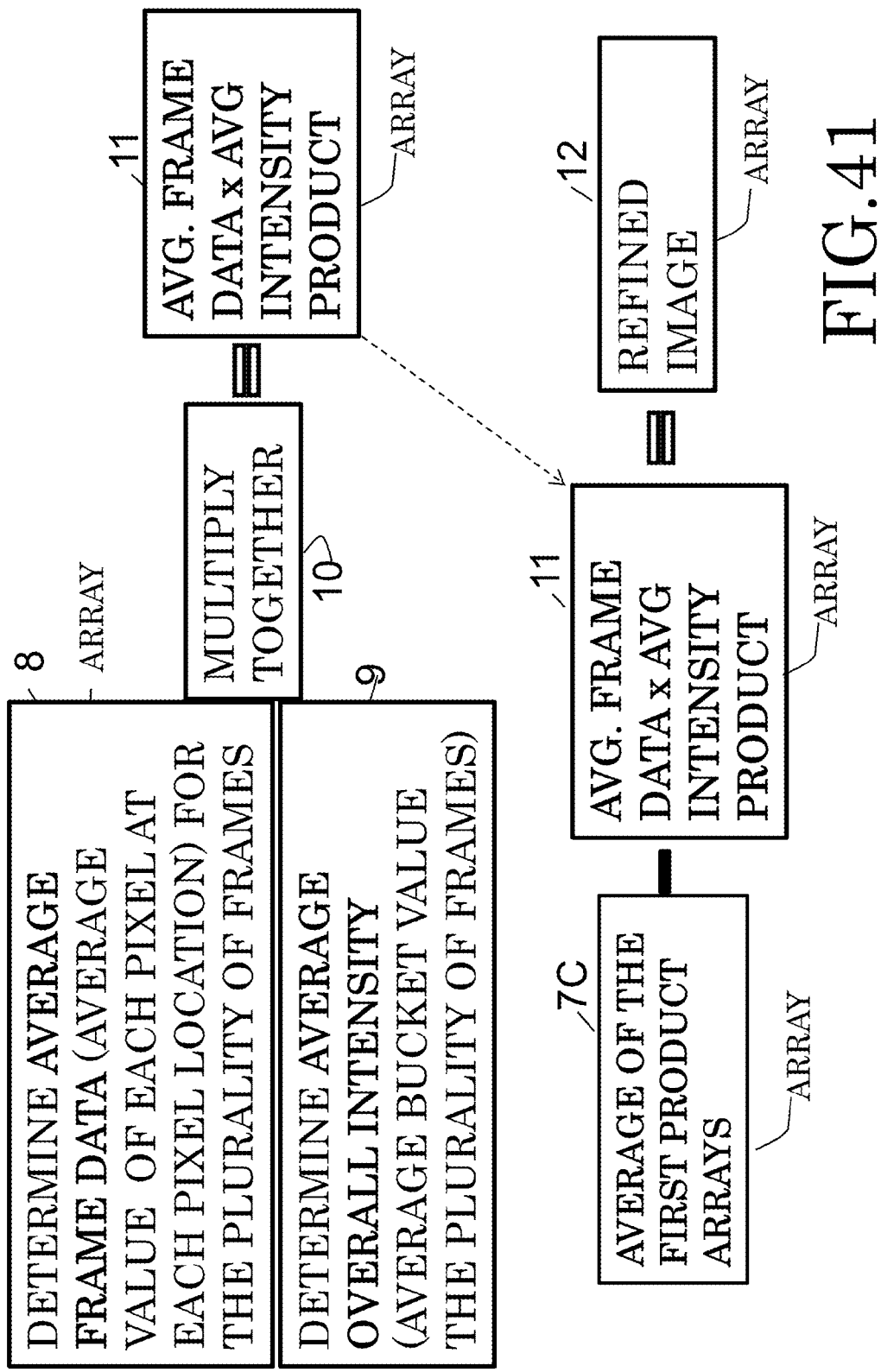
FIG. 41 is a schematic block diagram illustration of the steps for performing an alternate preferred method of the present invention. Taken together, FIGS. 40 and 41 outline the steps of an alternate preferred methodology for the present invention.

FIG. 41 is a further description of a methodology of an alternate preferred embodiment of the present invention. Note that Box 7C is carried over from FIG. 40 into FIG. 41. In Box 8, the average frame data (or average value of each pixel at each pixel location) is determined for the plurality of frames (e.g. 100) by averaging the pixel values at each pixel location for the plurality of frames to determine an array of average pixel values. In Box 9, the average overall intensity for the plurality of frames is determined. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8 and 9 to form the Average Frame Data×Average Intensity Product, which is an array. As shown in the bottom portion of FIG. 41, the Average Frame Data×Average Intensity Product is subtracted from the Average Of The First Product Arrays to form the refined image of Box 12.

Imaging Through Weather, Turbulence, and Obscuration

The methods and techniques described in conjunction with the present invention can be applied to improve and enhance imaging of subject areas, objects, and scenes that would otherwise be degraded by the influence of bad weather conditions, including but not limited to rain or fog, turbulence, and obscuration.

The invention has been demonstrated to improve and enhance images as shown by FIGS. 37 through 39. Turbulence, a type of obscuring property of the atmosphere, degrades the conventional image. In like manner, a conventional image degraded by bad or changing weather, low light, and/or obscuration would also be enhanced and improved by the current invention.

Higher Order Partitioning (1) Separation of different orders of interference with measurements at different space-time locations for better contrast, visibility, and different views of the physics. (2) With two levels, i.e. +/−, there are 80 different views. (3) Separating the orders of photon interference as manifest in images at the data+/−ensemble levels is useful for quantum imaging and quantum computing.

Stereoscoptic Images, Range, and Movies

Improved stereoscopic images and movies can be generated with application of the methods and techniques described in this invention. A typical stereoscopic image or movie is produced by viewing a region of interest with two distinct and separated imaging sensors such as two cameras or two human eyes. The optical path from the region of interest to each sensor is slightly different and each sensor also emphasizes slightly different portions of the region of interest. Furthermore, the field of view between each sensor and the region of interest is typically subject to different degrees of obscuration and degrading turbulence effects. The methods and techniques described in this invention can be applied to each of the stereoscopic channels individually, or in other embodiments cross-channel products between the reference fields and the buckets may be used, i.e. a right channel reference with a left channel bucket and a left channel reference with a right channel bucket. Range or depth maps of a region of interest can be generated from stereographic images. Since the stereographic images are adversely affected by obscurants and turbulence the methods and techniques described herein can be applied to generate improved stereographic images which may then be used to generate more accurate range or depth maps of the region of interest.

Ladar Per Pixel Range

Turbulence causes changes in the index of refraction in the atmosphere. These changes in the index of refraction cause a change in the speed of light through media thereby causing ranging problems. For example, light travels slower thru air with higher index of refraction. Other factors that influence the index of refraction in the atmosphere include but are not limited to temperature and concentrations of other materials such as water. The current invention can be applied to mitigate the effects of the anisotropic, inhomogeneous, and temporally fluctuating changes in the index of refraction along an optical path from a sender to a receiver. As an example a current type of LADAR system would direct a laser pulse to the region of interest, on sending the pulse the receiver detector would start taking a series of measurements for N consecutive measurements or bins. Each of the measurements would correspond to a dT where light returning from the target area would be measured. The particular dT out of the N dT measurements that measured the greatest number of photons would be assumed to give the range to the region of interest (c M dT)/2 where c is the speed of light, M is the index of the measurement time with the greatest number of photons measured, dT is the time width of each bin. The factor of 2 corrects for the time of the pulse to travel from the laser to the target and back from the target to the receiver. However, index of refraction variations generally spread out the pulse sometimes to the extent where no single dT bin has the greatest number of photon counts. Applying the methods and techniques described in this invention can mitigate this variable index of refraction induced degradation and generate improved depth or distance to target maps of the region of interest.

Alternative Grouping for Reference and Bucket Field Measurements

An alternative embodiment of the current invention may use different groupings of pixels or spatially resolved measurements for the "reference" field and the "bucket" field measurements. As an example, the pixels of a CCD type sensor may be grouped into a checker board type pattern where the equivalent pixels to a red (even) or black (odd) box on a checker board are treated as two distinct sensors. The even (odd) pixel set is then used as a set of "reference" measurements while the odd (even) pixel set is summed over and used as the set of "bucket" measurements. A $G^{(2)}$ type image for each pairing, even/odd or odd/even, can then be computed using the methods and techniques described herein to generate improved images of a region of interest. Each of the computed improved images may be examined separately or the can be added or subtracted from each other to highlight different features of the region of interest. It is to be appreciated that other groupings of pixels or spatially resolved measurements would be advantageous for specific applications or characteristics and details in the region of interest.

Color Images and Movies

Many current imaging devices are able to measure distinct portions of the electro-magnetic and optical spectrum. These devices such as color CCD cameras, smart phone cameras, and video recorders often split the colors of a region of interest into three color bands, i.e. red, green, and blue. Turbulence and obscurants typically impose an optical frequency dependent degradation on color images. The current invention can mitigate these degradations on a per color band basis. For example, using the methods and techniques described in this invention the measured red, green, and blue color bands could be used to generate an improved red image, improved green image, and an improved blue image. These three improved color band images could then be collected into a single improved "color" image. Other alternative embodiments would include using, for instance a "red" bucket with a "blue" reference field. These types of cross-color calculations may be useful to highlight or suppress desired features of the region of interest.

Extraction of Relative Dynamics Between Measurements Separated in Space, Time, or Both Embodiments of the present invention can be used to determine the dynamics and relative dynamics contained in measurements of the region of interest. The dynamics would consist of the information on the physical, chemical, and biological processes as they evolve in space and time. This would include but is not limited to the dynamics of light sources, surface characteristics such as reflection, and scattering in the transmission media.

Ghost Imaging with a Single Camera

Using ghost imaging we have shown that it is possible to generate an improved image of an area of interest using two detectors. The first detector is a sensitive light meter that measures light scattered or reflected from the area of interest. The second detector can be a camera, such as a charged coupled device (CCD), CMOS, or other device capable of imaging the relevant light source, such as the sun, stars, and moon outdoors, or light bulbs indoors, that illuminate the area of interest. In the case where the area of interest emits radiation such as infrared radiation, detector one measures the combined reflected, scattered, and emitted radiation. Detector two measures the effects of the reflected, scattered, and emitted radiation sources. By combining coincident measurements of first detector and the second detector a ghost image can be computed of the area of interest. It turns out that the ghost image can achieve higher resolution or greater clarity than an image of the area of interest using the camera type device alone taking a picture classically. This has been demonstrated in experiments and publications of peer reviewed articles. An explanation for the improvement of the image in turbulence is demonstrated by so called two-photon models of coincident imaging found in our publication. There it is shown that turbulence aberrations cancel and do not affect the improved resolution of the ghost image. Sometimes, a two-photon ghost image is referred to as a second order image. Whereas, the camera image taken by classical means is referred to as a first order image. Classical theory and experiment show that first order images are smeared by turbulence.

It would be desirable to generate a second order ghost image with high resolution and clarity even through turbulence while using just a single camera which may or may not be a color camera. In the case of a color camera ghost imaging system and method can be applied to each color that the color camera measures a color ghost image will result. Also, the camera could measure in infrared, UV, or more than one other wavelengths and pseudo-coloring can be used to display the ghost image depicting the intensity in the different wavelength bands. One embodiment of how to do this would be to treat the area of interest as a mirror or an imperfect mirror for the light sources. Thus, an array of pixel on the camera can image the area of interest as a measure of the light sources just as the second detector above. The first detector which measures the reflected and scattered light from the area of interest can be other or the same array of pixels in the camera.

One method would be to use a black and white checkerboard pattern of pixels where the white pixels act as detector two and the sum of the measurements on the black pixels act as detector one. By combining coincident measurements of first detector and the second detector a ghost image can be computed of the area of interest.

An alternate embodiment of this would be to place a beam splitter between the camera and the area of interest. The beam splitter can split the radiation into two parts, one part towards detector one and the other part towards detector two. For example with a 50/50 beam splitter half of the light from the area of interest would be directed to the pixels of the camera which act as the second detector. The remaining half of the light would be directed to a separate sensor which acts as the first detector. The separate sensor could be attached to the camera or even be a single pixel of the usual camera array. This second embodiment is not as simple as the first embodiment. However, it may be more accurate if the first detector has higher sensitivity or accuracy. By combining coincident measurements of first detector and the second detector a ghost image can be computed of the area of interest.

Another alternate embodiment would be to use all of the pixels of the camera to act as detector two and the sum of the measurements of all of the pixels act as detector one. By combining coincident measurements of first detector and the second detector a ghost image can be computed of the area of interest. Various combinations of the pixels including those which overlap or do not overlap of the camera can used as detector one and detector two. It has been demonstrated with experiments that these combinations described can be useful to obtain improved quality ghost images.

In calculating the improved quality ghost image the processor creates a correlation product of measurements from detector one times measurements from detector two at coincident times for each pixel location measured by detector two. Summing and averaging these correlations over an ensemble of coincidence times yields a measure of the ghost image. This ghost image is combined of both first order and second order image information. Subtracting off the first order image which may be smeared by turbulence yields a second order ghost image which will be improved over the first order image in that it will have higher resolution and less distortion due to turbulence. This image is often referred to as a $G^{(2)}$ image. When, for instance, thermal photons have Gaussian statistics then the $G^{(2)}$ image is expected to be positive. However, Gaussian statistics may not accurately characterize the photon measurements made by cameras imaging areas of interest. In addition, turbulence and other physical characteristics of the illuminating source, area of interest, camera, detectors one and two and intervening media may combine in ways to create photon measurements that would be best characterized as non-Gaussian. Some of the physical characteristics that may contribute to the non-Gaussian photon statistics can include any or all of inhomogeneous, non-stationary, anisotropic, non-ergodic, nonlinear, and quantum processes.

As it turns out empirically, $G^{(2)}$ gives a good image of the area of interest. However, it is important to try to improve the $G^{(2)}$ image contrast. Sometimes $G^{(2)}$ contrast is not as high as ideally desirable. One way to improve the image contrast is to artificially scale the ghost image by subtracting off any background. An analysis of the $G^{(2)}$ sign shows that when $G^{(2)}$ is positive then the intensity deviations that comprise it are correlated. When $G^{(2)}$ is zero then the intensity deviations are uncorrelated. When $G^{(2)}$ is negative then intensity deviations are anti-correlated. When the negative parts of $G^{(2)}$ subtracts from the positive parts of $G^{(2)}$ then an all positive $AG^{(2)}=G^{(2)}$ correlated$-G^{(2)}$ anti-correlated can be computed. This method can be imaged by a display to have high contrast since the minimum is zero and other values are positive.

As described in the specification for U.S. patent application Ser. No. 13/247,470 filed Sep. 28, 2011 (ARL 11-03) herein incorporated by reference, there are many possibilities to combine results from the conditional product terms, $R_m^{++}$, $R_m^{--}$, $R_m^{+-}$, and $R_m^{-+}$, computations to generate and display an improved image of the region of interest. This sum, $RI_{\theta_x}$, is a weighed sum of correlated products. These correlated products would be formed from results of measurements of quantum particles. There are many applications for the method described below including imaging using photons and other quantum particles, measurement of gravitational waves, measurement of the quantum properties of sound, improved LIDARs, LADARs, improved medical imaging, improved Earth surveillance from space, improved space surveillance from Earth or other places in space. It is helpful to put the weighted sum of correlated products in a form where a user could compare the value of one vs. others for their application.

In particular, one useful way would be to weight terms in $R_m^{++}+R_m^{--}-R_m^{+-}-R_m^{-+}$ by $\cos\theta$ and $\sin\theta$ factors, i.e.

$$RI_{\theta 1}=\cos\theta\{R_m^{++}+R_m^{--}\}+\sin\theta\{R_m^{+-}+R_m^{-+}\},$$

where $\theta$ is an angle. This arrangement allows for continuously varying the contributions of the conditional product terms to display improved images to include an all positive image, an all negative image, a $G^{(2)}$ image and the negative of the $G^{(2)}$ image.

Another alternative would apply a $\cos\theta$ weight to the cross-term portion, $RI_{\theta 2}=\{R_m^{++}+R_m^{--}\}+\cos\theta\{R_m^{+-}+R_m^{-+}\}$.

While the conditional product terms can be displayed independently as an image, the alternative means described here to present and display the results would be useful for teaching and for detailed examination and analysis of the properties of the region of interest.

In practice, a movie displaying $RI_{\theta 1}$ or $RI_{\theta 2}$ would be made that scans through values of $\theta$ by the desired amount. For example, the movie could start at $\theta=0$ and each for each successive frame $\theta$ could be incremented by one degree until $\theta$ takes all values from 0 to 360 degrees. This will show the continuous change of $RI_{\theta 1}$ or $RI_{\theta 2}$ exhibiting varying contrast, visibility, and resolution of the computed image of the region of interest. For example when the symmetric terms are added to the asymmetric terms then a $G^{(2)}$ image results when the asymmetric terms are subtracted from the symmetric terms then an all positive image results. Which image is "better" for the user depends on the needs of the user. For example, from $RI_{\theta 2}$ one may obtain high contrast for $\theta=180$ degrees for an all positive image with high visibility. In some cases, more resolution of the region of interest may be found for $\theta=0$ degrees.

Color cameras often have pixel sensors that are covered by color filters. That way light directed towards a pixel sensor first passes through a filter before interacting with the pixel sensor. The filters are often laid out on a grid of pixel sensors in patterns that are variations of the "Bayer" pattern. For example, the filters over each pixel may be red, green, or blue arranged in a Bayer pattern. Usually 50% of the pixels are green 25% are blue and 25% are red so that the pixels only respond to the color of light that transmits through their color filter. There is a process for converting a Bayer pattern image to a RGB image where a processor computes a RGB value for each pixel. For example at a pixel that ordinarily measures a "green" value the RGB values may be completed by interpolating surrounding red pixel values and surrounding blue pixel values to that pixel. One method to record the RGB image is a variation of the AVI standard. Video sequences or individual pictures from a color camera are often recorded in AVI. Producing ghost images from AVI may result in high-quality ghost images. Occasionally, visual artifacts may be present in the ghost images due to the Bayer to RGB interpolation and conversion process. For some images that have been converted from Bayer to RGB it is possible to reverse the process to investigate what the ghost image would look like in the original Bayer pattern format.

For example, one means to convert back to a Bayer pattern image from a RGB image would be to extract the Bayer pixel color for each pixel location and zero out the interpolated color components. This would recover the underlying Bayer pattern image which could then be used to compute a ghost image that would be absent any artifacts from the interpolative or Bayer-to-RGB process.

Resolution of Conditional Product Terms

This section contains information on the conditional product terms. Conditional product terms are terms formed by correlations between values measured above or below the mean value. The values may represent intensity, polarization, or other physical quantities that are able to be measured. When these quantities have quantum properties or are able to be represented by quantum physics, such as photons or other quantum particles, then the resolution and visibility of the conditional product terms may be enhanced beyond conventional limits.

Positive and Negative $G^{(2)}$

The values of a particular $G^{(2)}$ can be either positive or negative. A positive $G^{(2)}$ indicates that the measurements at an x, y pixel are correlated with the bucket measurements. A negative $G^{(2)}$ indicates that the two measurements are anti-correlated.

CASE 1. As an example assume that an ensemble of measurements is made at location (a) and location (b). For this case assume that the ensemble consists of two measurement realizations 1 and 2. For realization 1, $I_a(1)=8$ and $I_b(1)=8$. For realization 2, $I_a(2)=2$ and $I_b(2)=2$. $G^{(2)}=<I_aI_b>-<I_a><I_b>$, where $<>$ indicates and average over the ensemble of realizations. For this ensemble, $G^{(2)}=34-25=9$. Examining Ia and Ib it is easy to see that the values of both of the measurements decrease at the same and typically referred to as correlated.

CASE 2. In a case where the ensemble of measurements is made at location (a) and location (b) for realizations 1 and 2, $I_a(1)=2$, $I_a(1)=8$ and $I_b(1)=8$, $I_b(2)=2$. Then $G^{(2)}=16-25=-9$. In this example $I_a$ increases in magnitude from 2 to 8 while $I_b$ decreases from 8 to 2. This is typically referred to as anti-correlated.

Multiple Buckets on Same Image—

Bucket pixels can be allocated down to an individual pixel or a group of pixels in particular frames. The pixels in a group of pixel selected to be summed to a bucket (integrated intensities) value for a frame need not be contiguous. The bucket pixel or pixels may also be chosen on a per-frame basis. For instance, all pixels within 10% of the maximum pixel value for a frame may be chosen to be summed over for the bucket value for that frame. The spatial distribution of those pixels within 10% of the maximum pixel value is likely to change from frame to frame based on lighting conditions and turbulence/obscuration effects between the target area and the measurement system.

Furthermore, single pixel buckets or multiple pixel buckets may be utilized.

Correlations Between Different Wavelengths

Reference values and bucket (integrated intensities of pixels) values may be allocated based upon the wavelength, or color, of the measured photons. For instance, measured green values on a color CCD or CMOS camera may be used to provide the reference field pixel measurements and measured red values may be allocated or summed to provide the value of the bucket measurement for a frame.

Infrared Between Bands

Modern advanced infrared cameras may provide per-pixel co-located measurements of infrared wavelengths in, for instance, the mid-wave infrared (MWIR) and long-wave infrared (LWIR) wavelength bands. One band may be used to provide reference pixel values and pixel in the other band can be allocated or summed to provide bucket values. A further, local $G^2$ type calculation may take place wherein deviations from the ensemble mean of one wavelength band can be multiplied with deviations from the ensemble mean of the other wavelength band. These deviation products are performed for each pixel in a frame and summed over all the frames of data in the ensemble. A preferred methodology may therefore comprise dividing this deviation product sum by the total number of frames in the ensemble to yield a $G^2$ image of the area of interest.

Coordinate Shifting of Pixel Values

Figure 42:
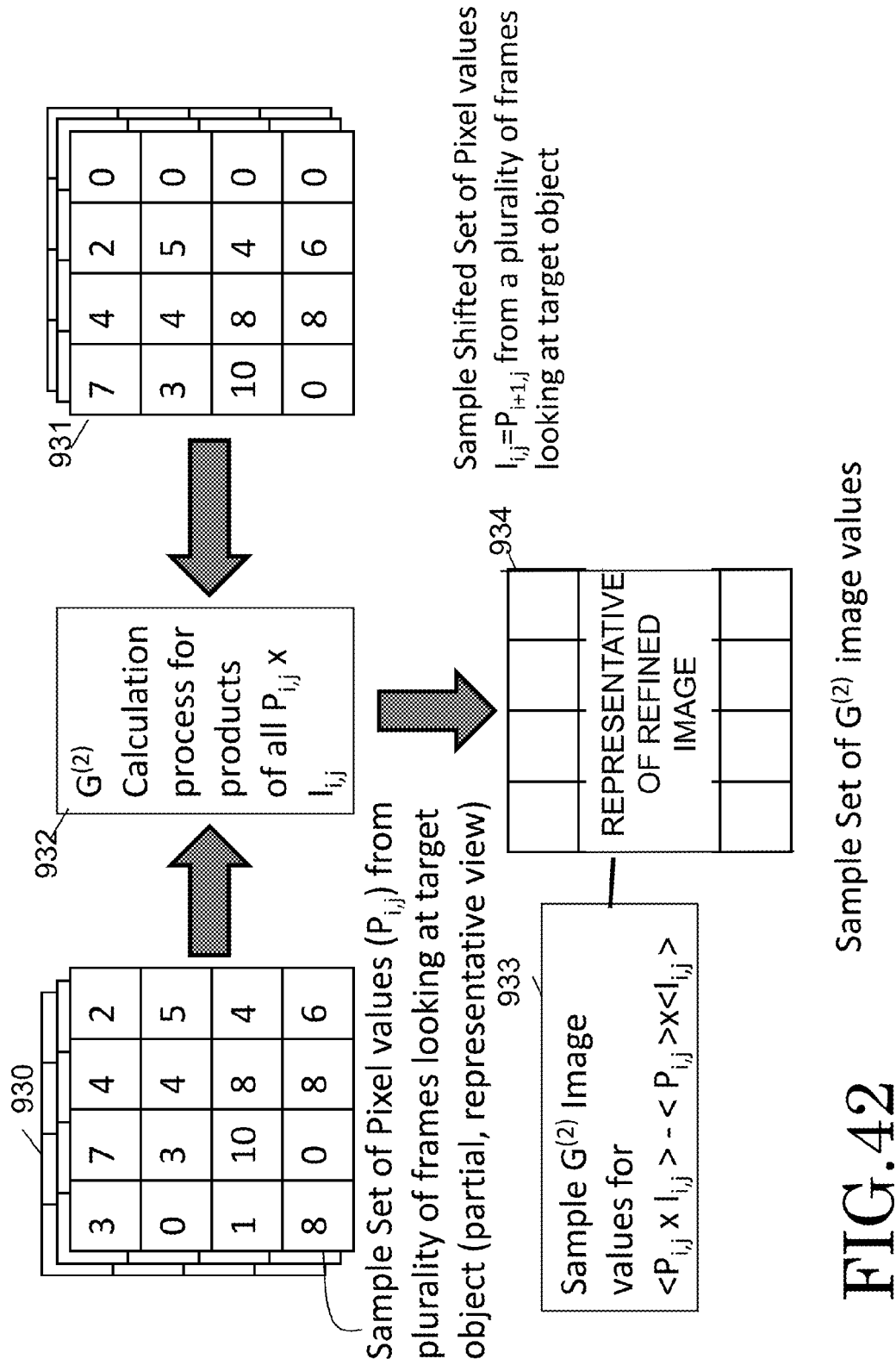
FIG. 42 is a schematic diagram of an alternate preferred embodiment involving coordinate shifting of pixel values.

FIG. 42 is a schematic diagram of an alternate preferred embodiment involving coordinate shifting of pixel values. As illustrated schematically in FIG. 42, element 930 is a frame of pixel values, such as from a charge coupled device (CCD). Note that only a small, representative fraction of the pixel values in an entire frame is depicted. A charge-coupled device (CCD) as used herein is a device for the movement of electrical charge, usually from within the device to an area where the charge can be manipulated, for example conversion into a digital value. CCDs move charge between capacitive bins in the device, thereby permitting the transfer of charge between bins. Element 931 represents the shifted set of pixels values from element 930 where the pixel values of 930 are shifted to the left by 1 column; the furthest left column is filled with 0 values. Box 932 represents the performance of the inventive calculations with the shifted pixel values including the calculations for ensemble average arrays of pixel values, ensemble average arrays of shifted pixel values; deviations of pixel value arrays and shifted pixel value arrays from their respective averages, and calculation of the enhanced final image; i.e., the $G^{(2)}$ calculation process for products of all $P_{i,j} \times I_{i,j}$. Box 933 is the explanation for the $G^{(2)}$ Image for $<P_{i,j} \times I_{i,j}> - <P_{i,j}> \times <I_{i,j}>$ that is represented by Box 934. 930 Sample array of pixel values from CCD or other imaging device. The calculated enhanced final image pixel values may be transferred from Box 934 to memory for storage or to a display for viewing.

Figure 43:
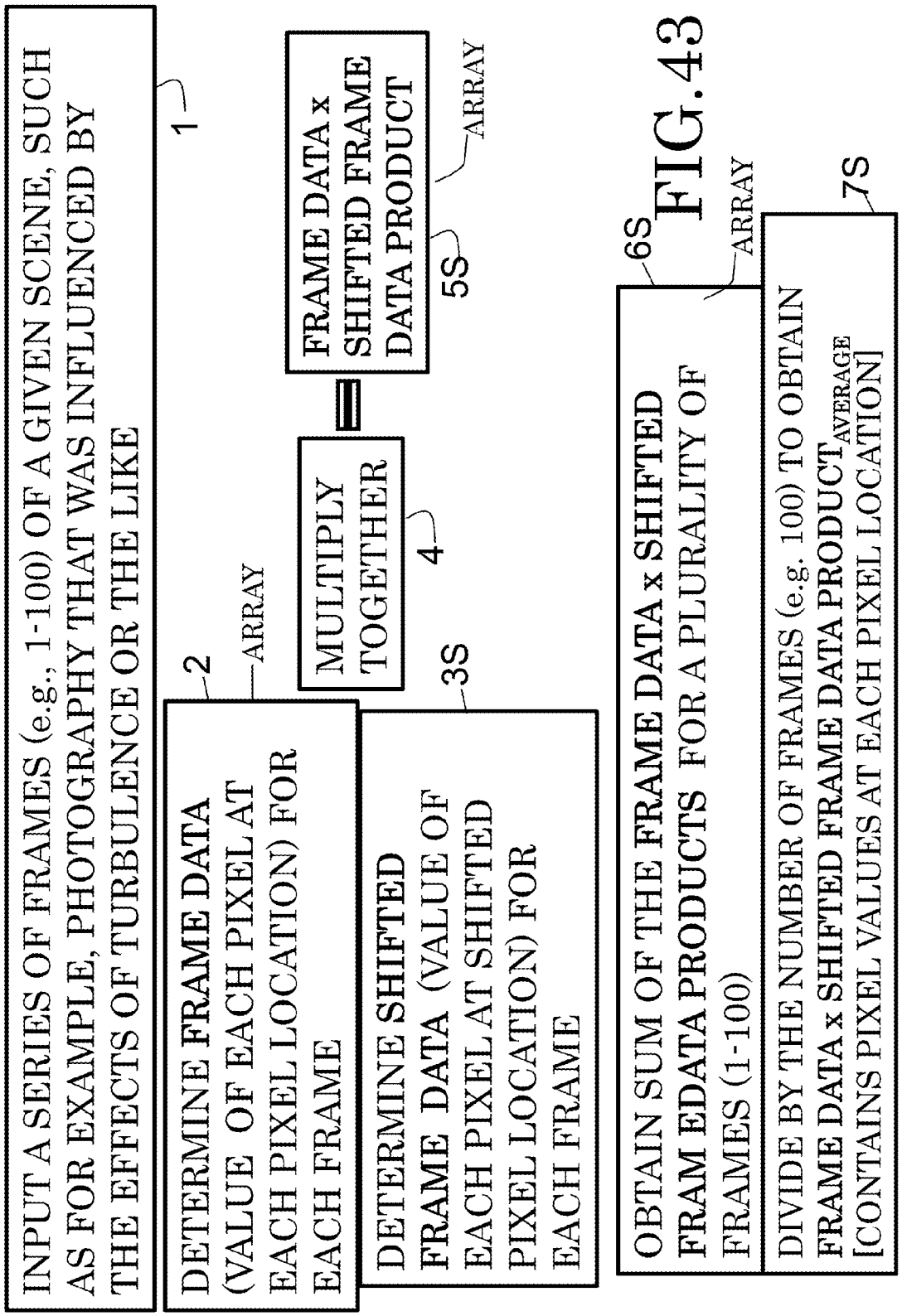
FIG. 43 is a partial schematic block diagram illustration of the steps for performing an alternate preferred method involving coordinate shifting of pixel values.

FIG. 43 is a partial schematic block diagram illustration of the steps for performing an alternate preferred method involving coordinate shifting of pixel values.

Figure 44:
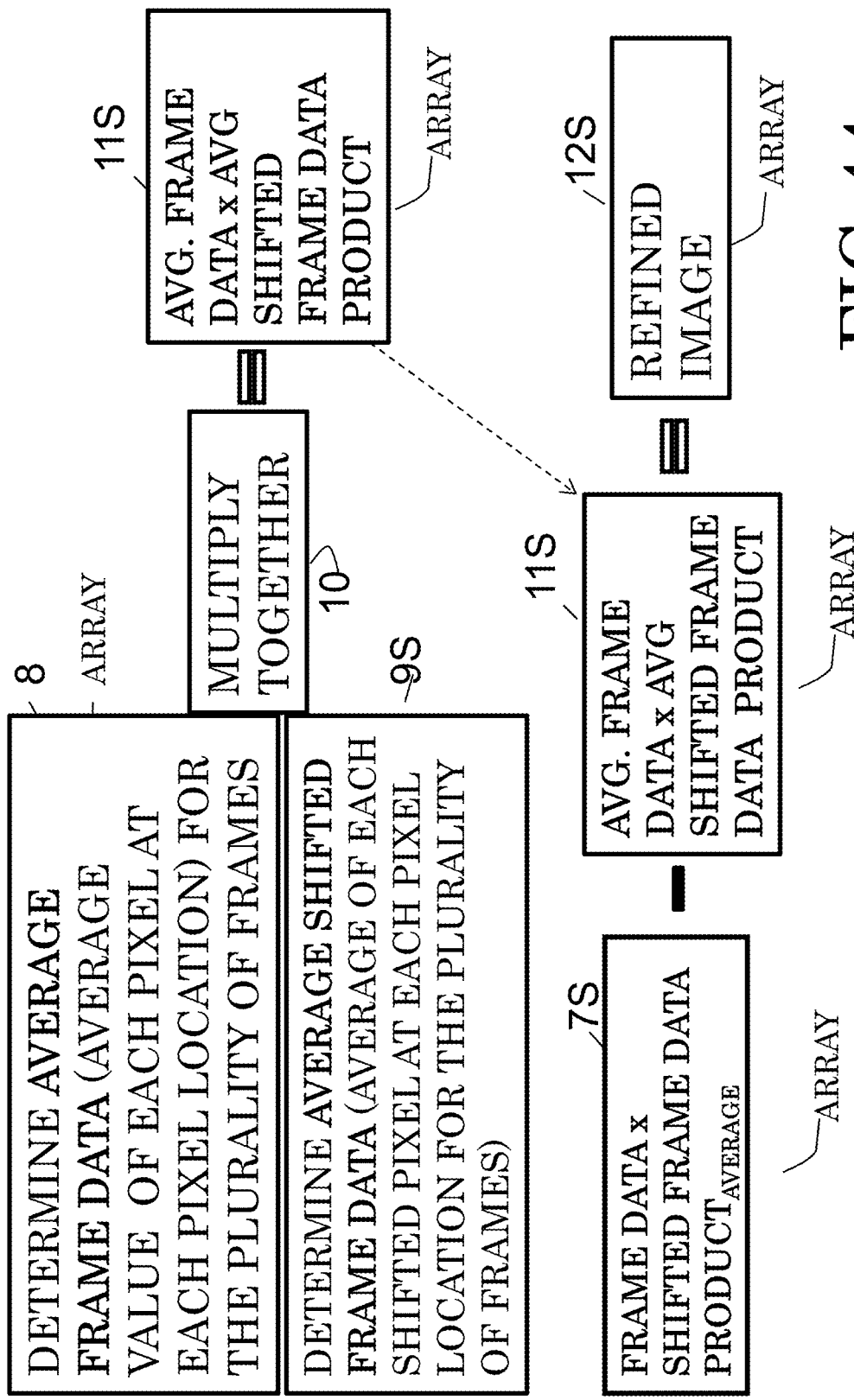
FIG. 44 is a schematic block diagram illustration of the steps for performing an alternate preferred method involving coordinate shifting of pixel values. Taken together, FIGS. 43 and 44 outline the steps of an alternate preferred methodology involving coordinate shifting of pixel values.

FIG. 44 is a schematic block diagram illustration of the steps for performing an alternate preferred method involving coordinate shifting of pixel values. Taken together, FIGS. 43 and 44 outline the steps of an alternate preferred methodology involving coordinate shifting of pixel values. Boxes which are not labeled with a suffix "S" are the same as described with respect to FIGS. 1, 2, 40 and 41. Box 3S represents determining shifted frame data (value of each pixel at shifted pixel location) for each frame. Box 5S represents the frame data× shifted frame data product. Box 6S is the sum of the frame data×shifted frame data products for a plurality of frames (1-100). Box 7S represents the division by the number of frames (e.g. 100) to obtain frame data×shifted frame data product average [contains pixel values at each pixel location]. Box 9S represents the determining of the average shifted frame data (average of each shifted pixel at each pixel location for the plurality of frames). Box 11S represents the average frame data×average shifted frame data product, which is subtracted from Box 7S to produce the enhanced image.

$G^2$ type images may be calculated on a per-pixel basis by shifting the pixels in a frame of data, for instance if a frame of measured is $I_1(i, j, k)$ where i, j indicates a pixel location and k is the time or frame index, then I2 can be set to be equal to a pixel shifted set of measured values $I_2(i,j,k) = I_1(i+1,j,k)$. Deviations of $I_1$ and $I_2$ from their respective ensemble averages can then be computed and the average of the products of those deviations $<\Delta I_1(i,j,k) \Delta I_2(i,j,k)>$ is a $G^2$ image computed from space or coordinate shifted pixels of the measured values. Other statistical quantities such as standard deviations may also be computed from the spatially shifted arrays.

The concept of time/frame shift of pixel values enhancement can be beneficial in identifying objects in a scene that are in motion. Shifting of pixel values can also occur between frames wherein, for instance, $I2(i, j, k) = I1(i, j, k+1)$. Deviations and averages of the products of those deviations can be computed to yield $G^2$ images of the area of interest.

Normalizations $G^2$ improved images can be normalized by dividing the improved $G^2$ image by, for example, the product of the standard deviations of the reference values and the bucket values or dividing by the product of the ensemble averages of the reference values and the bucket values. Other normalizations, i.e., $G^2/(\sigma(I_1)*\sigma(I_2))$ where $I_1$ and $I_2$ can be pixel values over time and $G^2/[(\sigma(I_1)*\sigma(I_2)*<I_1>*<I_2>)]$ Where $<>$ indicates an ensemble average and a indicates the standard deviation. $G^2$ images can also be normalized by dividing by an all-positive $G^2$ to enhance image features. All positive $G^2$ images can also be normalized by dividing by (std $(I1)*std(I_2)* <I_1>*<I_2>$); this type of normalization on the all positive $G^2$ calculations is particularly lifelike. It is noted that $G^2$ images that are normalized by the product of the averages typically need to be colormap inverted, i.e. multiplied by $-1$, to recover realistic shading. $G^2$ images that are computed with a pixel shift process or the bucket process can be used to normalize the other calculation to highlight differences in the spatial or temporal scales of any distorting media between the measurement component and the area of interest.

Subensembles

Subensembles (such as utilizing a portion of an full ensemble, e.g., 1000 frames) can be averaged subset blocks of $G^2/(\sigma I1*\sigma I2*<I1>*<I2>)$, i.e., 10 blocks of 10 frames for frames 1 to 100. Examples of subensemble $G^2$s are as follows.

An example of a subensemble used in a preferred method of the present invention comprises utilizing sum of $G^2$ per frame where $G^2(k) = I1(k)*I2(k) - <I1><I2>$ and the sum of/the $G^2(k)$ over a set of i=1 to total number of frames in the ensemble is the improved image. A smaller subset of $G^2(k)$ can be summed over a sub-ensemble, k=1 to N where N is less than the total number of frames in the ensemble to provide an improved image. Note that the full set of measurements may be greater than the N being used for the current ensemble.

A further example of a subensemble used in a preferred method of the present invention comprises a $G^2$ image that may be computed by summing and averaging per-frame $G^2$ images over a set of frames that is less than the total number of frames in the ensemble of measurements. A per frame $G^2$ would be $G^2(k) = I1(k)*I2(k) - <I1><I2>$ where the k indicates the frame number out of the ensemble of frames. $<I1>$ and $<I2>$ are the "reference" and "bucket" averages over the ensemble of measurements. When the $G^2(k)$ are summed and averaged over a set of frames that is less than the total number of frame this constitutes a sub-ensemble $G^2$ calculation. This sub-ensemble improved $G^2$ image can highlight different features of the area of interest and may further provide a means to generate improved image frames for a movie of the area of interest.

The movies produced by this method can separate scale of turbulence. Separate scales of turbulence can be better images by the ability to choose different sizes of an ensemble and different size sets within an ensemble to use as the sub-ensemble.

Iterative Improvement Techniques

An iterative means to calculate in improved $G^2$ image could involve progressively incorporating more or fewer pixels of the measured frames to be summed over for a bucket value. One such method would be to choose a single pixel location to provide the bucket values over all frames. A $G^2$ image would then be computed using those bucket values. A new set of bucket values would be selected based on some criteria, such as choosing pixel locations where the $G^2$ value is greater than 0. A new $G^2$ image is computed and the process iterated until no new pixels are being added to or removed from the set of pixels being used to provide bucket values. Criteria other than the positively of the $G^2$ may be used to emphasize or converge to differing features in the $G^2$ image of the area of interest.

Area of Interest as an Imperfect Mirror

When an area of interest is illuminated by a source of photons such as the Sun, the illuminated area acts as an imperfect mirror of the illuminating source. A perfect mirror would acts to reflect the photons from the illuminating source where the angle of incidence would equal the angle of reflection. Furthermore, the perfect mirror would not absorb any of the incident photons. However, a region of interest may contain many differing scattering and absorbing elements. All of these elements are illuminated by the source and when the reflected and scattered photons from the region of interest are measured some information about the spatial distribution of photons of the light source is retained. It is this retained information of the spatial distribution of photons that enables a series of images measured with a single sensor of a region of interest to act much as a typical two sensor ghost imaging system wherein one of the sensors for a ghost imager measures only undisturbed spatial distributions of photons from the light source.

Potential Applications $G^2$ imaging in the infrared may be useful for applications in: art, medical imaging of blood vessels, identify and face recognition, imaging of blood vessels, medical imaging of blood vessel flow over the face and other parts of the body, and remote feature extraction.

A further application is terahertz ghost imaging. The methods and techniques of this invention apply to all electromagnetic wavelengths. Gamma rays, ultraviolet, visible, infrared, microwave, and radio waves and terahertz radiation can be utilized to produce improved images of a region of interest.

The potential extent of possible use of this invention is described in the following. However, this description should not be construed as limited to the statements. Potential applications include high resolution imaging, remote sensing, microscopic sensing, phase-contrast imaging or microscopy, astronomical imaging, physics, chemistry, biology, medical applications, quality control, surveillance, surface tampering detection, imaging partially occluded scenes, spectroscopy, raman spectroscopy, satellite imaging, detection of exoplanets, identification of hidden or concealed objects, remote biometrics, design of new sensors and image processing methods, design of new types of stealth technology, design of new types of communications devices. Furthermore, the methods and techniques can be used to determine characteristics of imaging sensors and discover favorable or unfavorable artifacts and properties including but not limited to spatial and temporal noise.

Speed Traffic Enforcement—Current local governments use traffic enforcement cameras to enforce traffic regulation violations. A traffic enforcement camera (also road safety camera, road rule camera, photo radar, speed camera, Gatso™) is an automated ticketing machine. It may include a camera which may be mounted besides, on, or over a highway or installed in an enforcement vehicle to detect traffic regulation violations, including speeding, vehicles going through a red traffic light, unauthorized use of a bus lane, for recording vehicles inside a congestion charge area and others. The latest automatic number plate recognition (ANPR) systems can be used for the detection of average speeds and use optical character recognition on images to read the license plates on vehicles. There are a number of possible factors that affect the ANPR software performance. One of these important factors is poor image resolution, usually because the plate is too far away but sometimes resulting from the use of a low-quality camera. In the case of camera recording a video (a sequence of images), this invention can process the recorded images to improve image quality of the license plate on vehicle. The enhanced license plate images are used to improve the performance of ANPR software. The invention is especially useful when the images are acquired from a far away distance and/or from a low-quality camera.

The invention may be utilized in conjunction with large crowd event security and management. Events involving a large crowd, especially the types of events including circuses, sporting events, theatrical events, concerts, rallies, parades, etc., the security task is to prevent, where possible, crimes including theft, vandalism or assault through the deployment of trained and licensed security personnel. Camera monitoring is an important component in this type of event security and management. The invention can be used to improve image details of a human face, nomenclature on a jersey, or a moving object/vehicle, etc., from a distance, or from the periphery of the event location. Also at football games, a preferred embodiment could be used to enhance the readability of numbers and/or names on football uniforms.

As used herein, the terminology "subject" means: an area, a scene, an object or objects, a landscape, overhead view of land or an object or objects, or a combination thereof.

As used herein, the terminology "frame" means: a picture, an image or one of the successive pictures on a strip of film or video.

As used herein, the terminology "process" means an algorithm, software, subroutine, computer program, or methodology.

As used herein, the terminology "algorithm" means: sequence of steps using computer software, process, software, subroutine, computer program, or methodology.

As used herein, the terminology "image sensor" means: a camera, bucket detector, CMOS, SPAD, quantum well, LIDAR, LADAR, charge coupled device (CCD), video device, spatial sensor, light field (plenoptic) camera, gyro-stabilized camera, spatial phase sensitive camera, or range sensor. The image sensor may comprise a device having a shutter controlled aperture that, when opened, admits light enabling an object to be focused, usually by means of a lens, onto a surface, thereby producing a photographic image OR a device in which the picture is formed before it is changed into electric impulses.

The terminology "processor" or "image processor" as used in the following claims includes a computer, multiprocessor, CPU, minicomputer, microprocessor or any machine similar to a computer or processor which is capable of processing algorithms.

The terminology "operations" as used in the following claims includes steps, a series of operations, actions, processes, subprocesses, acts, functions, and/or subroutines.

As used herein the terminology "succession" means the act or process of following in order or sequence, but is not limited to sequential order. As used herein the terminology "succession" refers to a later taken image being compared with an earlier taken image.

As used herein the terminology "array" refers to a systematic arrangement of data in rows and columns. An example of an array is a matrix which is a rectangular array of numbers, symbols, or expressions. Examples of arrays include a matrix which is a rectangular array of numbers, symbols, or expressions and a vector which is a linear array of numbers, symbols or expressions.

As used herein, the terminology "phase" refers to a property of waves that measures the advance of one wave relative to another wave or that wave at an earlier place in space-time. Quantum particles such as photons having some wave properties may exhibit phase properties. Phase differences may be manifest as interference or diffraction fringes. Since images are the result of interaction of quantum particles with reflective or scattering objects they can exhibit interference fringes as signatures of instantaneous or average phase variations. Often objects that exhibit some fringes can be referred to as phase objects. "Phase information" refers to images that provide indications such as interference or diffraction fringes induced by the target and its environment. Phase information can be useful to distinguish features of the target that are generally not as recognizable without the phase information. Phase is discussed in R. E. Meyers, K. S. Deacon, and Y. H. Shih, "Turbulence-free ghost imaging," Appl. Phys. Lett. 98, 111115 (2011), R. E. Meyers, K. S. Deacon, and Y. H. Shih, "Positive-negative turbulence-free ghost imaging," Appl. Phys. Lett. 100, 131114 (2012). As used herein the terminology, "SPAD" refers to an array of Single Photon Counting Detectors that is used for imaging.

As used herein the terminology, "synchronous" means data or frames that are acquired at the time or are time coincident.

As used herein the terminology, "asynchronous" means data or frames that are not acquired at the same time or are not time coincident.

As used herein the terminology, "light" is meant to describe electro-magnetic energy of any portion of the electro-magnetic spectrum to include, but not limited to, cosmic rays, x-rays, ultra-violet, visible, infra red, terahertz, microwave, and radio waves. Light may be measured in terms of its photons or fields.

Although various preferred embodiments of the present invention have been described herein in detail to provide for complete and clear disclosure, it will be appreciated by those skilled in the art that variations may be made thereto without departing from the spirit of the invention.

It should be emphasized that the above-described embodiments are merely possible examples of implementations. Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention. All references mentioned herein are hereby incorporation by reference herein.

What is claimed is:

1. A processor implemented method for image improvement comprising the following steps not necessarily in sequential order:
providing a plurality of frames of a region of interest;
determining the value of each pixel at each location within each frame to form a first array of pixel values for each frame;
selecting less than all of the pixel locations within each frame within the plurality of frames;
summing the intensity values for the selected pixel locations within each frame;
multiplying the pixels in the first array of pixel values by the summation of intensity values for the selected pixel locations to produce a first product array for each frame;
summing the first product arrays;
determining the average of first product arrays by dividing the sum of first product arrays by the number of frames in the plurality of frames;
determining the average value of each pixel at each pixel location for the plurality of frames to form a second array of averaged pixel values for the plurality of frames;
determining the average of the summation of intensity values for the selected pixel locations for the plurality of frames;
multiplying the array of average pixel values and the average of the summation of intensity values for the selected pixel locations for the plurality of frames to form a second product array; and
subtracting the second product array from the average of first product arrays to provide an improved image of the region of interest.

2. The method of claim 1 wherein the selecting of pixel locations comprises selecting different pixel locations in different frames and wherein the pixel locations are selected based upon predetermined criteria.

3. The method of claim 1 wherein the summation of intensity values for the selected pixel locations comprises selecting a color for the pixels at the selected pixel locations which is different from the color selected for the pixels in the pixel value array.

4. The method of claim 1 wherein the frames of a region of interest were influenced by the effects of turbulence or were taken in bad or changing weather or were influenced by the effects of low-light.

5. The method of claim 1 wherein the frames of a region of interest comprise sparse image data and wherein an image is reconstructed using sparse data from a plurality of image frames.

6. The method of claim 1 wherein the frames of a region of interest comprise scanned images and wherein the pixel values of each image are determined by illuminating the scanned image and determining the amount of light reflected from the image using at least one photodetector.

7. The method of claim 1 wherein average pixel values can be represented by $<I_1>$;
computing the average of the summation of the intensity values for the selected pixel locations within each frame can be represented by $<I_2>$;
determining the deviation from the summation of the intensity values for the selected pixel locations within each frame can be represented by $\Delta I_2 = I_2 - <I_2>$;
determining an array of average pixel values for the series of frames; can be represented by $<I_1>$;
determining the deviations from the array of average pixel values for each pixel in each frame by subtracting the array of average pixel values from the pixel value arrays to determine positive or negative pixel deviation values can be represented by $\Delta I_1 = I_1 - <I_1>$; and
wherein the enhanced image can be represented as $<\Delta I_1 \Delta I_2> = <I_1 I_2> - <I_1><I_2>$.

8. The method of claim 1 wherein the frames comprise regions of interest that are radiation emitting.

9. The method of claim 7 wherein the frames are in color and wherein the $I_1$ is selected to be one color or wavelength band and $I_2$ is selected to be a different color or wavelength band.

10. A system for image improvement comprising:
at least one processor;
at least one input for inputting frames of data;
at least one display for displaying the image;
at least one memory operatively associated with the at least one processor adapted to store frames of data taken of a region of interest, each frame of data comprising an array of pixels, each pixel having a pixel value, the at least one processor operating to process a plurality of frames of a given region of interest by;
determining the value of each pixel at each location within each frame to form a first array of pixel values for each frame;
selecting less than all of the pixel locations within each frame within the plurality of frames;
summing the intensity values for the selected pixel locations within each frame;
multiplying the pixels in the first array of pixel values by the summation of intensity values for the selected pixel locations to produce a first product array for each frame;
summing the first product arrays;
determining the average of first product arrays by dividing the sum of first product arrays by the number of frames in the plurality of frames;
determining the average value of each pixel at each pixel location for the plurality of frames to form a second array of averaged pixel values for the plurality of frames;
determining the average of the summation of intensity values for the selected pixel locations for the plurality of frames;
multiplying the array of average pixel values and the average of the summation of intensity values for the selected pixel locations for the plurality of frames to form a second product array; and
subtracting the second product array from the average of first product arrays to provide an improved image of the region of interest.

11. The system of claim 10 wherein the input is connected to an input device comprising one of a scanner, a DVD player, CMOS camera, SPAD array, video camera, smart phone, cell phone, lidar, ladar, television, and CCD camera.

12. The system of claim 10 wherein the frames inputted were influenced by the effects of low-light.

13. The system of claim 10 wherein the frames comprise images of a light emitting target.

14. The system of claim 10 wherein the frames are in color.

15. The method of claim 14 wherein the color of the pixels selected for the frame intensity for the first frames is different than the color selected for the shifted frame intensity for the shifted frames.

16. A system for image improvement of low-light or radiation emitting areas comprising:
at least one processor;
at least one memory operatively associated with the at least one processor, the at least one processor configured to execute the method of claim 1.

* * * * *